(12) United States Patent
Kelm et al.

(10) Patent No.: US 6,322,059 B1
(45) Date of Patent: Nov. 27, 2001

(54) LOW CONTACT FORCE SPRING

(75) Inventors: Henry J. Kelm, Litchfield; Steven J. Reilly, Westlake; Walter Santee, Mentor, all of OH (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 09/351,529

(22) Filed: Jul. 12, 1999

Related U.S. Application Data

(63) Continuation-in-part of application No. 09/121,544, filed on Jul. 23, 1998.

(51) Int. Cl.$^7$ .......................................... F16F 5/00

(52) U.S. Cl. ...................... 267/119; 267/130; 267/35; 267/64.28

(58) Field of Search ................... 267/118, 119, 267/124, 130, 35, 64.11, 64.15, 64.28

(56) References Cited

U.S. PATENT DOCUMENTS

| | | |
|---|---|---|
| 1,034,115 | 7/1912 | Johnson . |
| 1,613,961 | 1/1927 | Schwartz . |
| 1,664,486 | 4/1928 | Rode . |
| 1,805,521 | 5/1931 | Hansen . |
| 2,976,845 | 3/1961 | Goldring . |
| 3,326,546 | 6/1967 | Otto . |
| 3,490,757 | 1/1970 | Haanes . |
| 3,589,702 | 6/1971 | Spieth . |
| 3,740,997 | 6/1973 | Blake et al. . |
| 3,806,105 | 4/1974 | Knoishi et al. ..................... 267/35 |
| 3,865,356 | 2/1975 | Wossner . |
| 3,869,861 | 3/1975 | Case . |
| 3,913,460 * | 10/1975 | Wright ..................... 92/85 |
| 3,923,294 | 12/1975 | Gold et al. . |
| 3,947,006 | 3/1976 | Bauer et al. ..................... 267/64.11 |
| 4,048,253 * | 9/1977 | Ooba et al. ..................... 525/440 |
| 4,111,030 | 9/1978 | Shepard et al. . |
| 4,153,237 | 5/1979 | Supalla . |
| 4,257,254 | 3/1981 | Adamus et al. . |
| 4,341,137 | 7/1982 | Leitch et al. . |
| 4,342,448 | 8/1982 | Wallis . |
| 4,419,804 | 12/1983 | Axthammer . |
| 4,423,859 | 1/1984 | Muller . |
| 4,428,566 | 1/1984 | de Baan et al. . |
| 4,445,671 | 5/1984 | Reuschebach et al. . |

(List continued on next page.)

FOREIGN PATENT DOCUMENTS

| | | |
|---|---|---|
| 2638929A1 | 3/1978 | (DE) . |
| 3813021A1 | 11/1989 | (DE) . |
| 0 458 467 A2 | 4/1991 | (EP) . |
| 2075395A | 11/1981 | (GB) . |
| 9401119-4 | 3/1994 | (SE) . |
| WO 95/27157 | 10/1995 | (WO) . |
| WO 99/49237 | 9/1999 | (WO) . |

OTHER PUBLICATIONS

Engineering properties of Cyanaprene urethane elastomers, May 1985, Cyanamid.*
Article entitled "HYlene PPD1", Copyright 1997, E.I. duPonte deNemours and Company.
Brochure entitled "Tanker 2, A & B Series", Copyright 1996, Teledyne Fluid Systems, Hyson Products.

Primary Examiner—Robert J. Oberleitner
Assistant Examiner—Thomas J. Williams
(74) Attorney, Agent, or Firm—Tarolli, Sundheim, Covell, Tummino & Szabo L.L.P.

(57) ABSTRACT

A fluid spring assembly. The spring assembly preferably includes a body that slidably supports a piston that is attached to a piston rod. The piston serves to define a fluid chamber within the body that is charged with a pressurized fluid medium. The piston is retained within the body by a rigid retainer member. A biasing member is provided between the retaining member and the piston for resisting the force generated by the fluid medium within the fluid chamber.

496 Claims, 18 Drawing Sheets

U.S. PATENT DOCUMENTS

| | | |
|---|---|---|
| 4,499,750 | 2/1985 | Gerber et al. . |
| 4,550,899 | 11/1985 | Holley . |
| 4,583,722 | 4/1986 | Wallis . |
| 4,601,461 | 7/1986 | Brough et al. . |
| 4,628,796 | 12/1986 | Wallis . |
| 4,635,908 | 1/1987 | Ludwig . |
| 4,647,026 | 3/1987 | Siemann et al. . |
| 4,657,228 | 4/1987 | Lautzenhiser . |
| 4,691,902 | 9/1987 | Kadis . |
| 4,729,300 | 3/1988 | Klein . |
| 4,765,227 | 8/1988 | Balazs et al. . |
| 4,792,128 | 12/1988 | Holley . |
| 4,796,871 | 1/1989 | Bauer et al. ............... 267/64.11 |
| 4,823,922 | 4/1989 | Ergun . |
| 4,838,527 | 6/1989 | Holley . |
| 5,003,807 | 4/1991 | Terrell et al. . |
| 5,007,276 | 4/1991 | Kadis et al. ............... 267/119 |
| 5,027,637 | 7/1991 | Umetsu . |
| 5,042,253 | 8/1991 | Kataoka . |
| 5,076,451 | 12/1991 | Conley et al. ............... 188/287 |
| 5,129,635 | 7/1992 | Holley . |
| 5,220,820 * | 6/1993 | Terrell ............... 267/130 |
| 5,275,387 | 1/1994 | Cotter et al. . |
| 5,511,868 | 4/1996 | Eftefield . |
| 5,528,918 | 6/1996 | Kirii . |
| 5,660,379 | 8/1997 | Oest . |
| 5,687,598 | 11/1997 | Kirii et al. . |
| 5,827,155 * | 10/1998 | Jensen et al. ............... 267/160 |
| 5,918,708 * | 7/1999 | Yuda, Jr. et al. ............... 267/136 |
| 6,059,273 | 5/2000 | Sand et al. ............... 267/119 |
| 6,068,245 | 5/2000 | Roper . |
| 6,103,852 * | 8/2000 | Shirasaka ............... 528/80 |
| 6,170,809 | 1/2001 | Cotter ............... 267/119 |

\* cited by examiner

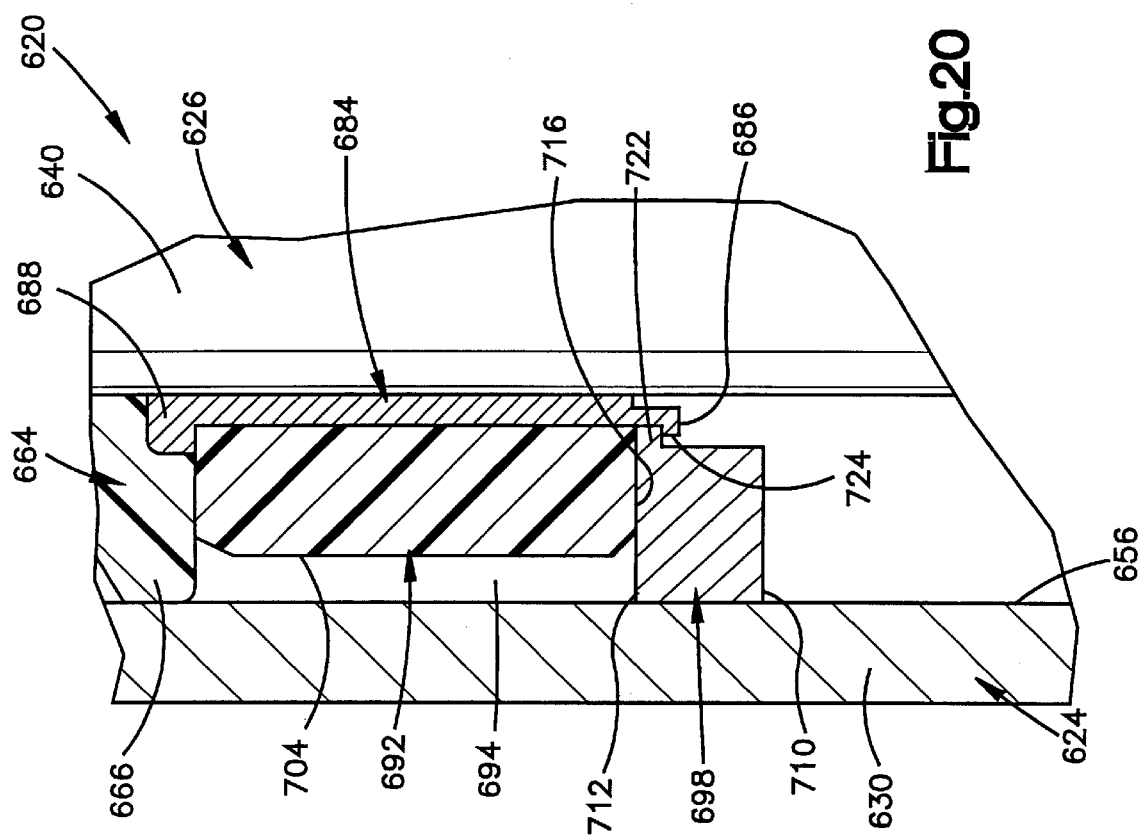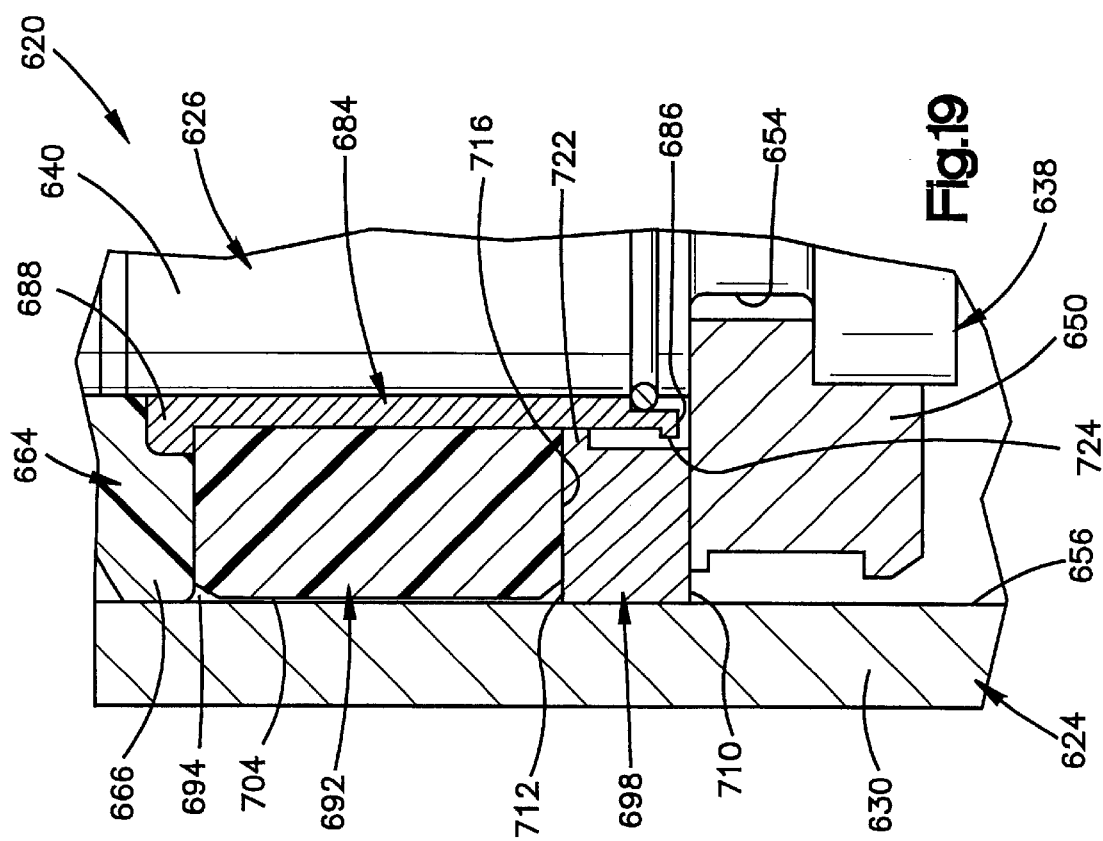

LOW CONTACT FORCE SPRING

CROSS REFERENCE TO RELATED APPLICATIONS

This application is a continuation in part of co-pending U.S. patent application Ser. No. 09/121,544 filed Jul. 23, 1998. The benefit of the earlier filing date of the aforementioned application Ser. No. 09/121,544 is hereby claimed. The disclosure in the aforementioned application Ser. No. 09/121,544 is hereby incorporated herein in its entirety by this reference thereto.

BACKGROUND OF THE INVENTION

1. Field of the Invention

The subject invention relates to a method and apparatus for use in a press assembly and, more particularly, to a cushion assembly which provides a yieldable force during operation of the press assembly from an open condition to a closed condition.

2. Description of the Invention Background

A variety of different products and components are manufactured utilizing apparatuses called "dies". A die can comprise a complex and expensive device that punches holes, cuts, bends, forms, etc. raw material (e.g., sheet metal and the like) that is placed within the die. For example, automobile fenders, side panels, etc. are typically formed from sheet steel that is placed within a die.

A die is typically operated by a mechanical pressing mechanism that can generate large amounts of force for pressing the die components together when the raw material is placed therein. A typical mechanical press can generate tons of pressing force depending upon its design. Most mechanical presses employ a large rotating flywheel arrangement and use a crankshaft or eccentric shaft to convert the rotary motion of the flywheel to a straight line pressing motion which is applied to a slide that contacts a portion of the die. The geometry of this combination of parts results in a changing mechanical advantage between the drive and the slide. For example, the mechanical advantage of the crank arm and connection assembly will vary from one, at a point near midstroke, to infinity at the bottom of the stroke.

The impact forces and associated shock loads created during the pressing process can result in undesirable wear and damage to various die and press components. Thus, to reduce die wear and damage, which can lead to costly down time and maintenance expenses, cushion assemblies have been employed to support the die on the machine and absorb a portion of the shock forces created thereby. U.S. Pat. No. 4,792,128 and U.S. Pat. No. 4,838,527 to Holley disclose various types of cushion assemblies.

A known cushion assembly, that is, a gas spring is also depicted in FIG. 1. As can be seen in FIG. 1, the cushion assembly 10 comprises a body 12 that slidably supports a piston 16 therein. The piston 16 is attached to a piston rod 18 that is oriented in the mechanical press to engage the bottom of the die or a movable table (known as a pin plate) that supports the die. The body 12 is hollow and is capped on one end by a cap 14. The cap 14 and the bottom of the piston 16 cooperate to define a gas chamber 20. The gas chamber 20 is charged with a compressible gas, such as nitrogen, through a conventional pressure valve 22 located in the cap 14. The piston rod 18 is slidably supported within the body 12 by a rigid rod support member 24 that is typically fabricated out of metal such as bronze. The upper end 13 of the body 12 is sealed with a retainer cap 26 that is affixed in position with a conventional retaining ring 28. As illustrated by arrow "A" in FIG. 1, the gas pressure within the chamber 20 serves to push the piston rod 18 out of the body 12 until the piston 16 contacts the rigid retainer 24. Such construction results in the preloading of the piston rod 18 such that the development of a contact force (i.e., the force required to initiate movement of the spring from the fully extended position) on the end of the piston rod 18 is required to compress the gas spring 10. Conventional cushion assembly designs deliver almost full force at contact and have relatively little force increase as the cushion assembly is compressed. This results in the application of high forces instantaneously at contact with the rod 18. This instantaneous force loading is transferred to the other components of the press and results in undesirable shock loading of the press and die.

FIG. 2 is a press tonnage curve of a typical mechanical press wherein known cushion assemblies of the type described above are employed. The vertical axis represents the amount of force (tonnage) generated by the press and the horizontal axis represents the distance that the press slide is away from its bottom limit of travel. As can be seen from that graph, the press load capacity increases along an arcuate slope to a certain point as the distance between the press slide and its bottom position increases. The tonnage signature is the actual application of forces by the press during operation and takes into account a variety of process variables such as speed, overloading, etc. The preload of the cushion assemblies can result in the undesirable shock overload depicted in FIG. 2 wherein the actual load exceeds the press load capacity. Such shock loading can result in die and press wear and failure, excessive noise, and undesirable pad bounce.

The preload characteristics of conventional cushion assemblies or gas springs of the type shown in FIG. 1 are a major contributor to the generation of shock loads and noise as well as excessive pad bound on the return stroke. In an effort to reduce the magnitude of initial contact forces applied to the piston rod, cushion assemblies that employ a floating piston (e.g., a piston that is not attached to the piston rod) and a dual gas chamber arrangement have been developed. The additional gas chamber purportedly serves to balance the net force on the piston rod at its fully extended position.

Swedish Pat. No. 9401119-4 discloses a cushion assembly that employs a floating piston and a dual gas chamber arrangement. This reference also teaches that a damping body may also be employed to "further damp any residual noise." Such a cushion assembly requires additional sealing elements to be employed and produces undesirable dynamic effects due to inertia of the floating piston, and static friction of the seals.

FIG. 3 is a graphical comparison of the theoretical force curves of a conventional cushion assembly or gas spring of the type depicted in FIG. 1 and the above-mentioned spring that employs a floating piston. As can be seen from that Figure, the floating piston represents a modest improvement over the standard gas spring in that its initial curve (upon contact) is slightly sloped when compared to the essentially vertical curve of the conventional gas spring.

Another approach that has been employed to reduce gas spring contact force involved the use of cushion assemblies, that is, gas springs, that have stepped pistons. Such a spring is disclosed in U.S. Pat. No. 5,129,635 to Holley. FIG. 4 is a graphical comparison of the force curves of a conventional gas spring of the type depicted in FIG. 1 and a conventional gas spring that employs a stepped piston. As can be seen in that Figure, however, the undesirable instantaneous step function in the spring load is not eliminated when utilizing a spring with such a piston arrangement.

Thus, there is a need for a cushion assembly that has an improved shock loading characteristics during operation of a press assembly.

There is a further need for a press cushion assembly that can be constructed to provide a desired contact force while reducing undesirable shock during initial operation of the cushion assembly.

There is still another need for a spring arrangement with the above-mentioned characteristics that is relative easy to manufacture and service.

SUMMARY OF THE INVENTION

In accordance with a particularly preferred form of the present invention, there is provided a cushion assembly, that is, a spring assembly, that comprises a body that may have a bottom and a passage therein. A piston is slidably received within the passage and cooperates with the bottom of the body to define a fluid chamber therebetween. The fluid chamber is charged with a fluid material. A piston rod may be slidably supported within the passage by a support member that is affixed to the body. One end of the piston rod is attached to the piston and the other end thereof protrudes from the body for engagement with a force generating object, that is, with a member in a press assembly. A biasing member is provided between the support member and the piston. The biasing member may comprise an elastomeric material, Belleville washers, a coil spring or a second pressure chamber filled with additional fluid medium.

Another embodiment of the present invention comprises a spring assembly that includes a body that has a bottom and a passage therein. A first piston is slidably received within the passage and cooperates with the bottom of the body to define a fluid chamber therebetween.

The fluid chamber is charged with a gaseous material. A piston rod is slidably supported within the passage by a support member that is affixed to the body. A piston is attached to one end of the piston rod while the other end of the piston rod protrudes from the body. A cavity is formed in the protruding end of the piston rod and is adapted to receive a second portion of the piston rod therein. An elastomeric material is provided between the bottom of the cavity and the second piston.

It is a feature of the present invention to provide a cushion assembly that can be used in connection with mechanical presses to reduce the shock loads created thereby.

It is another feature of the present invention to provide a press cushion assembly that is a low contact force fluid spring.

Yet another feature of the present invention is to provide a fluid spring that has an adjustable contact force while maintaining full tonnage resistance at the required work stroke of a mechanical press.

Accordingly, the present invention provides solutions to the shortcomings of the prior press cushion assembly arrangements. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein:

FIG. 19 is an enlarged fragmentary sectional view of a portion of FIG. 16, illustrating the relationship between a body of elastomeric material and other components of the cushion assembly when the cushion assembly is in the extended condition; and FIG. 20 is an enlarged fragmentary sectional view of a portion of FIG. 18, illustrating the relationship between the body of elastomeric material and other components of the cushion assembly when the cushion assembly is in the fully retracted condition.

DETAILED DESCRIPTION OF THE PREFERRED EMBODIMENTS

Referring now too the drawings for the purposes of illustrating the present preferred embodiments of the invention only and not for the purposes of limiting the same, the Figures show a press cushion assembly or spring 50 of the present invention that may be employed with a mechanical press 30. The skilled artisan will readily appreciate, however, that while the present invention is particularly well-suited for use in connection with a conventional mechanical press, the springs disclosed herein could be successfully employed in a myriad of other presses. Accordingly, the protection afforded to the present preferred embodiments disclosed and claimed herein should not be limited to use in connection with any particular mechanical press.

Figure 5:
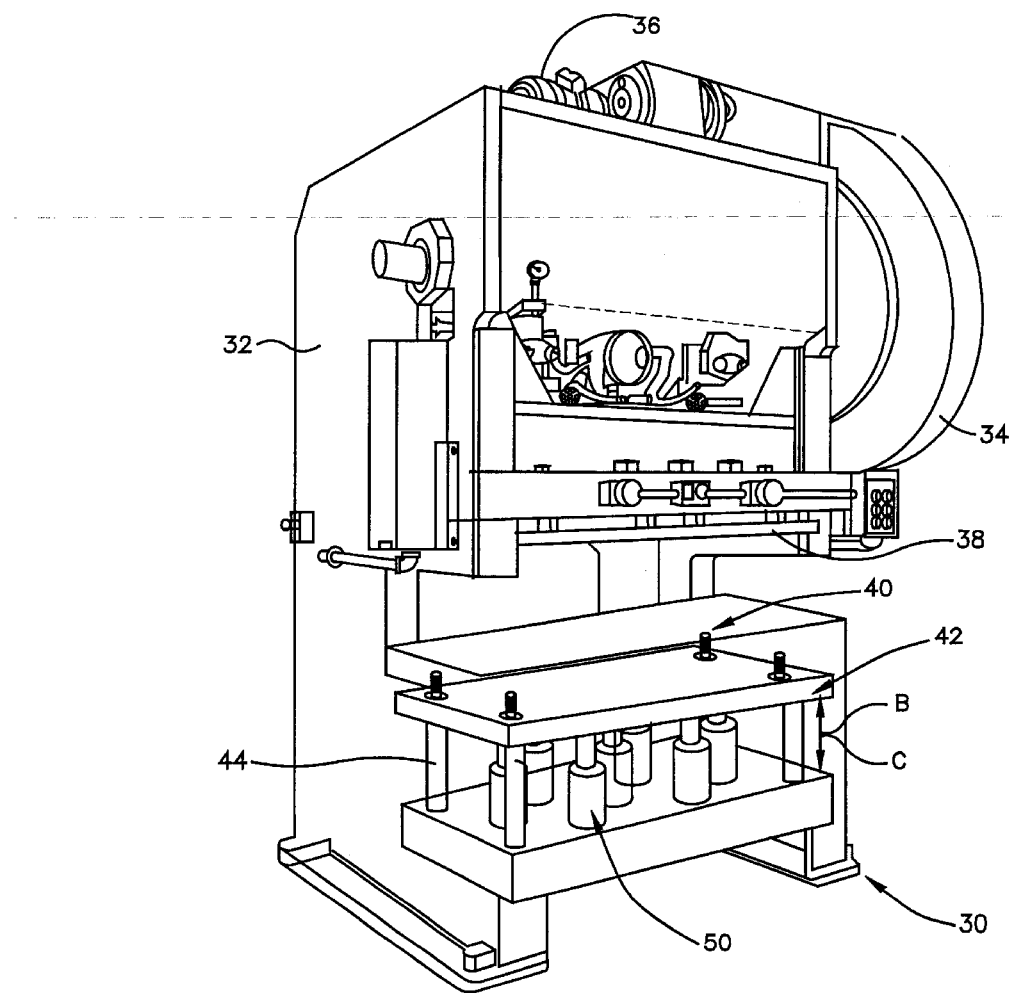
FIG. 5 is a perspective view of a conventional mechanical press wherein several cushion assemblies of the present invention may be employed.

A conventional mechanical press is depicted in FIG. 5. As can be seen in that Figure, press 30 has a frame 32 and a flywheel 34 operably attached thereto. A crankshaft 36 is attached to the flywheel and a slide plate or upper member 38 is attached to the bottom of the crankshaft. A die or lower member 40 may be supported on a pin plate 42 that is slidably supported on a plurality of springs 50 and a series of guide posts 44. Those of ordinary skill in the art will appreciate that upon operation of the press 30, the slide plate 38 travels up and down in the directions represented by arrows (B, C).

Figure 6:
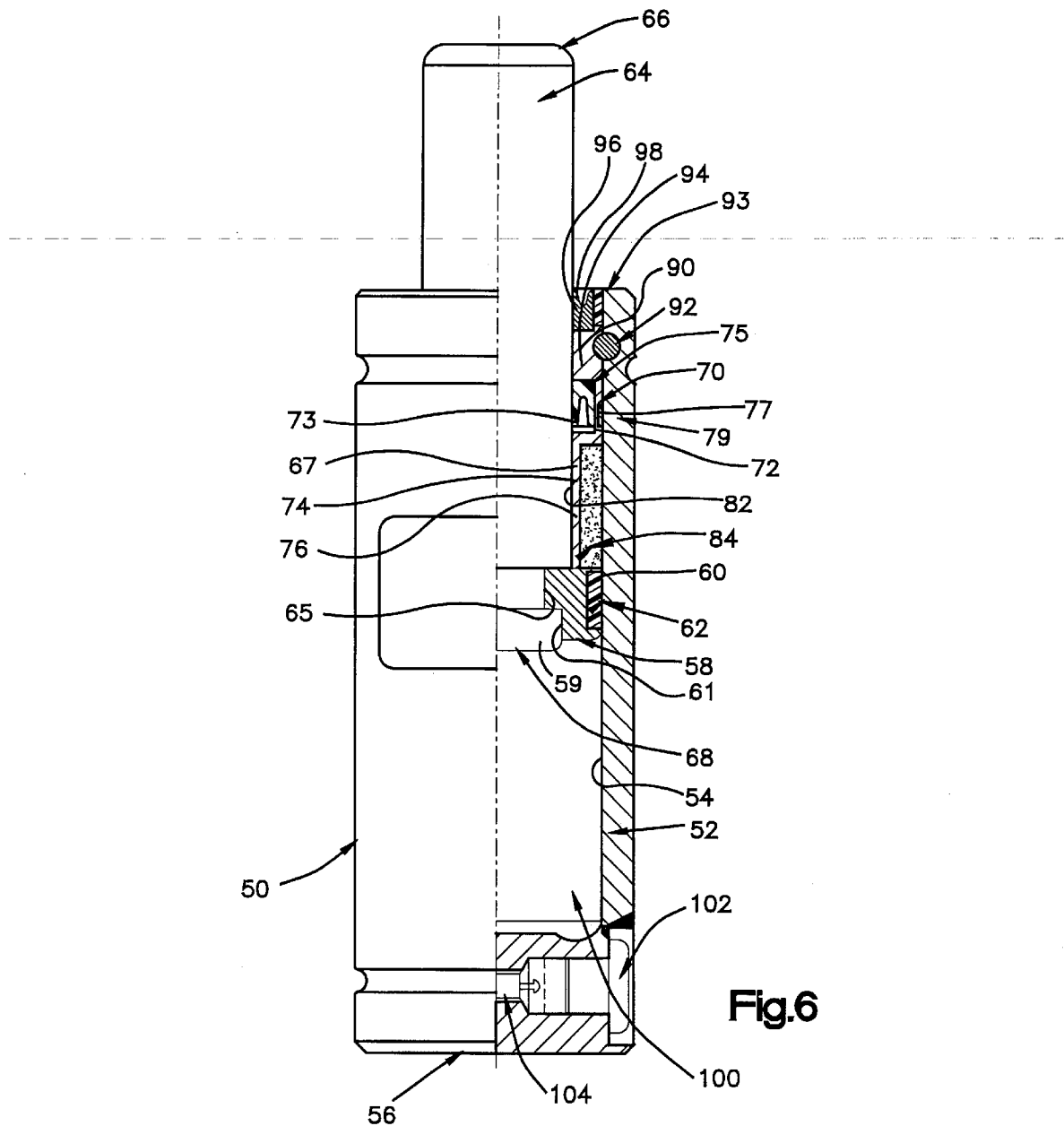
FIG. 6 is a partial cross-sectional view of one press cushion assembly constructed in accordance with the present invention.

FIG. 6 depicts one press cushion assembly constructed in accordance with the present invention. As can be seen in that Figure, the press cushion assembly or spring 50 includes a body member 52 that is preferably fabricated from steel such that it defines a piston receiving passage 54 therein. An end cap 56 is preferably attached to the bottom of the body member 52, preferably by welding or other suitable means, to create a fluid-tight seal between the end cap 56 and the body 52. A piston assembly 58, preferably fabricated from hardened steel, is sized to be slidably received within the passageway 54. To facilitate slidable travel of the piston assembly 58 within the passageway 54, an annular piston bearing 62, preferably fabricated from bronze, is pressed into an annular cavity 60 within the piston assembly 58.

Figure 7:
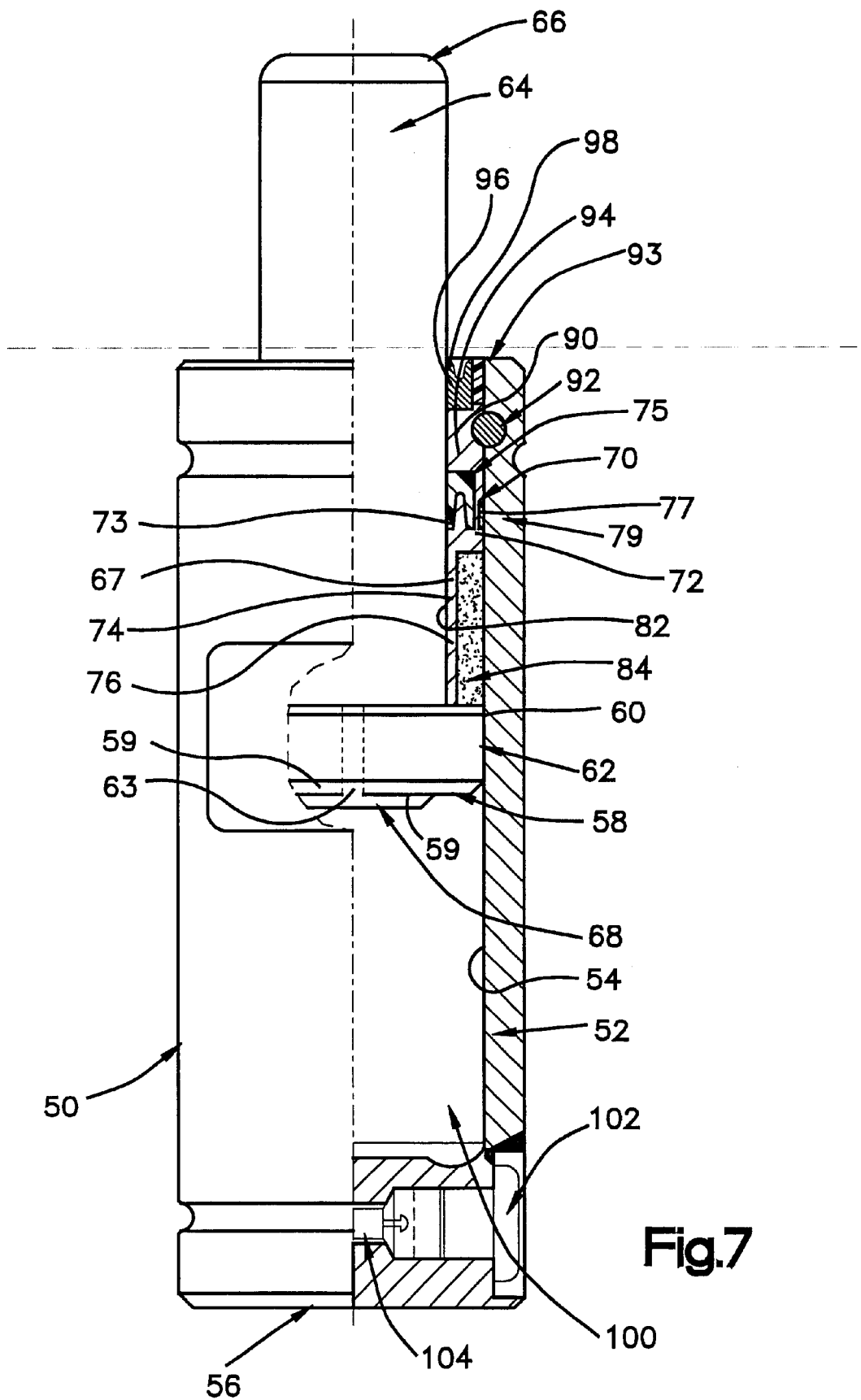
FIG. 7 is another partial cross-sectional view of the spring of FIG. 6 with a piston thereof shown in full view.

Piston assembly 58 includes a head end portion and a rod end portion. The rod end portion includes a piston rod 64 that is preferably fabricated from hardened steel covered with chrome plating. Piston rod 64 has a first end 66 that protrudes from the passageway 54 and is adapted to engage a portion of a machine such as a pin plate 42 of a mechanical press 30. The other end 68 of the piston rod 64 is adapted to be affixed to and forms part of the head end portion of the piston assembly 58. To facilitate easy assembly and replacement of the piston assembly 58, a shoulder 65 is preferably machined into the end 68 of the piston rod 64 at the head end portion of the piston assembly, as shown in FIG. 6. Piston assembly 58, in a preferred form, consists of two piston halves 59 that each have a complementary step 61 machined therein that is constructed to interface with the shoulder 65 in the piston rod 64 as shown. To facilitate slidable travel of the piston assembly 58 within the passageway 54, an annular piston bearing 62, preferably fabricated from a polymeric material, is assembled into an annular cavity 60 within the piston assembly 58. Referring to FIG. 7, when assembled, a passageway 63 is provided between the halves 59 to permit pressurized fluid to pass therebetween. Thus, to affix the piston assembly 58 to the piston rod end 68, the halves 59 of piston 58 are arranged on the shoulder portion 65 of the piston rod 64 and the piston bearing 62 is installed around the two piston halves 59. The piston assembly is then slid into the passageway 54. The skilled artisan will readily appreciate, however, that other methods of affixing the piston assembly 58 to the piston rod 64 may also be employed.

Piston rod 64 is slidably supported within the passageway 54 by a piston rod support member 70 and a retaining cap 90. More particularly, and with reference to FIG. 6, the piston rod support member 70 is preferably fabricated from a rigid material such as steel and has a flanged upper portion 72 and a cylindrical body portion 74. A through passage 76 extends through the flanged portion 72 and the body portion 74 to slidably receive the piston rod 64 therethrough. A cavity 73 is preferably provided in the flanged portion 72 for receiving a commercially available "U-cup" 75 therein. To establish a fluid-tight seal between the piston rod support member 70 and the body 52, an O-ring 79 is preferably seated in an annular passage 77 machined in the perimeter of the flanged portion 72 of the piston rod support member 70.

As can be seen in FIG. 6, a cavity is preferably formed between the body 52 and the body portion 74 of the piston rod support member 70 for receiving a biasing unit which is an annular body 84 of elastomeric material. In a preferred embodiment, bumper member 84 comprises an elastomeric material such as urethane. However, other materials such as nitrile or fluorinated hydrocarbon could also be successfully employed. The purpose of the bumper member 84 will be discussed in further detail below.

The spring assembly 50 preferably further includes a retainer cap 90 that is removably affixed to the body 52 by a commercially available retainer ring 92. In a preferred embodiment, a rubber dust seal member 93 is inserted in the groove between the body 52 and the retainer cap 90 as shown in FIG. 6. Retainer cap 90 has a passage 94 therethrough that is adapted to slidably receive the piston rod 64. In a preferred embodiment, an annular cavity 96 is coaxially aligned with passage 94 to receive a commercially available scraper ring 98 therein. Scraper ring 98 is preferably fabricated from polyurethane. The lower surface of the piston assembly 58 cooperates with the end cap 56 attached to the body 52 to define a fluid chamber 100 within the passageway 54. See FIG. 6. The fluid chamber 100 is preferably charged with a gaseous medium through a commercially available charging valve 102 installed in the end cap and communicating with a passageway 104 that adjoins the fluid chamber 100. The construction and operation of the charging valve 102 is well known in the art and, as such, will not be discussed in detail herein.

The fluid chamber 100 is charged with a pressurized fluid. As used herein, the term "fluid" can comprise a liquid medium or a gaseous medium. In a preferred embodiment, a fluid medium such as nitrogen gas at a preferred pressure of 2175 psi is employed. However, other mediums such as oil at pressures dictated by the particular application can also be successfully used.

In a "rod seal" device, such as this, the piston halves 59 do not compress the fluid, due to the passageway 63 which allows the fluid to flow across the piston 58. The piston halves 59 act only to guide and retain the piston rod 64. In a rod seal device, the fluid is compressed by the rod moving into the fluid chamber and taking up some of the volume used by the fluid. The force in a rod seal device is generated by the fluid pressure within the chamber 100 pushing on the rod end 68.

Figure 1:
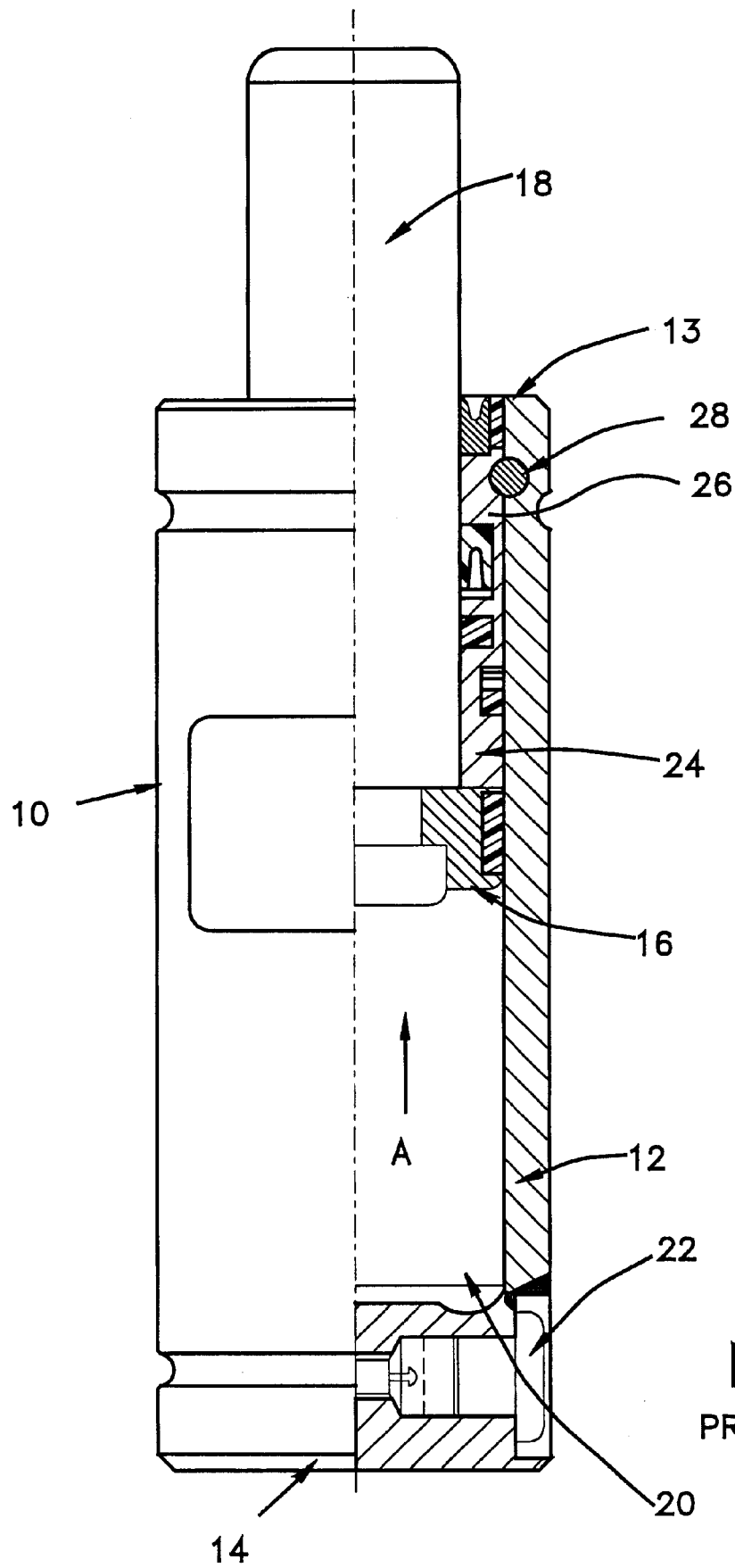
FIG. 1 is a partial cross-sectional view of a known cushion assembly, that is, a gas spring.
Figure 2:
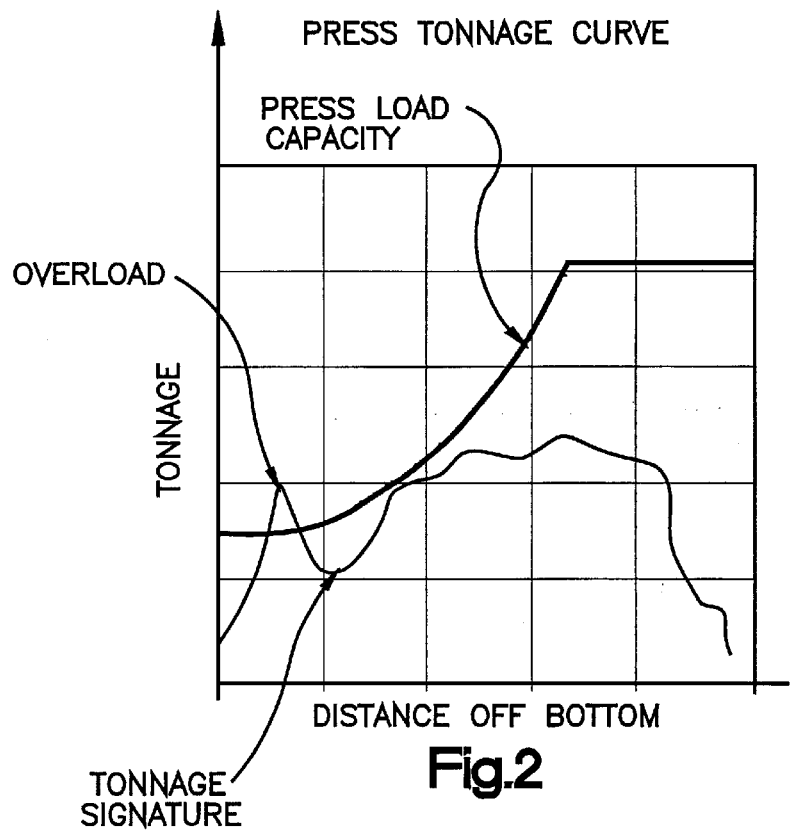
FIG. 2 is a graph of a tonnage curve of a conventional mechanical press.
Figure 8:
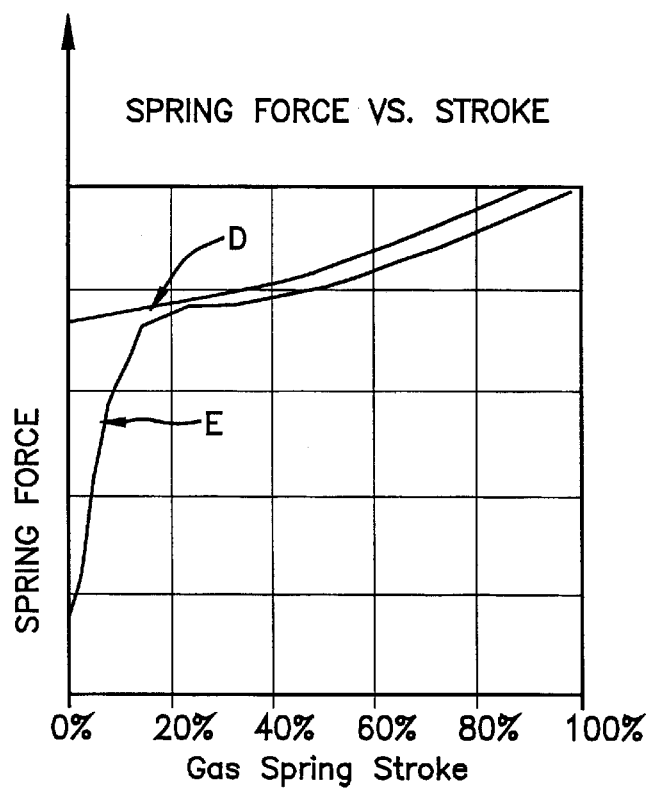
FIG. 8 is a graphical comparison of the force v. stroke curves of a known cushion assembly depicted in FIG. 1 and a press cushion assembly constructed according to the present invention.
Figure 3:
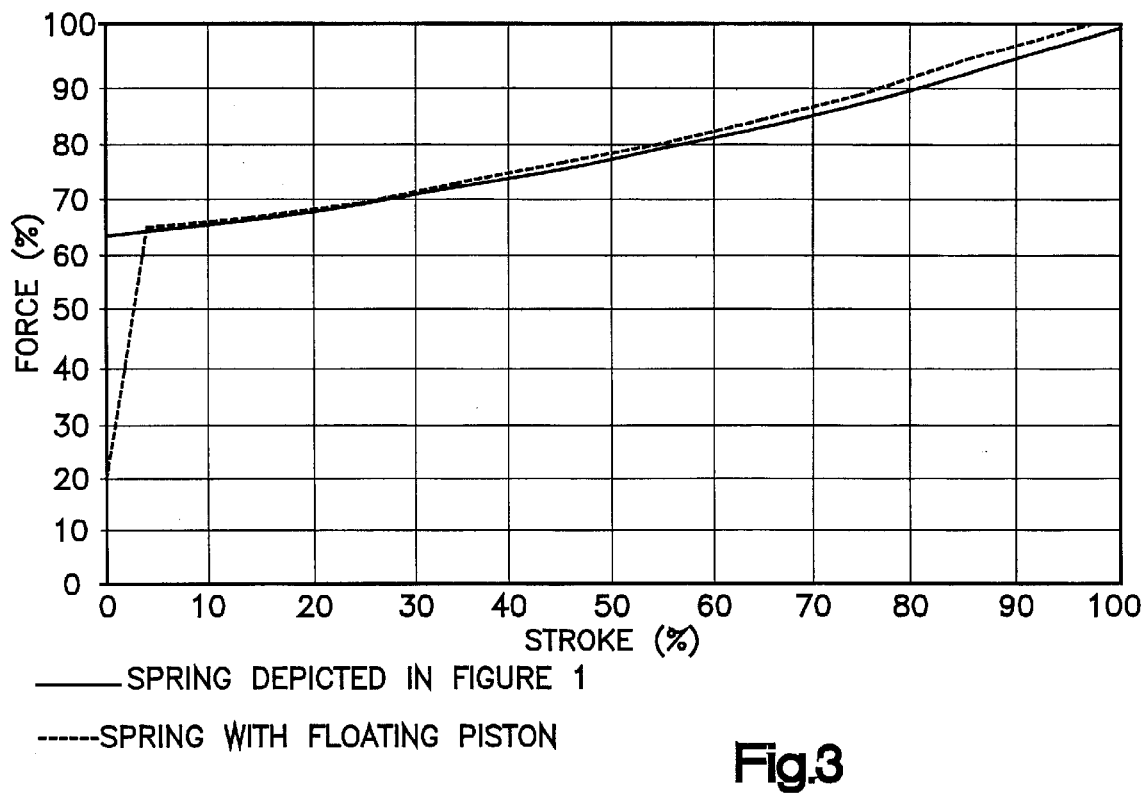
FIG. 3 is a graphical comparison of the force v. Stroke curves of a known cushion assembly depicted in FIG. 1 and a cushion assembly that employs a floating piston.
Figure 4:
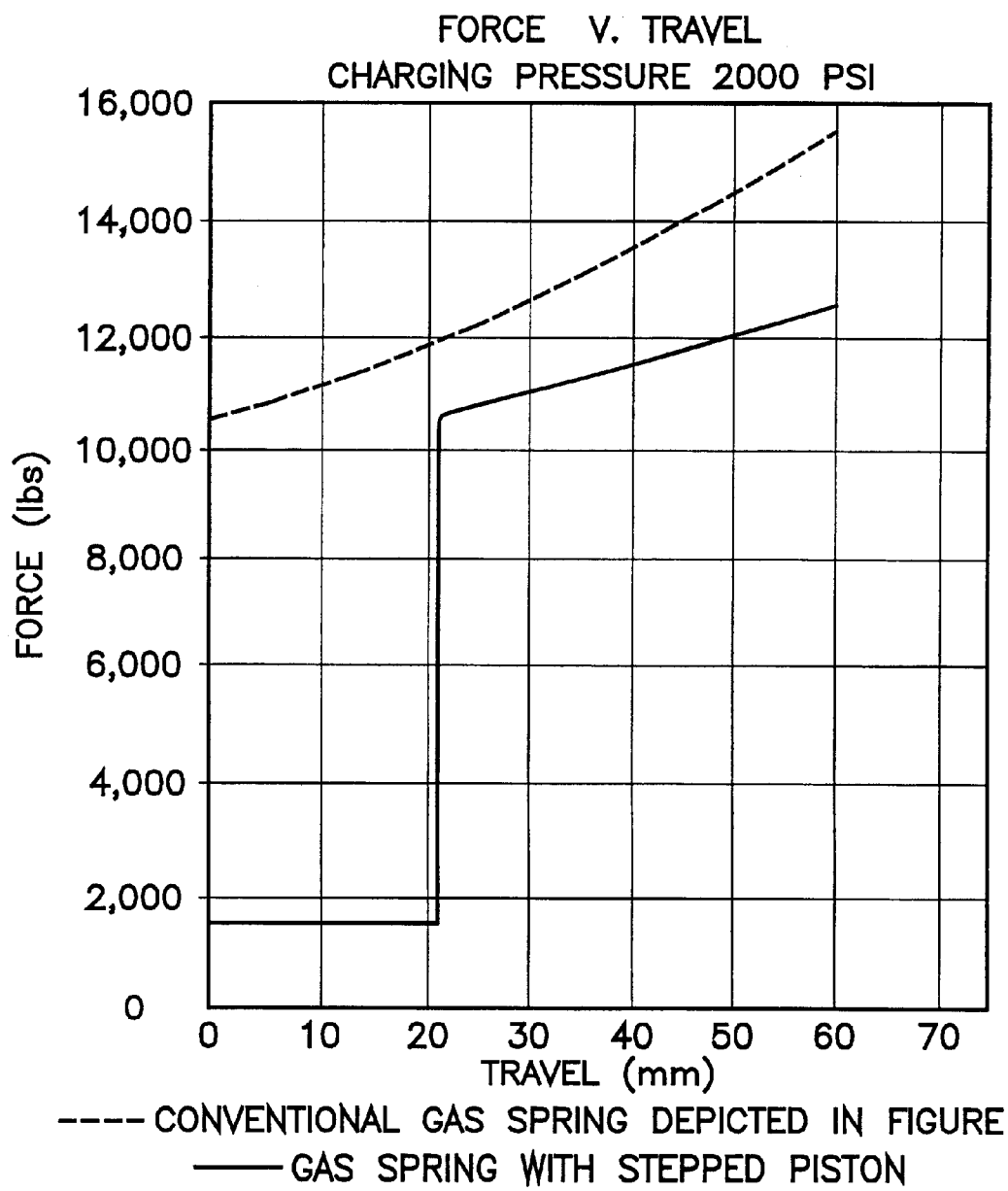
FIG. 4 is a force v. travel curve of a conventional cushion assembly that employs a stepped piston.
Figure 9:
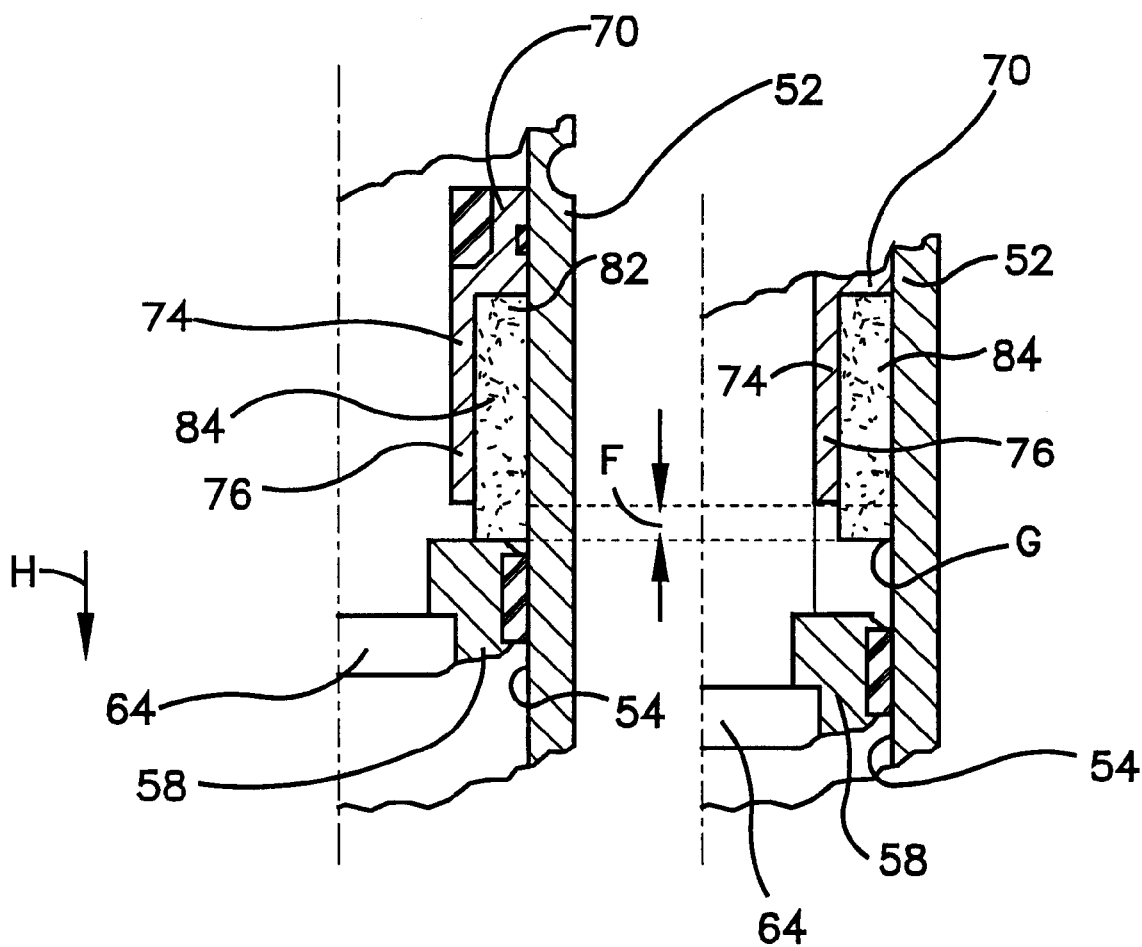
FIG. 9 is a partial cross-sectional view of portions of the press cushion assembly of FIG. 7 with the piston thereof in different compressed positions.

FIG. 8 is a graphical comparison of the force curves of a conventional spring member of the type depicted in FIG. 1 and the spring of the present invention shown in FIG. 7. Line "D" in that Figure represents the force curve for a conventional spring 10 of the type depicted in FIG. 1. Line "E" represents the force curve for a spring 50 of the present invention as shown in FIG. 7. As can be seen from FIG. 8, the force curve for spring 50 has a lower contact force (i.e., the force needed to initiate spring movement at 0%) than the force curve of spring 10. The bumper member 84 of the present invention serves to balance the force exerted on the piston rod 64 by the gas pressure within the chamber 100. The net force exerted by the piston rod 64 is reduced by the balancing force from the bumper member 84 as shown in FIG. 9. The characteristics of the resulting force curve of the spring 50 of the present invention (line E in FIG. 8) are controlled by the relative stiffness of the bumper member 84 as well as the compression distance "F" as shown in FIG. 9.

The resultant force curve "E" in FIG. 8 is the force curve for a conventional spring, such as shown by curve "D", minus the force required to compress the bumper. In FIG. 8, for a stroke greater than 20%, the bumper is preferably completely uncompressed and the curve "E" follows curve "D" (the two curves are shown slightly separated in FIG. 8 for clarity).

Initial compression of the piston rod 64 results in a diminishing balance force produced by the bumper member 84. Such balancing force is reduced to zero upon reaching position "G". As the piston rod 64 is further compressed in the "H" direction a distance greater than "F", the mode of operation of the spring 50 is dependent upon the fluid pressure within the chamber 100. Those of ordinary skill in the art will appreciate that the rigid retainer member 70 provides for a positive repeatable extended height of the piston rod 64 as well as acting as a compression limiter for the bumper member 84.

Figure 10:
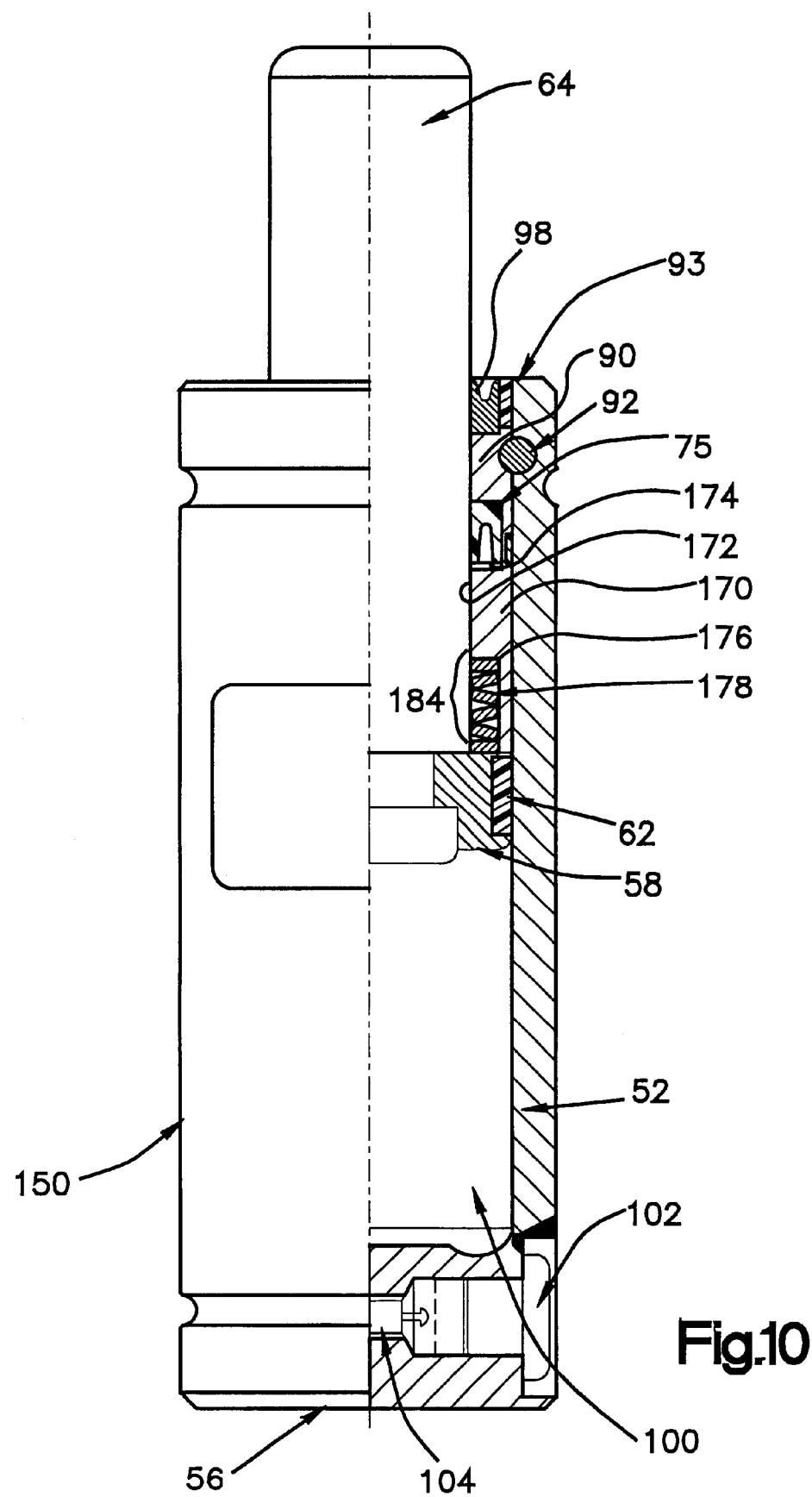
FIG. 10 is a partial cross-sectional view of another press cushion assembly constructed in accordance with the present invention.

FIG. 10 depicts another spring embodiment of the present invention. Preferably, the spring 150 has a construction that is identical to the construction of spring 50, except for the differences discussed below. In this embodiment, the retainer member 170 is cylindrical in shape and is fabricated from a rigid material such as steel. Retainer member 170 has a hole 172 extending therethrough for receiving the piston rod 64. A cavity 174 is provided in the upper end of the retainer member 170 for receiving a commercially available U-cup member 75 therein. A second cavity 176 is provided in the bottom portion of the retainer member 170 and is adapted to receive a collection of disc springs 178 (commonly known as Belleville washers) which collectively act as a bumper member 184. The skilled artisan will appreciate that the contact force characteristics achieved by such spring 150 construction can be altered by altering the number and strength of the Belleville springs 178.

Figure 11:
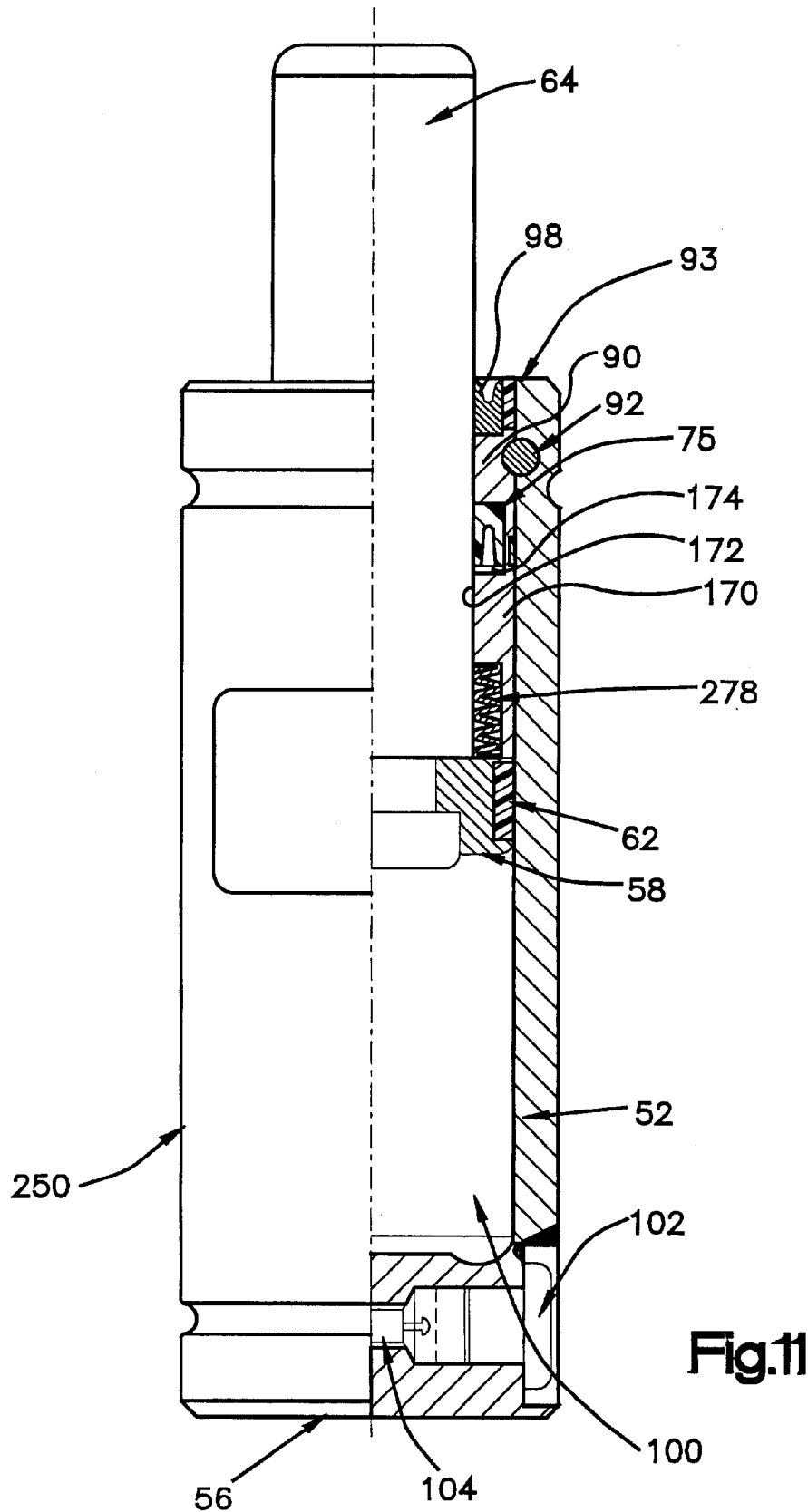
FIG. 11 is a partial cross-sectional view of another press cushion assembly constructed in accordance with the present invention.

FIG. 11 depicts another embodiment of the present invention. The spring 250 depicted in FIG. 11 is identical in construction as to the spring 150, except that the Belleville washers have been replaced with a commercially available coil spring 278. Again the skilled artisan will appreciate that the contact force characteristics of the spring 250 can be adjusted by altering the coil spring strength.

Figure 12:
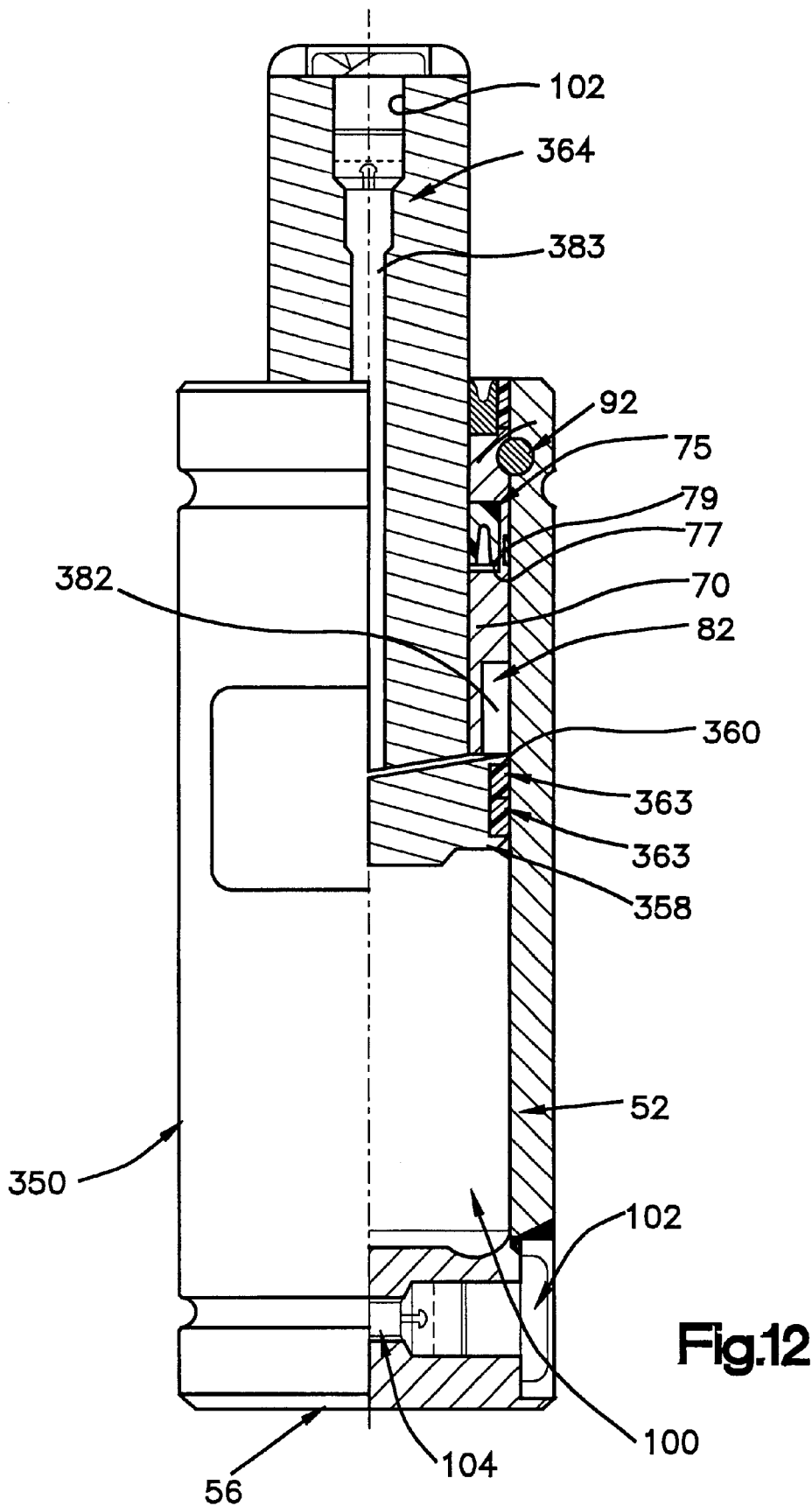
FIG. 12 is a partial cross-sectional view of another press cushion assembly constructed in accordance with the present invention.

Another embodiment of the present invention is depicted in FIG. 12. The spring 350 illustrated therein is substantially identical to spring 50 except for the differences discussed below. In this embodiment, piston rod 364 is integrally formed with the piston 358 from hardened steel. A cavity 360 is formed in the outer perimeter of the piston portion 358 for receiving a pair of commercially available U-cups 363 that serve to form a substantially fluid-tight sliding seal between the piston portion 358 and the body member 52. The cavity 82 in the rigid retainer member 70 forms a second fluid chamber 382 that is charged with a second amount of pressurized fluid, preferably nitrogen gas, through a secondary fill port 383 that is provided in the piston rod 364. A charge valve 102 is also provided in the end of the piston rod 364 to facilitate charging of chamber 382 and retention of the pressurized fluid therein. Thus, the gas in the second fluid chamber 382 serves as a bumper member for the piston 358. Those of ordinary skill in the art will appreciate that such novel arrangement of a piston that is rigidly affixed to the piston rod (e.g., non-floating), represents an improvement over springs that employ a floating piston rod and dual gas chambers because of the removal of the sliding seals on the outer and inner diameters of the floating piston, which could potentially leak, as well as the removal of the dynamic interaction between the friction of the floating piston seals and the ability of the floating piston to move freely and equalize pressure.

Figure 13:
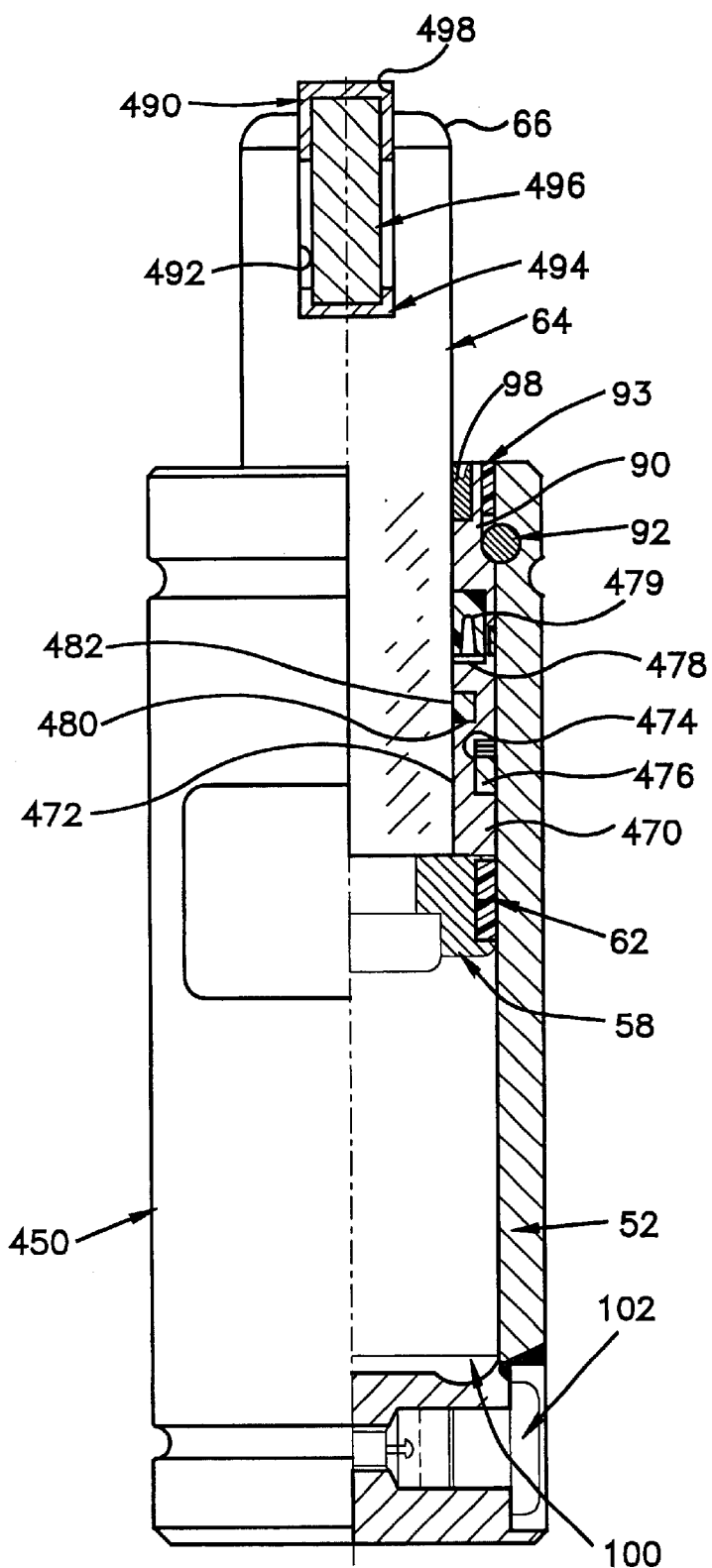
FIG. 13 is a partial cross-sectional view of another press cushion assembly constructed in accordance with the present invention.

FIG. 13 depicts another embodiment of the present invention. The spring 450 depicted in FIG. 13 is substantially similar to spring 50 except for the following differences. The piston rod retainer 470 is fabricated from rigid material such as steel and has a hole 472 therethrough for slidably receiving the piston rod 64. An annular cavity 474 is preferably provided in the outer circumference of the retainer 470 for receiving an O-ring 476 therein. O-ring 476 serves to establish a fluid-tight seal between the retainer member 470 and the body 52. Retainer 470 additionally has a cavity 478 therein that is adapted to receive a commercially available U-cup 479 therein. In addition, a second cavity 480 is provided in the retainer 470 for receiving a second O-ring 482 therein to establish a fluid-tight seal between the piston rod 64 and the retainer 470. Also in this embodiment a second piston 490 is affixed to the end 66 of the piston rod 64. More particularly and with reference to FIG. 13, a cavity 492 is provided in the end 66 of the piston rod 64. Preferably, a first piston support member 494 is received within the bottom of the cavity 492. Also in a preferred embodiment, an elastomeric material 496 such as urethane is received within the cavity 492 as shown. A second piston support member 498 is positioned over the elastomeric member 496 as shown in FIG. 13. Those of ordinary skill in the art will appreciate that the second piston arrangement of this embodiment of the present invention represents an improvement over prior springs that employ a stepped piston because of the reduction in the number of sliding seals, which could potentially leak. Also, the compression of an elastomer within a constrained volume generates a nonlinear force response that could be matched to the force of the spring, thereby removing the step response of the spring. Matching the compression of the elastomer with the force of the spring could remove sudden changes in force as the spring is compressed, thus reducing shock to the press and the die.

Figure 14:
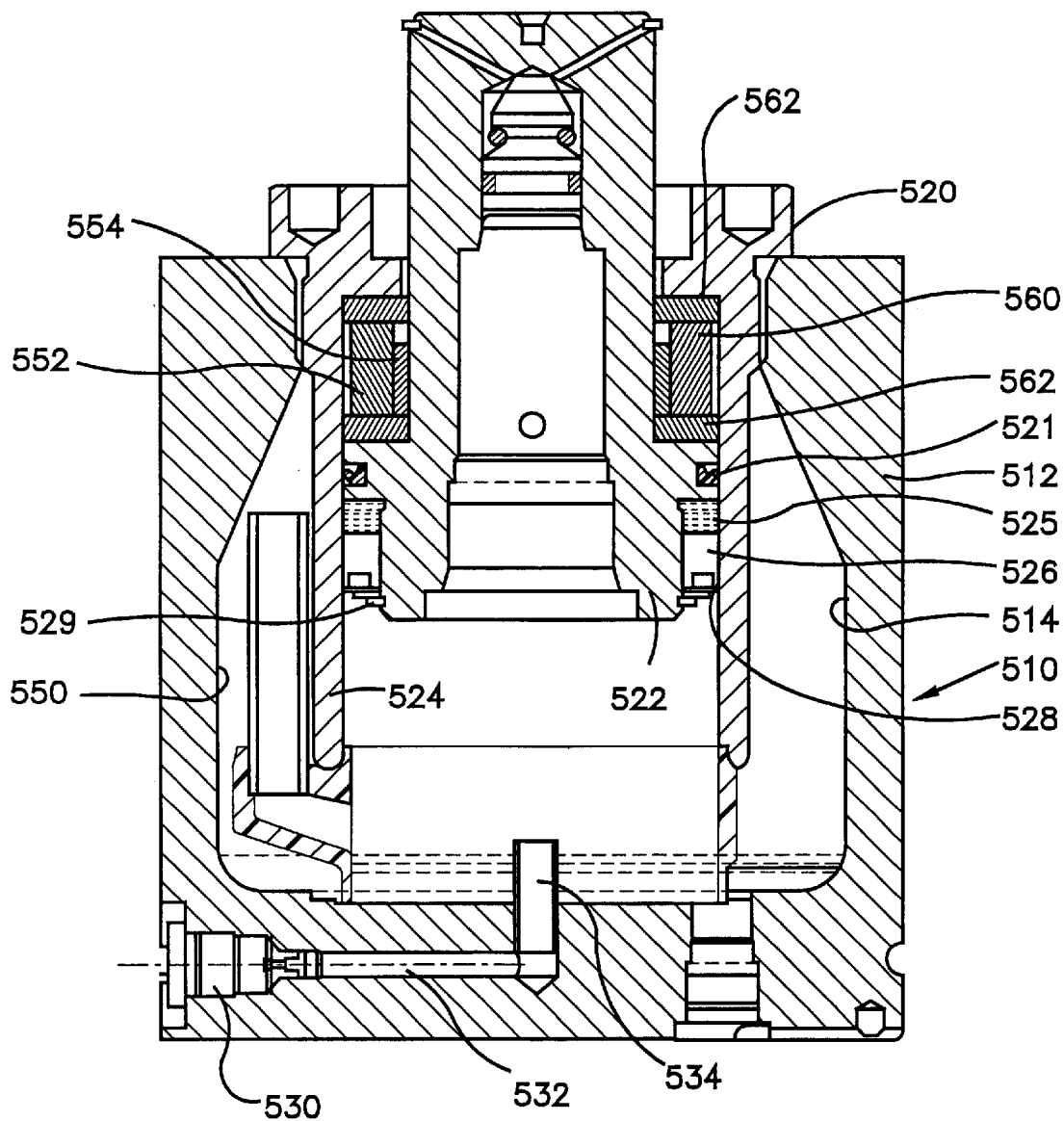
FIG. 14 is a partial cross-sectional view of another press cushion assembly constructed in accordance with the present invention.

The subject invention is also particularly well-suited for use in connection with spring assemblies that employ a self-lubricating piston arrangement. FIG. 14 depicts a spring assembly 510 that is constructed with a self-lubricating piston cylinder unit 520. The construction and operation of such a self lubricating piston is disclosed in U.S. Pat. No. 4,692,902 to Kadis, the disclosure of which is hereby incorporated by reference. Spring 510 includes a body 512 that defines a piston-receiving cavity 514 therein that is sized to receive a piston cylinder unit 520. Piston cylinder unit 520 is attached to the body 512 preferably by means of a threaded connection. The piston cylinder unit 520 includes a piston 522 that is adapted to slide within the piston cylinder wall member 524. Piston 522 is fitted with a U-cup seal member 528 to establish a fluid-tight seal between the cylinder wall 524 and the piston 522.

Figure 15:
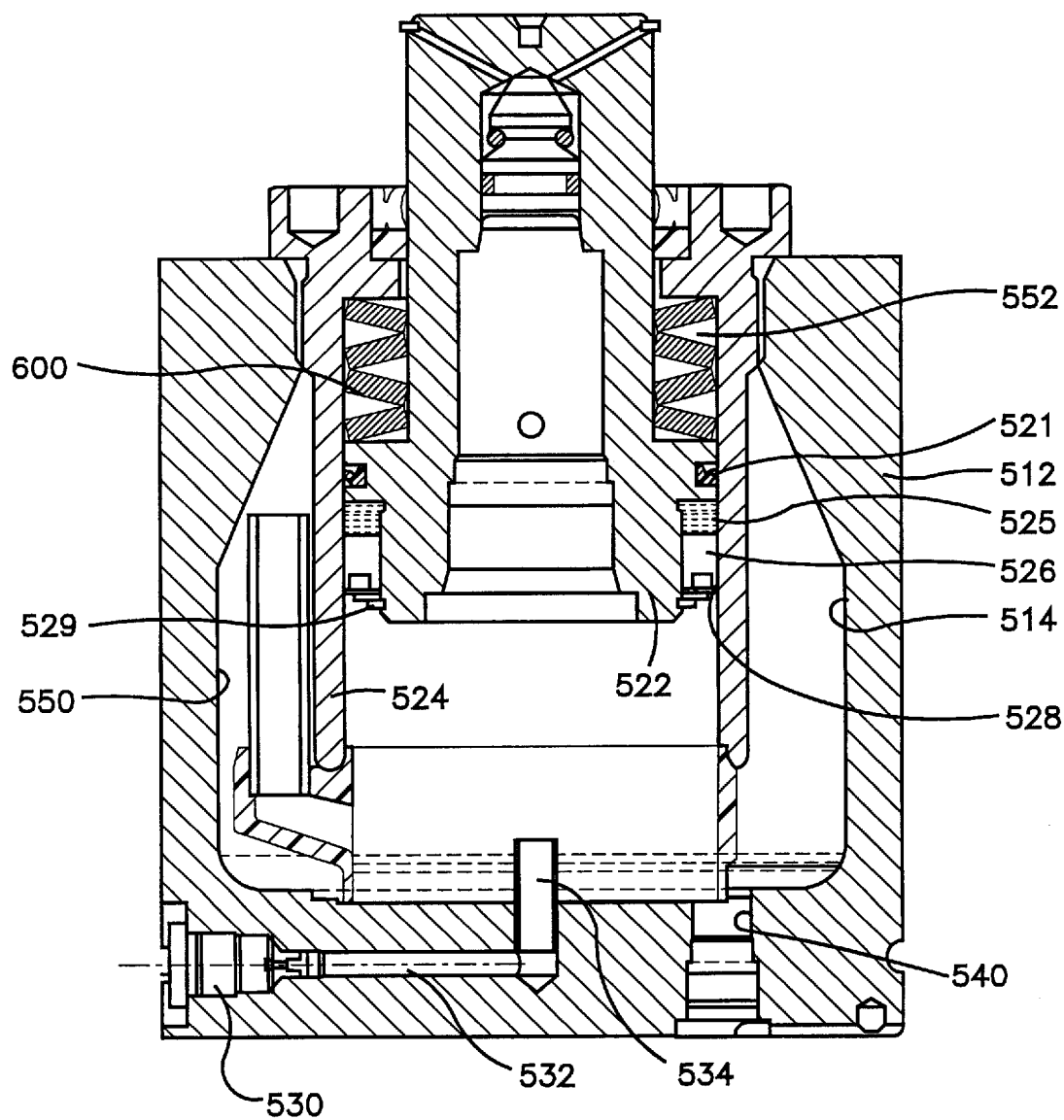
FIG. 15 is a partial cross-sectional view of another press cushion assembly constructed in accordance with the present invention.

A commercially available charge valve 530 is provided in the bottom of the body 512. The charge valve 530 communicates with a passage 532 that communicates with an upwardly extending standpipe 534. Such arrangement permits a compressible gas such as nitrogen to be admitted into the piston-receiving cavity 514. A lubricating medium 542 such as oil can be pumped into the piston-receiving cavity 514 through a lubrication passage 540 in the bottom of the body member 512. Body member 512 is also preferably formed with an oil expansion reservoir 550. When the piston 522 is compressed towards the bottom of the body 512, the gas and lubricating medium 542 is forced into the oil expansion reservoir 550. As the piston 522 extends towards the top of the body, the gas and lubricating medium 542 flow into the center of the spring, spraying lubricant on the piston 522 and cylinder 524. In this embodiment, a cavity 552 is formed between the piston 522 and the cylinder wall 524 as shown in FIG. 14. Preferably a steel sleeve 554 is provided around the piston 522 and an elastomeric bumper member 560 is provided between a pair of washers 562 as shown. The bumper member 560 is preferably comprised of urethane elastomer. However, other materials such as nitrile or fluorinated hydrocarbon could be successfully employed. FIG. 15 depicts another embodiment, wherein the elastomeric material of the embodiment of FIG. 14 has been replaced with a plurality of Belleville washers 600.

Figure 16:
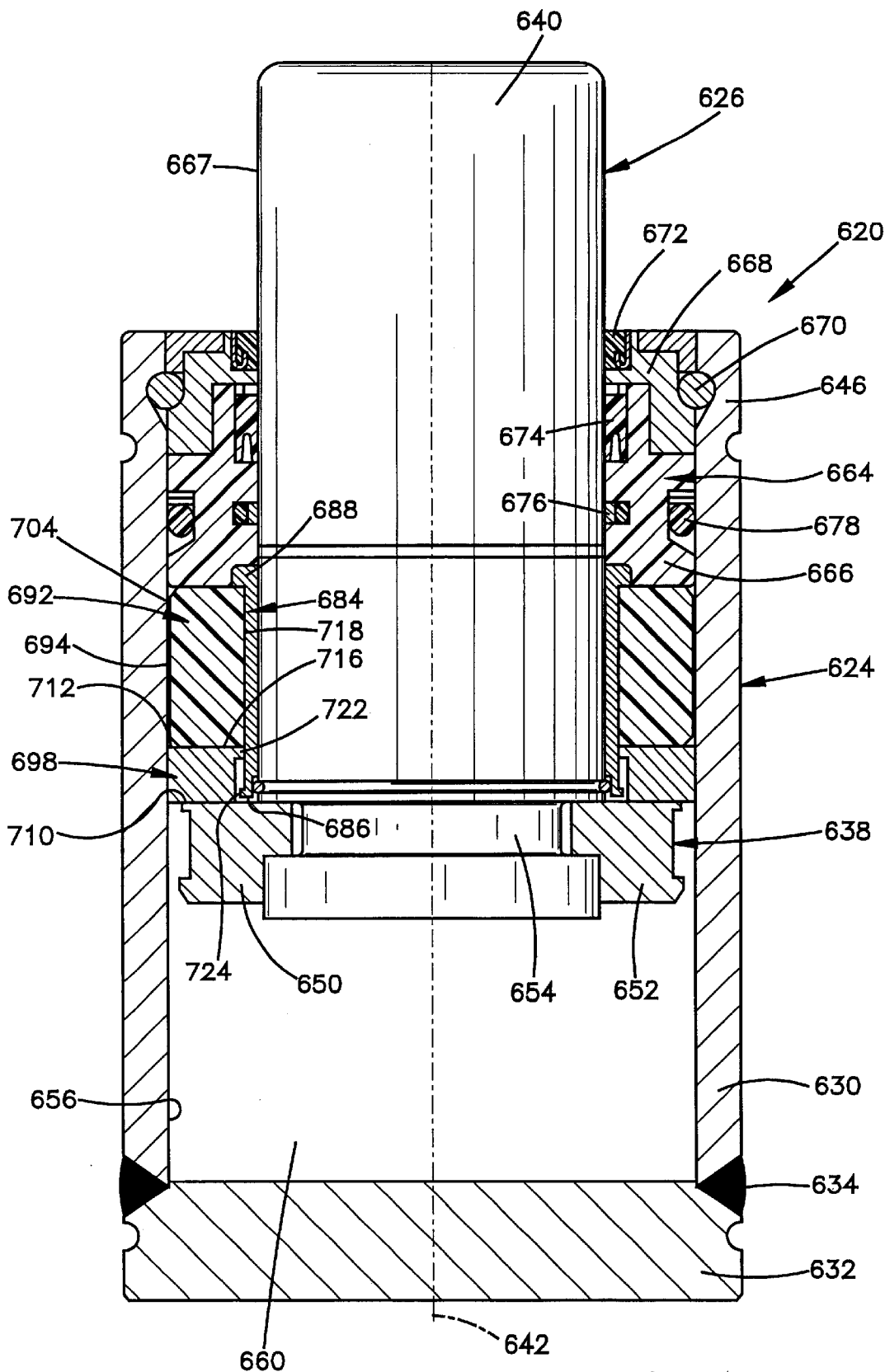
FIG. 16 is a sectional view of another cushion assembly constructed in accordance with the present invention, the cushion assembly being illustrated in an extended condition.

A press cushion assembly 620 constructed in accordance with another embodiment of the present invention is illustrated in FIG. 16. The press cushion assembly 620 is used in a press assembly, which may have a construction similar to the construction of the press assembly 30 illustrated in FIG. 5. However, rather than being associated with a lower member of the press assembly, as is illustrated schematically in FIG. 5, the cushion assembly 620 could be associated with an upper member in the press assembly, such as the slide plate 38. It should be understood that the press cushion assembly 620 could also be associated with movable draw rings in a press, in a manner similar to that disclosed in U.S. Pat. No. 5,003,807.

Any one of the embodiments of the cushion assemblies disclosed herein could be used in many different types of press assemblies which are operable from an open condition to a closed condition to deform a workpiece. The cushion assemblies disclosed herein may be used in association with many different components of a press assembly. For example, the cushion assemblies disclosed herein could be used in association with double action forming dies, ram levelers, bump dies, cam pads and returns, and/or multiple die sets.

Figure 17:
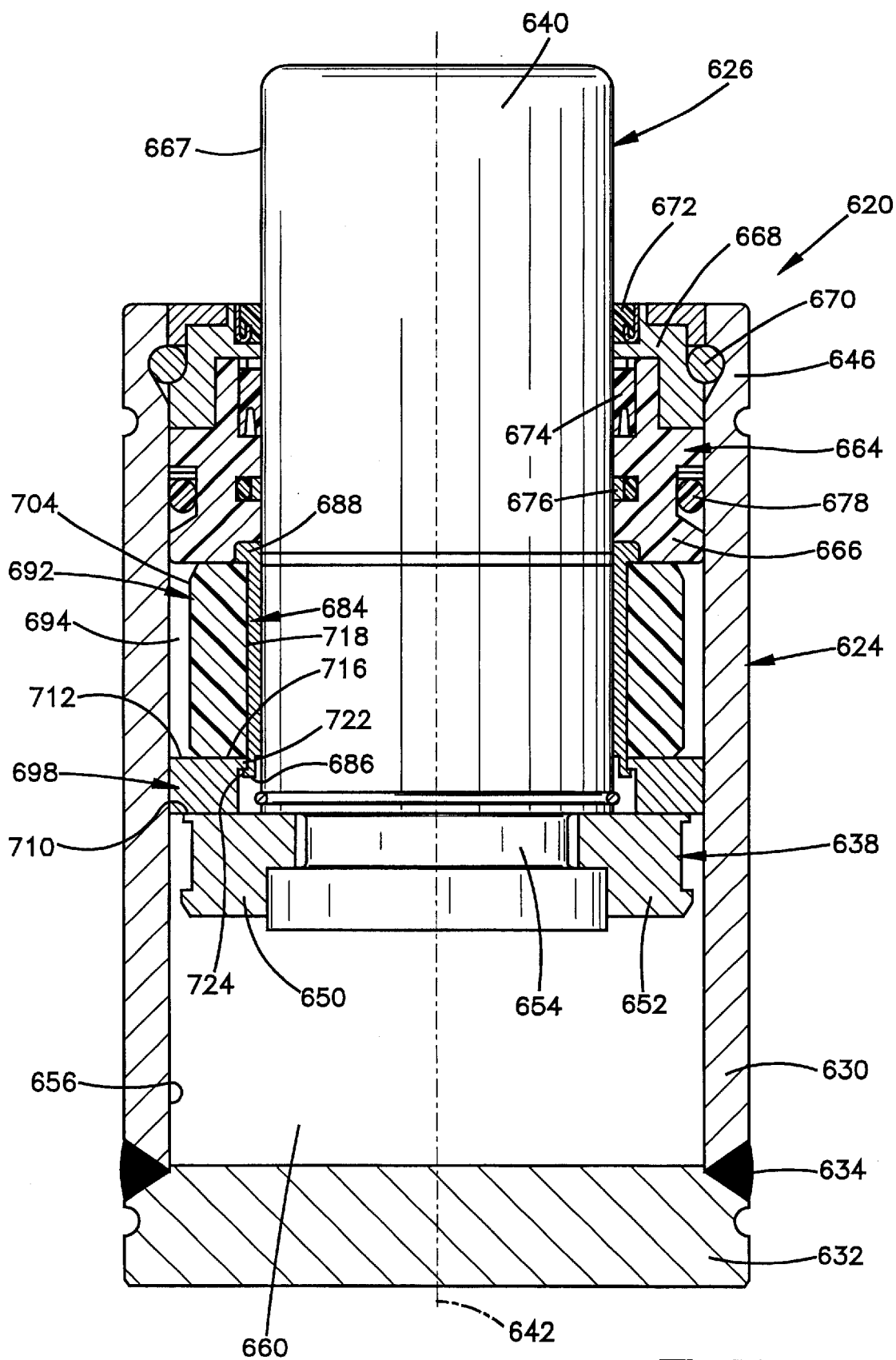
FIG. 17 is a sectional view of the cushion assembly of FIG. 16, the cushion assembly being shown in a partially retracted condition which occurs at the end of an initial period of retraction of the cushion assembly.
Figure 18:
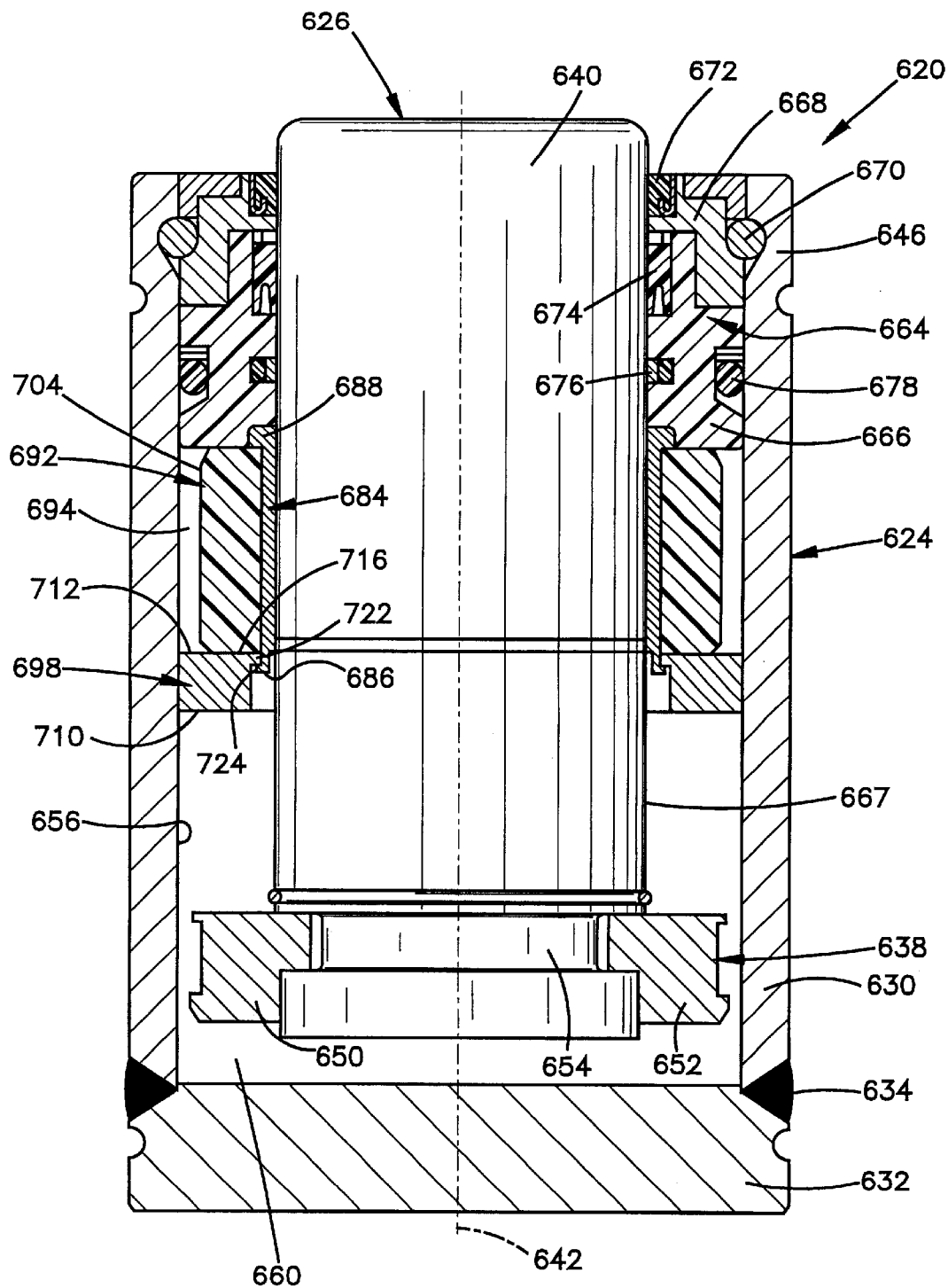
FIG. 18 is sectional view, generally similar to FIGS. 16 and 17, illustrating the cushion assembly in a fully retracted condition.

The press cushion assembly 620 is operable from an extended condition illustrated in FIG. 16 through a partially retracted condition, illustrated in FIG. 17, to a fully retracted condition, illustrated in FIG. 18. During operation of the press cushion assembly 620 from the extended condition to the retracted condition, the press cushion assembly provides a yieldable force opposing movement of one member in a press assembly, for example the slide plate 38 of FIG. 5, relative to another member in the press assembly, for example, the die 40. Of course, the press cushion assembly 620 could be used with other components of a press assembly.

The cushion assembly 620 includes a cylinder 624 (FIG. 16) and a piston 626. The cylinder 624 includes a cylindrical side wall 630 and a circular end wall 632. The side wall 630 and end wall 632 are interconnected at an annular weld 634. Rather than utilizing a separate cylinder 624, a plurality of cushion assemblies 620 could be associated with a manifold plate, in a manner similar to the disclosures in U.S. Pat. Nos. 4,583,722; 4,765,227; and 4,257,254.

The piston 626 includes a head end portion 638 and a rod end portion 640. The rod end portion 640 has a cylindrical configuration and is coaxial with a central axis 642 of the press cushion assembly 20. The rod end portion 640 of the piston 626 extends through an upper (as viewed in FIG. 16) end portion 646 of the cylinder 624.

The cylinder 624 may be connected with a lower portion of the press assembly 30 (FIG. 5) or connected with an upper portion of the press assembly. For example, the cylinder 624 could be connected with a stationary base of the press assembly. If the cylinder 624 is connected with the stationary base of the press assembly 30, the cushion assembly 620 would be disposed in the orientation illustrated in FIG. 16 with the piston 626 extending upward from the cylinder 624. Alternatively, the cylinder 624 could be associated with the movable slide plate 38 of the press assembly. If this is done, the orientation of the press cushion assembly 620 would be offset by 180° from the orientation illustrated in FIG. 16 so that the piston 626 would extend downward from the cylinder 624.

The head end portion 638 of the piston 626 includes a pair of flange members 650 and 652 which extend into an annular groove 654. Each of the flange members 650 and 652 has a semicircular configuration. The flange members 650 and 652 are disposed in a circular array having its center on the axis 642. It should be understood that the flange members 650 and 652 do not sealingly engage a cylindrical inner side surface 656 of the cylinder 624. One or more openings may be provided between the flange members 650 and 652.

The cylinder 624 cooperates with the piston 626 to define a variable volume chamber 660. The chamber 660 holds a fluid, such as nitrogen gas, under pressure. Of course, fluids other than nitrogen gas could be utilized.

The cylinder 624 includes a guide assembly 664 which guides movement of the piston 626 relative to the inner side surface 656 of the side wall 630 of the cylinder 624. The guide assembly 664 has a central axis which is coincident with the axis 642. The guide assembly 664 includes an annular metal guide ring 666 which engages a cylindrical outer side surface 667 of the rod end portion 640 of the piston 626. The guide ring 666 guides movement of the rod end portion 640 of the piston 626 relative to the cylinder 624.

An annular metal end cap 668 abuts the guide ring 666 and holds the guide ring in place in the cylinder 624 during reciprocation of the piston 626. An annular retainer ring 670 transmits force between the end cap 668 and the side wall 630 of the cylinder 624 to hold the end cap in place. Suitable annular seals 672, 674, 676, and 678 cooperate with the end cap 668 and guide ring 666 to prevent leakage of fluid from the cylinder 624.

When the cushion assembly 620 is in the extended condition illustrated in FIG. 16, the flange members 650 and 652 on the head end portion 638 of the piston 626 are pressed firmly against a stop member 684 by fluid pressure in the chamber 660. Force is transmitted from the stop member through the guide ring 666 and end cap 668 to the cylindrical side wall 630 of the cylinder 624 through the annular retainer ring 670. The stop member 684 is formed by a rigid metal sleeve having a tubular cylindrical configuration. A central axis of the tubular stop member 684 is coincident with the axis 642.

An annular end surface 686 on the stop member 684 (FIG. 16) abuts an annular surface area on radially inner portions of the flange members 650 and 652. The end surface 686 on the stop member 684 and the flange members 650 and 652 cooperate to limit upward (as viewed in FIG. 16) movement of the piston 626 under the influence of fluid pressure in the chamber 660. An upper end portion 688 of the cylindrical stop member 684 is fixedly connected with the guide ring 666.

In accordance with one of the features of the embodiment of the cushion assembly illustrated in FIG. 16, a body 692 of elastomeric material is disposed in an annular chamber 694. The annular chamber 694 extends around and is coaxial with the rod end portion 640 of the piston 626. The chamber 694 is formed between a rigid metal annular force transmitting member 698 and the annular guide ring 666. The annular force transmitting member 698 is coaxial with and is pressed against the annular body 692 of elastomeric material by the flange members 650 and 652 on the head end portion 638 of the piston.

Although the body 692 of elastomeric material has a tubular cylindrical overall configuration and an annular cross-sectional configuration, it is contemplated that the body of elastomeric material could have a different configuration if desired. Of course, the chamber 694 and force transmitting member 698 could have configurations which are different than the illustrated annular configuration. If desired, a plurality of force transmitting members could be provide to transmit force from the body 692 of elastomeric material to the head end portion 638 of the piston. For example, a plurality of rod-shaped force transmitting members could be utilized to transmit force from a plurality of separate bodies of elastomeric material or from a single body of elastomeric material. However, it is believed that it will be preferred to utilize the illustrated annular configuration of the body 692 of elastomeric material and force transmitting member 698 in order to provide the press cylinder assembly 620 with a compact construction.

If the body 692 of elastomeric material is formed with the preferred tubular configuration illustrated in FIGS. 16-20, it is contemplated that axially extending inner and/or outer side surfaces of the body of elastomeric material could have configurations other than the illustrated configurations. For example, the inner and outer side surfaces could be axially curved throughout the length of the side surfaces or adjacent axially opposite ends of the body 292 of elastomeric material. Thus, the inner side surface of the body 292 of elastomeric material could have arcuate surface areas which flare radially outward adjacent to axially opposite ends of the body of elastomeric material. Similarly, the outer side surface of the body 292 of elastomeric material could have arcuate surface areas which taper radially inward adjacent to axially opposite ends of the body of elastomeric material.

When the cushion assembly 620 is in the extended condition illustrated in FIG. 16, the tubular cylindrical body 692 of elastomeric material is axially compressed from its initial or free length by force applied against one end of the annular body of elastomeric material by the force transmitting member 698. The cylindrical stop member 684 extends around the rod end portion 640 of the piston 626 and is coaxial with the body 692 of elastomeric material and the flange members 650 and 652. The stop member 684 limits the extent of axial compression of the body 692 of elastomeric material.

The body 692 of elastomeric material has a substantially constant volume. Therefore, when the body 692 of elastomeric material is axially compressed from its initial or free configuration, as illustrated in FIG. 16, the body of elastomeric material expands radially. The body 692 of elastomeric material is sized so that radially outward expansion of the body of elastomeric material does not result in engagement of a cylindrical outer side surface 704 on the body of elastomeric material with the cylindrical inner side surface 656 on the side wall 630. Therefore, radial force components are not transmitted between the body 692 of elastomeric material and the side wall 630 of the cylinder 624 when the cushion assembly 620 is in the extended condition illustrated in FIG. 16.

When the cushion assembly 620 is in the extended condition of FIG. 16, the associated press assembly is in the open condition, similar to the condition illustrated in FIG. 5 for the press assembly 30. At this time, the fluid pressure in the chamber 660 is effective to press the flange members 650 and 652 on the head end portion 638 of the piston 626 firmly against the annular end surface 686 on the stop member 684. The stop member 684 limits the extent of upward (as viewed in FIG. 16) movement of the head end portion 638 of the piston 626 under the influence of fluid pressure in the chamber 660.

The flange members 650 and 652 on the head end portion 638 of the piston 626 are firmly pressed against an annular lower (as viewed in FIG. 16) side surface 710 of the force transmitting member 698. The annular lower side surface 710 on the force transmitting member 698 engages the flange members 650 and 652 at a location radially outward from the location where the end surface 686 on the stop member 684 engages the flange members. Therefore, when the cushion assembly 620 is in the extended condition of FIG. 16, the fluid pressure in the chamber 660 is effective to press the flange members 650 and 652 on the head end portion 638 of the piston 626 against both the stop member 684 and force transmitting member 698. However, it is the stop member 684 which limits the extent of upward movement of the piston 626.

An annular upper side surface 712 on the force transmitting member 698 is pressed firmly against an annular lower side surface 716 on the body 692 of elastomeric material. This results in the body 692 of elastomeric material being compressed between the force transmitting member 698 and the guide ring 666 in the guide assembly 664. The body 692 of elastomeric material provides a biasing force which presses the force transmitting member 698 firmly against the head end portion 638 of the piston 626.

The forces applied against axially opposite ends of the body 692 of elastomeric material are effective to compress the body of elastomeric material in an axial direction, that is, in a direction parallel to the central axis 642 (FIG. 16) of the cushion assembly 620. However, the flange members 650 and 652 on the head end portion 638 of the piston 626 are also pressed firmly against the stop member 684 which limits the extent of axially upward (as viewed in FIGS. 16 and 19) movement of the piston 626. Of course, this limits the extent of axial compression of the body 692 of elastomeric material.

During axial compression of the body 692 of elastomeric material, the body of elastomeric material expands in a radially outward direction. The radial expansion of the body 692 of elastomeric material results in the total volume of the body of elastomeric material remaining constant as the body of elastomeric material is axially compressed. The cylindrical stop member 684 engages a cylindrical inner side surface 718 on the body 692 of elastomeric material to block radially inward expansion of the body of elastomeric material. Therefore, the body 692 of elastomeric material expands only in a radially outward direction as the body of elastomeric material is axially compressed. However, the inner side surface 718 could flare radially outward so as to provide some space between the cylindrical stop member 684 and inner side surface 718 when the cushion assembly is in the fully retracted condition of FIG. 18.

As was previously mentioned, when the cushion assembly 620 is in the extended condition of FIGS. 16 and 19, the cylinder outer side surface 704 of the body 692 of elastomeric material is spaced a relative small radial distance from the inner side surface 656 of the side wall 630. Therefore, the body 692 of elastomeric material is not effective to apply radially outward forces against the side wall 630 of the cylinder 624.

As the press assembly is operated from the open condition toward the closed condition, a downwardly moving upper member in the press assembly, connected with the slide plate 38 of the press 30, moves into engagement with the rod end portion 640 of the piston 626. As this occurs, force is transmitted from the upper member in the press assembly to the rod end portion 640 of the piston 626. This force initiates downward movement (as viewed in FIGS. 16 and 19) of the piston 626 and operation of the cushion assembly 620 from the extended condition of FIG. 16 toward the fully retracted condition of FIG. 18.

In accordance with one of the features of the present invention, throughout an initial portion of operation of the cushion assembly 620, that is, during operation of the cushion assembly from the extended condition of FIG. 16 to the partially retracted condition of FIG. 17, the body 692 of elastomeric material is effective to provide force which is applied against the head end portion 638 of the piston 626 by the force transmitting member 698. The force transmitted from the body 692 of elastomeric material to the piston 626 urges the piston away from the upper end portion 646 of the cylinder 624 against the influence of the fluid pressure in the chamber 660. Thus, the body 692 of elastomeric material provides a preload or biasing force which assists the press in operating the cushion assembly 620 from the extended condition toward the retracted condition.

In the press 30 of FIG. 5, the body 692 of elastomeric material assists the force transmitted from the flywheel 34 and crankshaft 36 through the slide plate 38 to the cushion assembly 620. The combined forces applied to the piston 626 by the press and the body 692 of elastomeric material move the piston downward (as viewed in FIG. 16) against the influence of the fluid pressure in the chamber 660.

The biasing force transmitted from the body 692 of elastomeric material to the head end portion 638 of the piston 626 tends to minimize shock loading on components of the press, such as the press 30 of FIG. 5, during operation of the cushion assembly 620 from the extended condition of FIG. 16 to the partially retracted condition of FIG. 17. This is because the magnitude of the force which must be applied to the cushion assembly 620 by the press upon initiation of operation of the cushion assembly from the extended condition of FIG. 16 is reduced by an amount corresponding to the magnitude of the biasing force transmitted from the elastomeric material 692 to the head end portion 638 of the piston 626 through the force transmitting member 698. Of course, reducing the force which is required to initiate movement of the piston 626 relative to the cylinder 624 reduces shock loading on the components of the press. The manner in which shock loading on components of the press assembly is reduced is the same as was previously explained in conjunction with FIGS. 1 through 15 herein.

As the piston 626 is moved into the chamber 660, the volume of the chamber is decreased and, therefore, the pressure of the fluid in the chamber is increased. Simultaneously therewith, the flange members 650 and 652 and force transmitting member 698 move downward (as viewed in FIG. 16) away from the upper end portion 646 of the cylinder 624. As this occurs, the body 692 of elastomeric material expands axially and contracts radially. Radial contraction of the body 692 of elastomeric material reduces the diameter of the cylindrical outer side surface 704 on the body of elastomeric material. The force which is transmitted from the body of elastomeric material 692 through the force transmitting member 698 to the head end portion 638 of the piston 626 decreases as the body 692 of elastomeric material expands toward its initial or free condition.

At the end of the initial movement of the piston 626 relative to the cylinder 624 (FIG. 17), an annular flange 722 (FIG. 19) on the force transmitting member 698 moves downward into engagement with an annular flange 724 on the stop member 784 (FIG. 20). Thus, during initial operation of the cushion assembly 620 from the extended condition of FIGS. 16 and 19 to the partially retracted condition of FIG. 17, the force transmitting member 698 moves axially downward (as viewed in FIGS. 16 and 19) to the position shown in FIG. 17. During operation of the cushion assembly 620 from the extended condition of FIG. 16 to the partially retracted condition of FIG. 17, the force transmitting member 698 moves through an axial distance which is between three and fifty percent (3 and 50%) of the total distance which the head end portion 638 of the piston 626 moves between the extended position of FIG. 16 and the fully retracted position of FIG. 18.

At the end of the initial operation of the press cushion assembly 620 from the extended condition (FIG. 16) to the partially retracted condition of FIG. 17, the annular flange 722 on the upper end portion of the force transmitting member 698 is disposed in abutting engagement with an annular flange 724 (FIG. 20) on the stop member 684. At this time, the annular body 692 of elastomeric material has expanded axially and contracted radially from the compressed condition of FIG. 16 to or almost to its initial or unrestrained condition illustrated in FIG. 17. The initial shock loading on the components of the press assembly will have been at least partially dissipated by compression of the fluid (nitrogen gas) in the cylinder chamber 660. The magnitude of the initial shock on the components of the press assembly will have been reduced due to the assistance provided by force transmitted from the body 692 of elastomeric material to the head end portion 638 of the piston 626.

When the cushion assembly 620 is in the partially retracted condition of FIG. 17, the body 692 of elastomeric material is held between the force transmitting member 698 and the guide ring 666. At this time, the body 692 (FIG. 17) of force transmitting material has an axial extent which is equal to or only slightly less than the axial extent of the body 692 of the body of elastomeric material when the body is in an unrestrained or free condition. The upper end portion 688 of the stop member 684 is fixedly connected with the guide ring 666. The annular flange 724 on the lower end portion of the stop member 684 has an annular motion limiting surface which is disposed in abutting engagement with an annular flange 722 of the force transmitting member 698. Therefore, the force transmitting member 698 is held in the position shown in FIG. 20 and axial movement of the body 692 of elastomeric material is blocked.

As the press assembly continues to operate from the open condition toward the closed condition, the piston 626 is forced downward from the partially retracted position shown in FIG. 17 to the fully retracted position shown in FIG. 18.

As this occurs, the body 692 of elastomeric material and force transmitting member 698 remain stationary relative to the cylinder 624. The fluid in the chamber 660 is further compressed by the head end portion 638 of the piston 626 to further cushion operation of the press assembly from the open condition to the closed condition.

It should be understood that, ignoring transient dynamic conditions, the fluid pressures on opposite sides of the flange members 650 and 652 are the same when the cushion assembly 620 is in the fully retracted condition of FIG. 18. This is because the flange members 650 and 652 are not disposed in sealing engagement with the inner side surface 656 of the side wall 630 of the cylinder 624. The force transmitting member 710 and body 692 of elastomeric material are exposed to the fluid pressure in the chamber 660. However, the body 692 of elastomeric material is effective to hold the flange 722 on the force transmitting member 698 in abutting engagement with the flange 724 on the stop member 684 (FIG. 20).

The effective cross sectional area of the piston 626 in compressing the gas in the chamber 660 is equal to the circular cross sectional area of the cylindrical rod end portion 640 of the piston. However, it is contemplated that the piston 626 could have a different construction. For example, the head end portion 638 of the piston could be constructed so as to sealingly engage the inner side surface 656 of the side wall 630 of the cylinder 624. Of course, this will result in the piston 626 having a larger effective area to compress the fluid in the chamber 660.

If desired, the flange members 650 and 652 could be omitted. The head end portion 638 of the piston 626 could be integrally formed as one piece with the rod end portion 640 of the piston. If this is done, suitable seal elements may or may not be provided between the head end portion 638 of the piston 626 and the inner side surface 656 of the cylinder 624.

After the press assembly has been operated to the closed condition and a metal workpiece deformed by dies in the press assembly, the press assembly is operated from the closed condition back to the open condition. Operating the press assembly to the open condition facilitates removal of the workpiece from the press assembly. As the press assembly is operated to the open condition, the cushion assembly 620 is operated from the fully retracted condition of FIG. 18 to the extended condition of FIG. 16 under the influence of the fluid pressure in the chamber 660.

During operation of the press assembly from the closed condition toward the open condition, the piston 626 moves upward (as viewed in FIG. 18) relative to the cylinder 624. As this occurs, the flange members 650 and 652 move toward the annular force transmitting member 698 under the influence of fluid pressure applied against the head end portion 638 of the piston 626. As the piston 626 moves upward (as viewed in FIG. 18) relative to the cylinder 624, the flange members 650 and 652 move into initial engagement with the force transmitting member 698 (FIG. 17). At this time, force is being transmitted between the rod end portion 640 of the cushion assembly 620 and the upper member or slide plate 38 (FIG. 6) of the press assembly.

Upon engagement of the flange members 650 and 652 with the force transmitting member 698 (FIG. 17), axial compression of the body 692 of elastomeric material is initiated. As the body 692 of elastomeric material is axially compressed, the volume of the body 692 of elastomeric material remains constant. Therefore, the cylindrical outer side surface 704 of the body 692 of elastomeric material expands radially outward toward the inner side surface 656 of the cylindrical side wall 630.

The force required to compress the body 692 of elastomeric material reduces shock loading on components of the cushion assembly 620 as the cushion assembly 620 operates to the extended condition of FIG. 16. As the body 692 of elastomeric material is axially compressed and radially expanded, the body 692 of elastomeric material absorbs some of the kinetic energy of the piston 626. This stored or potential energy will, on the next cycle of operation of the press assembly, be used to assist the press assembly in operating the cushion assembly 620 from the extended condition of FIG. 16 back toward the retracted condition of FIG. 18. Thus, the body 692 of elastomeric material stores energy which is subsequently released to assist the press assembly in operating the cushion assembly 620 to thereby reduce shock loading on components of the press assembly upon initiation of operation of cushion assembly from the extended condition toward the retracted condition.

The foregoing description of the mode of operation of the cushion assembly 620 has assumed that the cushion assembly is connected with a member in a lower portion or base of the press assembly and is axially compressed by engagement with a member in an upper or movable portion of the press assembly. However, it is contemplated that the cushion assembly 620 could be mounted on a movable upper member of the press assembly and engage a stationary lower member in the base of the press assembly. If this was done, the orientation of the cushion assembly would be changed by 180° from the orientation illustrated in FIG. 16.

When the cushion assembly 620 is mounted on a movable member in the upper portion of a press, the rod end portion 640 of the piston 626 would extend downward from the cylinder 624. The cylinder 624 would be fixedly connected with the movable member in the upper portion of the press. The rod end portion 640 of the piston 626 would move into engagement with a member in the lower or base portion of the press assembly.

It is contemplated that the body 692 of elastomeric material could have many different compositions. Thus, the body 692 of elastomeric material could be a cast elastomer or thermoplastic material. The body 692 may be a urethane based material. It is believed that it may be preferred to use a polyurethane formulated with "HYLENE" (trademark)-PPDI (p-phenylene diisocyanate). Thermoplastic materials based on p-phenylene diisocyanate have mechanical properties which enable the materials to withstand severe distortion over a relatively wide range of operating temperatures. The body 692 of elastomeric material has a Bayshore rebound percentage of forty to seventy percent (40 to 70%) and Shore A hardness number of 90. Although it is preferred to use a polyurethane which is p-phenylene diisocyanate based, it is contemplated that the body 692 of elastomeric material could have a different composition if desired. For example, the body 692 could be formed of urethane.

The body 692 of elastomeric material expands through an axial distance which varies as a function of the size of the cushion assembly 620 and the distance which the piston 626 moves relative to the cylinder 624. Depending on the size of the cushion assembly 620 and the press with which the cushion assembly is used, during operation of the cushion assembly 620 from the extended condition of FIG. 16 to the fully retracted condition of FIG. 18, the piston 626 may move through a distance between 0.900 of an inch and 7.0 inches relative to the side wall 630 of the cylinder 624. Depending upon the distance which the piston 626 is moved relative to the side wall 630 of the cylinder 624, the body 692 of elastomeric material is effective to apply force to the head end portion 638 of the piston 626 during at least three percent (3%) and less than fifty percent (50%) of the movement of the piston 626 between the extended condition (FIG. 16) and the fully retracted condition (FIG. 18). Of course, the specific percentage of the movement of the piston during which force is applied by the body 692 of elastomeric material will depend upon the specific construction of the cushion assembly 620 and the construction of the press with which the cushion assembly is used.

When the cushion assembly 620 is in the fully retracted condition of FIG. 18, the body 692 of elastomeric material has an axial extent (length) which is twenty percent (20%) or more greater than the axial extent (length) of the body of elastomeric material when the cushion assembly is in the extended condition of FIG. 16. Thus, if the body 692 of elastomeric material has a length of 1.00 inches when the cushion assembly 620 is in the extended condition of FIG. 16, the body of elastomeric material will have a length of 1.20 inches or more when the cushion assembly 620 is in the fully retracted condition of FIG. 18.

The extent of axial compression and subsequent expansion of the body 692 of elastomeric material will determine the extent of operation of the press assembly during which the body of elastomeric material is effective to provide force urging the piston 626 toward the retracted condition. In order to minimize operating loads to which the press is subjected, it is believed that it will be preferred to have thirty-five to forty-five percent (35 to 45%) axial expansion of the body 692 of elastomeric material during operation of the cushion assembly 620 from the extended condition (FIG. 16) to the fully retracted condition. Thus, if the body 692 of elastomeric material has a length of 1.00 inches when the cushion assembly is in the extended condition of FIG. 16, the body of elastomeric material will have a length of between 1.35 and 1.45 inches when the cushion assembly is in the fully retracted condition of FIG. 18.

The specific axial extent or length of the body 692 of elastomeric material will vary depending upon the desired operating characteristics of the cushion assembly 620. However, it is believed that it may be desired to provide the body 692 of elastomeric material with an unrestrained axial extent of between 0.600 inches and 1.500 inches, as measured along the longitudinal axis 642, when the cushion assembly 620 is in the fully retracted condition of FIG. 18. It is also believed that the body 692 of elastomeric material may have an axial extent of between 0.350 and 1.200 inches when the cushion assembly 620 is in the extended condition of FIG. 16. It should be understood that the axial extent of the body 692 of elastomeric material may differ from these specific dimensions. However, it is believed that these specific dimensions may result in the body 692 of elastomeric material being able to provide the force required for desired shock absorbing characteristics for a specific cushion assembly.

When the cushion assembly 620 is in the extended condition of FIG. 16, the axially compressed body 692 of elastomeric material applies a force which is at least as great as thirty-five percent (35%) of the fluid force supplied against the head end portion 638 of the piston by the fluid pressure in the chamber 660. It is believed that it may be preferred to have the force which is transmitted from the body 692 of elastomeric material to the head end portion of the piston 638 be equal to or less than eighty percent (80%) of the force applied against the head end portion 638 of the piston 626 by the fluid pressure in the chamber 660. Thus, when the cushion assembly is in the extended condition of FIG. 16, the force transmitted from the body 692 of elastomeric material to the head end portion 638 of the piston 626 is between thirty-five and eighty percent (35 and 80%) of the force applied against the head end portion 638 of the piston 626 by the fluid pressure in the chamber 660.

Of course, some force is transmitted from the head end portion 638 of the piston 626 through the stop member 684 to the guide ring 666 and the side wall 630 of the cylinder 624 when the cushion assembly 620 is in the extended condition. Thus, a portion of the fluid pressure force in the chamber 660 is transmitted from the head end portion 638 of the piston 626 to the body 692 of elastomeric material through the force transmitting member 698. Another portion of the fluid pressure force is transmitted from the head end portion 638 of the piston 626 through the stop member 684 to the guide ring 666 and side wall 630 of the cylinder 624.

When the cushion assembly 620 is in the extended condition of FIG. 16, the fluid pressure in the chamber 660 is at least seven hundred pounds per square inch (700 psi) and is less than two thousand seven hundred pounds per square inch (2,700 psi). Of course, when the cushion assembly 620 is operated from the extended condition of FIG. 16 to the retracted condition of FIG. 18, the fluid pressure in the chamber 660 increases as the piston 626 moves into the chamber. It should be understood that some cushion assemblies constructed in accordance with the present invention may operate with fluid pressures which are different than these specific pressures.

It should be understood that the foregoing specific numerical characteristics and composition of components of the cushion assembly 620 and for the pressure in the chamber 660 have been set forth herein for a specific range of embodiments of the invention. It is contemplated that, depending upon the specific characteristics of a press assembly in which the cushion assembly 620 is utilized, the characteristics of the cushion assembly may be somewhat different than the specific characteristics previously set forth herein. However, it is believed that it may be preferred to construct the cushion assembly with the specific characteristics set forth herein in order to optimize the operation of the cushion assembly with at least some known press assemblies.

In the foregoing description, the body 692 of elastomeric material has provided a biasing force which is transmitted to the head end portion 638 of the piston 626 through the force transmitting member 698. It should be understood that the biasing force which is transmitted from the body 692 of elastomeric material to the head end portion 638 of the piston could be transmitted directly from the body of elastomeric material as described in conjunction with the embodiment of the invention illustrated in FIGS. 7 and 9. Although it is believed that it may be preferred to use a body 692 of elastomeric material to provide the biasing force, it should be understood that the biasing force could be provided in a different manner, for example, by spring discs, as illustrated in FIG. 10, or a helical spring as illustrated in FIG. 11, or by a body of fluid under pressure, as illustrated in FIG. 12.

It is contemplated that the dimensions of the body 692 of elastomeric material will vary as a function of the size of the cushion assembly 620 and as a function of the magnitude of force applied against the cushion assembly during operation of the press assembly. It is presently contemplated that the body 692 of elastomeric material may be associated with cushion assemblies having pistons 626 which move through distances of 0.900 inches or more and through distances of 7.00 inches or less during operation of the cushion assemblies from the extended condition (FIG. 16) to the fully retracted condition (FIG. 18). Of course, the specific distance through which the piston 626 moves will vary as a function of the size of the cushion assembly 620 and may be different than the foregoing distances.

In a first specific embodiment of the invention, the body 692 of elastomeric material was compressed by thirty-five percent (35%) when the cushion assembly 620 was in the extended condition. For this one specific embodiment of the invention, the body 692 of elastomeric material had the following dimensions.

|  | Uncompressed (Fully Retracted) |  | Compressed (Extended) |
| --- | --- | --- | --- |
| OD | 2.846 inches | OD | 3.130 inches |
| ID | 2.224 inches | ID | 2.224 inches |
| Length | 0.678 inches | Length | 0.441 inches |

When the cushion assembly was operated from the fully retracted condition of FIG. 18 to the extended condition of FIG. 16, the piston 626 moved through a distance of approximately two inches (2.0 inches) and the axial extent (length) of the body of elastomeric material decreased by 0.237 inches or 35%. In addition, the outside diameter (OD) increased and the inside diameter (ID) remained constant.

In a second specific embodiment of the invention, the body 692 of elastomeric material was compressed by forty percent (40%) when the cushion assembly was in the extended condition. The second embodiment of the body of elastomeric material was used in a cushion assembly having the same size as the cushion assembly in which the first embodiment of the body of elastomeric material was used. For the second specific embodiment of the invention, the body 692 of elastomeric material had the following dimensions:

|  | Uncompressed (Fully Retracted) |  | Compressed (Extended) |
| --- | --- | --- | --- |
| OD | 2.803 inches | OD | 3.130 inches |
| ID | 2.224 inches | ID | 2.224 inches |
| Length | 0.678 inches | Length | 0.407 inches |

When the cushion assembly was operated from the fully retracted condition of FIG. 18 to the extended condition of FIG. 16, the piston 626 moved through a distance of approximately two inches (2.0 inches) and the axial length of the body of elastomeric material decreased by 0.271 inches or 400%. In addition, the outside diameter (OD) increased and the inside diameter (ID) remained constant.

In a third specific embodiment of the invention, the body 692 of elastomeric material was larger than the first and second embodiments and was compressed by thirty-five percent (35%) when the cushion assembly was in the extended condition. The cushion assembly in which the third embodiment of the body 692 of elastomeric material was used was larger than the cushion assembly in which the first and second embodiments were used. For the third specific embodiment of the invention, the body 692 of elastomeric material had the following dimensions:

|  | Uncompressed (Fully Retracted) |  | Compressed (Extended) |
| --- | --- | --- | --- |
| OD | 4.495 inches | OD | 4.921 inches |
| ID | 3.571 inches | ID | 3.571 inches |
| Length | 1.459 inches | Length | 0.948 inches |

When the cushion assembly was operated from the fully retracted condition of FIG. 18 to the extended condition of FIG. 16, the piston 626 moved through a distance of approximately two inches (2.0 inches) and the axial length of the body of elastomeric material decreased by 0.511 inches or 35%. In addition, the outside diameter (OD) increased and the inside diameter (ID) remained constant.

In a fourth specific embodiment of the invention, the body 692 of elastomeric material was compressed by forty percent (40%) when the cushion assembly was in the extended condition. The fourth embodiment of the body 692 of elastomeric material was used in a cushion assembly having the same size as the cushion assembly in which the third embodiment of the body of elastomeric material was used. For the fourth specific embodiment of the invention, the body 692 of elastomeric material had the following dimensions:

|  | Uncompressed (Fully Retracted) |  | Compressed (Extended) |
| --- | --- | --- | --- |
| OD | 4.431 inches | OD | 4.921 inches |
| ID | 3.571 inches | ID | 3.571 inches |
| Length | 1.459 inches | Length | 0.875 inches |

When the cushion assembly was operated from the fully retracted condition of FIG. 18 to the extended condition of FIG. 16, the piston 626 moved through a distance of approximately two inches (2.0 inches) and the axial length of the body of elastomeric material decreased by 0.584 inches or 40%. In addition, the outside diameter (OD) increased and the inside diameter (ID) remained constant.

The foregoing specific examples of the body 692 of elastomeric material were used with two different sizes of cushion assemblies. The first and second embodiments of the body of elastomeric material were used with a cushion assembly having the same general construction as a commercially available T2-3000 cushion assembly. The third and fourth embodiments of the body of elastomeric material were used with a cushion assembly having the same general construction as a commercially available T2-7500 cushion assembly. The T2-3000 and T2-7500 cushion assemblies had pistons which were movable through a maximum possible distance of approximately four inches (4.0 inches). However, the pistons were actually moved through a distance of two inches (2.0 inches). The T2-300 and T2-7500 cushion assemblies are commercially available from Teledyne Fluid Systems, Hyson Products, 10367 Brecksville Road, Brecksville, Ohio 44141. Of course, the body 692 of elastomeric material may be used with cushion assemblies having a construction which is different than the construction of the aforementioned commercially available cushion assemblies.

The amount of force which is transmitted from the body 692 of elastomeric material varies as a direct function of the extent of compression of the body of elastomeric material when the cushion assembly 620 is operated from the fully retracted condition of FIG. 18 to the extended condition of FIG. 16. It is believed that it will be desired to have a force of a magnitude which results from a compression of twenty percent (20%) or more in an axial or lengthwise direction of the body 692 of elastomeric material. It is believed that a compression of thirty-five to forty-five percent (35 to 45%) in an axial or lengthwise direction of the body 692 of elastomeric material may enhance the shock absorbing capabilities of the cushion assembly 620 and provide desired operating characteristics. Although the four specific examples of the body 692 of elastomeric material related to axial compression of 35% or 40%, it is contemplated that different extents of axial compression may be used.

Thus, from the foregoing discussion, it is apparent that the present invention solves many of the problems encountered when using conventional gas spring arrangements. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

Having described the invention, the following is claimed:

1. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a stop surface which is disposed in and is fixedly connected with said cylinder, said head end portion of said piston being pressed against said stop surface under the influence of a first force applied against said head end portion of said piston by fluid pressure in said chamber when said cushion assembly is in the extended condition, and biasing means for urging said head end portion of said piston away from said one end of said cylinder against the influence of fluid pressure in said chamber with a second force when said cushion assembly is in the extended condition, said second force having a magnitude which is at least as great as thirty-five percent (35%) of the magnitude of said first force.

2. A press assembly as set forth in claim 1 wherein said biasing means includes a body of elastomeric material which is disposed in said cylinder, said body of elastomeric material being effective to provide force which assists force transmitted from said drive means to said cushion assembly during at least a portion of the operation of said cushion assembly from the extended condition to the retracted condition.

3. A press assembly as set forth in claim 1 wherein an end surface on said body of elastomeric material is disposed in engagement with said head end portion of said piston when said cushion assembly is in the extended condition.

4. A press assembly as set forth in claim 2 wherein said cushion assembly includes a force transmitting member which is disposed in engagement with said head end portion of said piston and an end surface on said body of elastomeric material when said cushion assembly is in the extended condition.

5. A press assembly as set forth in claim 1 wherein said biasing means includes a plurality of disc springs which are disposed in said cylinder, said plurality of disc springs being effective to provide force which assists force transmitted from said drive means to said cushion assembly during at least a portion of the operation of said cushion assembly from the extended condition to the retracted condition.

6. A press assembly as set forth in claim 1 wherein said biasing means includes a coil spring which is disposed in said cylinder, said coil spring being effective to provide force which assists force transmitted from said drive means to said cushion assembly during at least a portion of the operation of said cushion assembly from the retracted condition to the extended condition.

7. A press assembly as set forth in claim 1 wherein said biasing means includes a body of fluid disposed in said cylinder, said body of fluid being effective to provide force which assists force transmitted from said drive means to said cushion assembly during at least a portion of the operation of said cushion assembly from the retracted condition to the extended condition.

8. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which is connected to said head end portion and extends from said head end portion through one end of said cylinder, said head end portion of said piston cooperates with said cylinder to at least partially define a chamber which holds fluid under pressure, said chamber holds fluid under pressure of between seven hundred and two thousand seven hundred pounds per square inch (700 and 2,700 psi) which is effective to urge said head end portion of said piston toward said one end of said cylinder with a first force when said cushion assembly is in the extended condition, a stop which is disposed in said cylinder and is fixedly connected with one end of said cylinder and extends away from said one end of said cylinder, said head end portion of said piston having a first surface area which is disposed in engagement with and is pressed against a stop surface disposed on one end of said stop under the influence of fluid pressure in said chamber when said cushion assembly is in the extended condition, and biasing means for urging said head end portion of said piston away from said one end of said cylinder against the influence of fluid pressure in said chamber when said cushion assembly is in the extended condition, said biasing means being effective to provide force which is applied to a second surface area on said head end portion of said piston adjacent to said first surface area on said head end portion of said piston when said cushion assembly is in the extended condition, said piston being movable against the influence of fluid pressure in said chamber under the influence of force transmitted from said drive means to said cushion assembly during operation of said cushion assembly from the extended condition toward the retracted condition, said biasing means being effective to provide force which is applied against at least said second surface area on said head end portion of said piston and which assists force transmitted from said drive means to said cushion assembly during an initial portion of the operation of said cushion assembly from the extended condition toward the retracted condition, said biasing means being ineffective to provide force which assists force transmitted from said drive means to said cushion assembly after said cushion assembly has been operated through the initial portion of the operation of said cushion assembly from the extended condition toward the retracted condition, said biasing means being effective to urge said head end portion of said piston away from said one end of said cylinder with a second force having a magnitude of thirty-five to eighty percent (35 to 80%) of the magnitude of said first force when said cushion assembly is in the extended condition.

9. A press assembly as set forth in claim 8 wherein said biasing means includes a body of elastomeric material which has a Bayshore rebound percentage in excess of forty percent (40%).

10. A press assembly as set forth in claim 8 wherein said biasing means includes a body of elastomeric material which is a urethane based material.

11. A press assembly as set forth in claim 8 wherein said biasing means includes a polyurethane formulation containing p-phenylene diisocyanate.

12. A press assembly as set forth in claim 8 further including a force transmitting member which is disposed in and is movable relative to said cylinder, said force transmitting member being urged toward said head end portion of said piston by said biasing means when said cushion assembly is in the extended condition.

13. A press assembly as set forth in claim 8 wherein said biasing means includes a body of elastomeric material which engages said second surface area on said head end portion of said piston when said cushion assembly is in the extended condition.

14. A press assembly as set forth in claim 8 wherein said biasing means includes a plurality of disc springs which are disposed between said head end portion of said piston and said one end of said cylinder.

15. A press assembly as set forth in claim 8 wherein said biasing means includes a coil spring which is disposed between said head end portion of said piston and said one end of said cylinder.

16. A press assembly as set forth in claim 8 wherein said biasing means includes a body of elastomeric material disposed between said head end portion of said piston and said one end of said cylinder.

17. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, said rigid tubular portion has a cylindrical configuration, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material has a tubular configuration and is disposed in a coaxial relationship with said rigid tubular portion, said body of elastomeric material expands in an axial direction during the initial portion of the operation of said cushion assembly from the extended condition toward the retracted condition.

18. A cushion assembly as set forth in claim 17 further including a stop surface which engages a first surface area on said head end portion of said piston when said cushion assembly is in the extended condition, said head end portion of said piston having a second surface area against which force from said body of elastomeric material is applied when said cushion assembly is in the extended condition.

19. A cushion assembly as set forth in claim 17 wherein an end surface on said body of elastomeric material is disposed in engagement with said head end portion of said piston when said cushion assembly is in the extended condition.

20. A cushion assembly as set forth in claim 17 wherein said cushion assembly includes a force transmitting member which extends around said rod end portion of said piston and is disposed in engagement with an end surface on said body of elastomeric material and said head end portion of said piston when said cushion assembly is in the extended condition.

21. A cushion assembly as set forth in claim 17 wherein said cushion assembly includes a force transmitting member which extends around said rigid tubular portion, said force transmitting member is disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

22. A cushion assembly as set forth in claim 17 wherein said body of elastomeric material has a Bayshore rebound percentage in excess of forty percent (40%).

23. A cushion assembly as set forth in claim 17 wherein said body of elastomeric material is a urethane based material.

24. A cushion assembly as set forth in claim 17 wherein said body of elastomeric material is a polyurethane formulation containing p-phenylene diisocyanate.

25. A cushion assembly as set forth in claim 17 further including a stop surface which is disposed on said rigid tubular portion, said head end portion of said piston being urged toward said stop surface by fluid pressure in said chamber when said cushion assembly is in the extended condition, said head end portion of said piston being movable away from said stop surface during the initial portion of operation of said cushion assembly from the extended condition to the retracted condition.

26. A cushion assembly as set forth in claim 17 wherein said body of elastomeric material has a circular outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

27. A cushion assembly as set forth in claim 17 wherein said cushion assembly includes a stop surface which is engaged by said head end portion of said piston when said cushion assembly is in the extended condition and a force transmitting member which is urged toward said head end portion of said piston by said body of elastomeric material, said head end portion of said piston being spaced from said stop surface and said force transmitting member when said cushion assembly is in the retracted condition.

28. A cushion assembly as set forth in claim 17 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is at least as great as thirty-five percent (35%) of the magnitude of said first force when said cushion assembly is in the extended condition.

29. A cushion assembly as set forth in claim 17 wherein the fluid pressure in said chamber is at least seven hundred pounds per square inch (700 psi) when said cushion assembly is in the extended condition.

30. A cushion assembly as set forth in claim 17 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is less than eighty percent (80%) of the magnitude of said first force when said cushion assembly is in the extended condition.

31. A cushion assembly as set forth in claim 17 wherein the fluid pressure in said chamber is less than two thousand seven hundred pounds per square inch (2,700 psi) when said cushion assembly is in the extended condition.

32. A cushion assembly as set forth in claim 17 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

33. A cushion assembly as set forth in claim 17 wherein the fluid pressure in said chamber is between seven hundred and two thousand seven hundred pounds per square inch (700 and 2,700 psi) when said cushion assembly is in the extended condition.

34. A cushion assembly as set forth in claim 17 wherein said chamber holds fluid under a pressure of between seven hundred and two thousand seven hundred pounds per square inch (700 and 2,700 psi) which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

35. A cushion assembly as set forth in claim 17 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

36. A cushion assembly as set forth in claim 17 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

37. A cushion assembly as set forth in claim 17 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

38. A cushion assembly as set forth in claim 17 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length.

39. A cushion assembly as set forth in claim 17 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (35%) greater than said second length.

40. A cushion assembly as set forth in claim 17 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said first length.

41. A cushion assembly as set forth in claim 17 wherein said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

42. A cushion assembly as set forth in claim 17 wherein said body of elastomeric material has a tubular configuration, said body of elastomeric material has an inside surface which engages said rigid tubular portion when said cushion assembly is in the extended condition and when said cushion assembly is in the retracted condition, said body of elastomeric material having an outside surface which is further from said rigid tubular portion when said cushion assembly is in the extended condition than when said cushion assembly is in the retracted condition.

43. A cushion assembly as set forth in claim 17 wherein said body of elastomeric material has an inner side surface which faces toward said rod portion of said piston and an outer side surface which faces away from said rod portion of said piston, one of said side surfaces has a first size when said cushion assembly is in the extended condition and a second size when said cushion assembly is in the retracted condition, said first size being different than said second size.

44. A cushion assembly as set forth in claim 43 wherein another one of said side surfaces has a size which is the same when said cushion assembly is in the extended condition as when said cushion assembly is in the retracted condition.

45. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

46. A cushion assembly as set forth in claim 45 wherein said body of elastomeric material has a tubular configuration and is disposed in a coaxial relationship with said rigid tubular portion.

47. A cushion assembly as set forth in claim 45 further including a stop surface which engages said head end portion of said piston when said cushion assembly is in the extended condition.

48. A cushion assembly as set forth in claim 45 wherein an end surface on said body of elastomeric material is disposed in engagement with said head end portion of said piston when said cushion assembly is in the extended condition.

49. A cushion assembly as set forth in claim 48 further including a stop surface which engages said head end portion of said piston when said cushion assembly is in the extended condition.

50. A cushion assembly as set forth in claim 45 wherein said cushion assembly includes a force transmitting member which extends around said rod end portion of said piston and is disposed in engagement with an end surface on said body of elastomeric material and said head end portion of said piston when said cushion assembly is in the extended condition.

51. A cushion assembly as set forth in claim 45 wherein said cushion assembly includes a force transmitting member which is disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

52. A cushion assembly as set forth in claim 45 wherein said body of elastomeric material has a Bayshore rebound percentage in excess of forty percent (40%).

53. A cushion assembly as set forth in claim 45 wherein said body of elastomeric material is a urethane based material.

54. A cushion assembly as set forth in claim 45 wherein said body of elastomeric material is a polyurethane formulation containing p-phenylene diisocyanate.

55. A cushion assembly as set forth in claim 45 further including a stop surface which is disposed on said rigid tubular portion, said head end portion of said piston being pressed against said stop surface by fluid pressure in said chamber when said cushion assembly is in the extended condition, said head end portion of said piston being movable away from said stop surface during the initial portion of operation of said cushion assembly from the extended condition to the retracted condition.

56. A cushion assembly as set forth in claim 45 wherein said cushion assembly includes a stop surface which is engaged by said piston when said cushion assembly is in the extended condition and a force transmitting member which transmits force between said piston and said body of elastomeric material when said cushion assembly is in the extended condition, said piston being spaced from said stop surface and said force transmitting member when said cushion assembly is in the retracted condition.

57. A cushion assembly as set forth in claim 45 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is at least as great as thirty-five percent (350%) of the magnitude of said first force when said cushion assembly is in the extended condition.

58. A cushion assembly as set forth in claim 45 wherein the fluid pressure in said chamber is at least seven hundred pounds per square inch (700 psi) when said cushion assembly is in the extended condition.

59. A cushion assembly as set forth in claim 45 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is less than eighty percent (80%) of the magnitude of said first force when said cushion assembly is in the extended condition.

60. A cushion assembly as set forth in claim 45 wherein the fluid pressure in said chamber is less than two thousand seven hundred pounds per square inch (2,700 psi) when said cushion assembly is in the extended condition.

61. A cushion assembly as set forth in claim 45 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

62. A cushion assembly as set forth in claim 45 wherein the fluid pressure in said chamber is between seven hundred and two thousand seven hundred pounds per square inch (700 and 2,700 psi) when said cushion assembly is in the extended condition.

63. A cushion assembly as set forth in claim 45 wherein said chamber holds fluid under a pressure of between seven hundred and two thousand seven hundred pounds per square inch (700 and 2,700 psi) which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

64. A cushion assembly as set forth in claim 45 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

65. A cushion assembly as set forth in claim 45 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

66. A cushion assembly as set forth in claim 45 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

67. A cushion assembly as set forth in claim 45 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length.

68. A cushion assembly as set forth in claim 45 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (35%) greater than said second length.

69. A cushion assembly as set forth in claim 45 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said first length.

70. A cushion assembly as set forth in claim 45 wherein said outer side surface of said body of elastomeric material has a length of between 0.600 inches and 1.500 inches as measured parallel to a longitudinal central axis of said rod portion of said piston when said cushion assembly is in the retracted condition, said outer side surface of said body of elastomeric material having a length of between 0.400 inches and 1.000 inches as measured parallel to the longitudinal central axis of said rod portion of said piston when said cushion assembly is in the extended condition.

71. A cushion assembly as set forth in claim 45 wherein said cushion assembly includes a stop surface which is disposed on said rigid tubular portion and blocks movement of said head end portion of said piston toward said one end of said cylinder when said cushion assembly is in the extended condition and a force transmitting member transmits force from said body of elastomeric material to said head end portion of said piston when said cushion assembly is in the extended condition, said head end portion of said piston being spaced from said stop surface and said force transmitting member when said cushion assembly is in the retracted condition.

72. A cushion assembly as set forth in claim 45 wherein said chamber holds fluid under pressure which is effective to urge said head end portion of said piston toward said stop surface with a first force when said cushion assembly is in the extended condition, said body of elastomeric material being effective to urge said head end portion of said piston away from said stop surface with a second force having a magnitude which is at least as great as thirty-five percent (35%) of the magnitude of said first force when said cushion assembly is in the extended condition.

73. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

74. A cushion assembly as set forth in claim 73 wherein said body of elastomeric material is disposed in a coaxial relationship with said rigid tubular portion.

75. A cushion assembly as set forth in claim 73 further including a stop surface which engages a first surface area on said head end portion of said piston when said cushion assembly is in the extended condition, said head end portion of said piston having a second surface area against which force from said body of elastomeric material is applied when said cushion assembly is in the extended condition.

76. A cushion assembly as set forth in claim 73 wherein said body of elastomeric material is disposed in engagement with said head end portion of said piston when said cushion assembly is in the extended condition.

77. A cushion assembly as set forth in claim 73 wherein said cushion assembly includes a force transmitting member which is disposed in engagement with an end surface on said body of elastomeric material and said head end portion of said piston when said cushion assembly is in the extended condition.

78. A cushion assembly as set forth in claim 73 wherein said cushion assembly includes a force transmitting member which is effective to transmit force from said body of elastomeric material to said head end portion of said piston during the initial portion of operation of said cushion assembly from the extended condition toward the retracted condition.

79. A cushion assembly as set forth in claim 73 wherein said body of elastomeric material has a Bayshore rebound percentage in excess of forty percent (40%).

80. A cushion assembly as set forth in claim 73 wherein said body of elastomeric material is a urethane based material.

81. A cushion assembly as set forth in claim 73 wherein said body of elastomeric material is a polyurethane formulation containing p-phenylene diisocyanate.

82. A cushion assembly as set forth in claim 73 further including a stop surface which is disposed on said rigid tubular portion, said head end portion of said piston being urged toward said stop surface by fluid pressure in said chamber when said cushion assembly is in the extended condition, said head end portion of said piston being movable away from said stop surface during operation of said cushion assembly from the extended condition to the retracted condition.

83. A cushion assembly as set forth in claim 73 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

84. A cushion assembly as set forth in claim 73 wherein said cushion assembly includes a stop surface which is effective to block movement of said head end portion of said piston toward said one end of said cylinder when said cushion assembly is in the extended condition and a force transmitting member which transmits force between said head end portion of said piston and said body of elastomeric material when said cushion assembly is in the extended condition.

85. A cushion assembly as set forth in claim 84 wherein said force transmitting member is spaced from said stop surface when said cushion assembly is in the extended condition.

86. A cushion assembly as set forth in claim 73 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is at least as great as thirty-five percent (35%) of the magnitude of said first force when said cushion assembly is in the extended condition.

87. A cushion assembly as set forth in claim 73 wherein the fluid pressure in said chamber is at least seven hundred pounds per square inch (700 psi) when said cushion assembly is in the extended condition.

88. A cushion assembly as set forth in claim 73 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

89. A cushion assembly as set forth in claim 73 wherein said body of elastomeric material has an inner side surface which faces toward said rod portion of said piston and an outer side surface which faces away from said rod portion of said piston.

90. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material has a cylindrical inner side surface which faces toward said rod portion of said piston and a cylindrical outer side surface which faces away from said rod portion of said piston, one of said cylindrical side surfaces has a first diameter when said cushion assembly is in the extended condition and a second diameter when said cushion assembly is in the retracted condition, said first diameter being different than said second diameter.

91. A cushion assembly as set forth in claim 90 wherein another one of said cylindrical side surfaces has a diameter which is the same when said cushion assembly is in the extended condition as when said cushion assembly is in the retracted condition.

92. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length.

93. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (35%) greater than said second length.

94. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said first length.

95. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

96. A press assembly operable from an open condition to a closed condition to deform a workpiece and operable from the closed condition to the open condition to facilitate removal of the workpiece from said press assembly, said press assembly comprising a first member for engaging a first side of the workpiece, a second m ember for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, said chamber holds fluid under pressure which is effective to urge said head end portion of said piston toward said one end of said cylinder with a first force when said cushion assembly is in the extended condition, and a body of elastomeric material disposed in said cylinder, said body of elastomeric material being effective to urge said head end portion of said piston away from said one end of said cylinder against the influence of fluid pressure in said chamber when said cushion assembly is in the extended condition, said body of elastomeric material being effective to urge said head end portion of said piston away from said one end of said cylinder with a second force having a magnitude which is at least as great as thirty-five percent (35%) of the magnitude of said first force when said cushion assembly is in the extended condition, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition.

97. A press assembly as set forth in claim 96 wherein said body of elastomeric material has an annular cross sectional configuration as viewed in a plane which extends perpendicular to a longitudinal central axis of rod end portion of said piston and extends around said rod portion of said piston, said body of elastomeric material expands in an axial direction during the initial portion of the operation of said cushion assembly from the extended condition toward the retracted condition.

98. A press assembly as set forth in claim 96 wherein said cushion assembly includes a stop member having a stop surface which engages a first surface area on said head end portion of said piston when said cushion assembly is in the extended condition, said head end portion of said piston having a second surface area against which force from said body of elastomeric material is applied when said cushion assembly is in the extended condition.

99. A press assembly as set forth in claim 98 wherein an end surface on said body of elastomeric material is disposed in engagement with said second surface area on said head end portion of said piston when said cushion assembly is in the extended condition.

100. A press assembly as set forth in claim 98 wherein said cushion assembly includes a force transmitting member which extends around said rod end portion of said piston and is disposed in engagement with an end surface on said body of elastomeric material and said second surface area on said head end portion of said piston when said cushion assembly is in the extended condition.

101. A press assembly as set forth in claim 96 wherein said cushion assembly includes a force transmitting member disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

102. A press assembly as set forth in claim 96 wherein said body of elastomeric material has a Bayshore rebound percentage in excess of forty percent (40%).

103. A press assembly as set forth in claim 96 wherein said body of elastomeric material is a urethane based material.

104. A press assembly as set forth in claim 96 wherein said body of elastomeric material is a polyurethane formulation containing p-phenylene diisocyanate.

105. A press assembly as set forth in claim 96 further including an annular stop surface which extends around said rod end portion of said piston, said head end portion of said piston being pressed against said stop surface by fluid pressure in said chamber when said cushion assembly is in the extended condition, said body of elastomeric material extends around said rod end portion of said piston and is disposed in a coaxial relationship with said stop surface, said head end portion of said piston being movable away from said stop surface under the combined influence of force transmitted from said drive means and said body of elastomeric material to said head end portion of said piston during the initial portion of operation of said cushion assembly from the extended condition to the retracted condition.

106. A press assembly as set forth in claim 96 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

107. A press assembly as set forth in claim 96 wherein said cushion assembly includes a stop surface which is disposed in said cylinder and is engaged by said head end portion of said piston when said cushion assembly is in the extended condition and a force transmitting member which is pressed against said head end portion of said piston by said body of elastomeric material when said cushion assembly is in the extended condition, said head end portion of said piston being spaced from said stop surface and said force transmitting member when said cushion assembly is in the retracted condition.

108. A press assembly as set forth in claim 96 wherein the fluid pressure in said chamber is at least seven hundred pounds per square inch (700 psi) when said cushion assembly is in the extended condition.

109. A press assembly as set forth in claim 96 wherein said body of elastomeric material is effective to urge said head end portion of said piston away from said one end of said cylinder with the second force which has a magnitude which is less than eighty percent (80%) of the magnitude of said first force when said cushion assembly is in the extended condition.

110. A press assembly as set forth in claim 96 wherein the fluid pressure in said chamber is less than two thousand seven hundred pounds per square inch (2,700 psi) when said cushion assembly is in the extended condition.

111. A press assembly as set forth in claim 96 wherein said body of elastomeric material is effective to urge said head end portion of said piston away from said one end of said cylinder with the second force which has a magnitude of thirty-five to eighty percent (35% to 80%) of the magnitude of said first force when said cushion assembly is in the extended condition.

112. A press assembly as set forth in claim 96 wherein the fluid pressure in said chamber is between seven hundred and two thousand seven hundred pounds per square inch (700 and 2,700 psi) when said cushion assembly is in the extended condition.

113. A press assembly as set forth in claim 96 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

114. A press assembly as set forth in claim 96 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

115. A press assembly as set forth in claim 96 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

116. A press assembly as set forth in claim 96 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length.

117. A press assembly as set forth in claim 96 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (35%) greater than said second length.

118. A press assembly as set forth in claim 96 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said first length.

119. A press assembly as set forth in claim 96 wherein said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

120. A press assembly as set forth in claim 96 wherein said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

121. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, said chamber holds fluid under pressure which is effective to urge said head end portion of said piston toward said one end of said cylinder with a first force when said cushion assembly is in the extended condition, and a body of elastomeric material disposed in said cylinder, said body of elastomeric material being effective to urge said head end portion of said piston away from said one end of said cylinder against the influence of fluid pressure in said chamber when said cushion assembly is in the extended condition, said body of elastomeric material being effective to urge said head end portion of said piston away from said one end of said cylinder with a second force having a magnitude which is less than eighty percent (80%) of the magnitude of said first force when said cushion assembly is in the extended condition, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition.

122. A press assembly as set forth in claim 121 wherein said body of elastomeric material has an annular cross sectional configuration as viewed in a plane which extends perpendicular to a longitudinal central axis of rod end portion of said piston and extends around said rod portion of said piston, said body of elastomeric material expands in an axial direction during the initial portion of the operation of said cushion assembly from the extended condition toward the retracted condition.

123. A press assembly as set forth in claim 121 wherein said cushion assembly includes a stop member having a stop surface which engages a first surface area on said head end portion of said piston when said cushion assembly is in the extended condition, said head end portion of said piston having a second surface area against which force from said body of elastomeric material is applied when said cushion assembly is in the extended condition.

124. A press assembly as set forth in claim 123 wherein an end surface on said body of elastomeric material is disposed in engagement with said second surface area on said head end portion of said piston when said cushion assembly is in the extended condition.

125. A press assembly as set forth in claim 123 wherein said cushion assembly includes a force transmitting member which extends around said rod end portion of said piston and is disposed in engagement with an end surface on said body of elastomeric material and said second surface area on said head end portion of said piston when said cushion assembly is in the extended condition.

126. A press assembly as set forth in claim 121 wherein said cushion assembly includes a force transmitting member disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

127. A press assembly as set forth in claim 121 wherein said body of elastomeric material has a Bayshore rebound percentage in excess of forty percent (40%).

128. A press assembly as set forth in claim 121 wherein said body of elastomeric material is a urethane based material.

129. A press assembly as set forth in claim 121 wherein said body of elastomeric material is a polyurethane formulation containing p-phenylene diisocyanate.

130. A press assembly as set forth in claim 121 further including an annular stop surface which extends around said rod end portion of said piston, said head end portion of said piston being pressed against said stop surface by fluid pressure in said chamber when said cushion assembly is in the extended condition, said body of elastomeric material extends around said rod end portion of said piston and is disposed in a coaxial relationship with said stop surface, said head end portion of said piston being movable away from said stop surface under the combined influence of force transmitted from said drive means and said body of elastomeric material to said head end portion of said piston during the initial portion of operation of said cushion assembly from the extended condition to the retracted condition.

131. A press assembly as set forth in claim 121 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

132. A press assembly as set forth in claim 121 wherein said cushion assembly includes a stop surface which is disposed in said cylinder and is engaged by said head end portion of said piston when said cushion assembly is in the extended condition and a force transmitting member which is pressed against said head end portion of said piston by said body of elastomeric material when said cushion assembly is in the extended condition, said head end portion of said piston being spaced from said stop surface and said force transmitting member when said cushion assembly is in the retracted condition.

133. A press assembly as set forth in claim 121 wherein the fluid pressure in said chamber is at least seven hundred pounds per square inch (700 psi) when said cushion assembly is in the extended condition.

134. A press assembly as set forth in claim 121 wherein the fluid pressure in said chamber is less than two thousand seven hundred pounds per square inch (2,700 psi) when said cushion assembly is in the extended condition.

135. A press assembly as set forth in claim 121 wherein said body of elastomeric material being effective to urge said head end portion of said piston away from said one end of said cylinder with a second force having a magnitude of at least thirty-five percent (35%) of the magnitude of said first force when said cushion assembly is in the extended condition.

136. A press assembly as set forth in claim 121 wherein the fluid pressure in said chamber is between seven hundred and two thousand seven hundred pounds per square inch (700 and 2,700 psi) when said cushion assembly is in the extended condition.

137. A press assembly as set forth in claim 121 wherein said chamber holds fluid under a pressure of between seven hundred and two thousand seven hundred pounds per square inch (700 and 2,700 psi) which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of at least thirty-five percent (35%) of the magnitude of said first force when said cushion assembly is in the extended condition.

138. A press assembly as set forth in claim 121 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

139. A press assembly as set forth in claim 121 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

140. A press assembly as set forth in claim 121 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

141. A press assembly as set forth in claim 121 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length.

142. A press assembly as set forth in claim 121 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (35%) greater than said second length.

143. A press assembly as set forth in claim 121 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said first length.

144. A press assembly as set forth in claim 121 wherein said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

145. A press assembly as set forth in claim 121 wherein said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

146. A press assembly as set forth in claim 121 wherein said body of elastomeric material has a cylindrical inner side surface which faces toward said rod portion of said piston and a cylindrical outer side surface which faces away from said rod portion of said piston, one of said cylindrical side surfaces has a first diameter when said cushion assembly is in the extended condition and a second diameter when said cushion assembly is in the retracted condition, said first diameter being different than said second diameter.

147. A press assembly as set forth in claim 146 wherein another one of said cylindrical side surfaces has a diameter which is the same when said cushion assembly is in the extended condition as when said cushion assembly is in the retracted condition.

148. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, said chamber holds fluid under pressure which is effective to urge said head end portion of said piston toward said one end of said cylinder with a first force when said cushion assembly is in the extended condition, and a body of elastomeric material disposed in said cylinder, said body of elastomeric material being effective to urge said head end portion of said piston away from said one end of said cylinder against the influence of fluid pressure in said chamber when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said d rive means to said cushion assembly during an initial portion of the operation of said cushion assembly from the extended condition toward the retracted condition.

149. A press assembly as set forth in claim 148 wherein said body of elastomeric material has an annular cross sectional configuration as viewed in a plane which extends perpendicular to a longitudinal central axis of rod end portion of said piston and extends around said rod portion of said piston, said body of elastomeric material expands in an axial direction during the initial portion of the operation of said cushion assembly from the extended condition toward the retracted condition.

150. A press assembly as set forth in claim 148 wherein said cushion assembly includes a stop member having a stop surface which engages a first surface area on said head end portion of said piston when said cushion assembly is in the extended condition, said head end portion of said piston having a second surface area against which force from said body of elastomeric material is applied when said cushion assembly is in the extended condition.

151. A press assembly as set forth in claim 150 wherein an end surface on said body of elastomeric material is disposed in engagement with said second surface area on said head end portion of said piston when said cushion assembly is in the extended condition.

152. A press assembly as set forth in claim 150 wherein said cushion assembly includes a force transmitting member which extends around said rod end portion of said piston and is disposed in engagement with an end surface on said body of elastomeric material and said second surface area on said head end portion of said piston when said cushion assembly is in the extended condition.

153. A press assembly as set forth in claim 148 wherein said cushion assembly includes a force transmitting member disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

154. A press assembly as set forth in claim 148 wherein said body of elastomeric material has a Bayshore rebound percentage in excess of forty percent (40%).

155. A press assembly as set forth in claim 148 wherein said body of elastomeric material is a urethane based material.

156. A press assembly as set forth in claim 148 wherein said body of elastomeric material is a polyurethane formulation containing p-phenylene diisocyanate.

157. A press assembly as set forth in claim 148 further including an annular stop surface which extends around said rod end portion of said piston, said head end portion of said piston being pressed against said stop surface by fluid pressure in said chamber when said cushion assembly is in the extended condition, said body of elastomeric material extends around said rod end portion of said piston and is disposed in a coaxial relationship with said stop surface, said head end portion of said piston being movable away from said stop surface under the combined influence of force transmitted from said drive means and said body of elastomeric material to said head end portion of said piston during the initial portion of operation of said cushion assembly from the extended condition to the retracted condition.

158. A press assembly as set forth in claim 148 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

159. A press assembly as set forth in claim 148 wherein said cushion assembly includes a stop surface which is disposed in said cylinder and is engaged by said head end portion of said piston when said cushion assembly is in the extended condition and a force transmitting member which is pressed against said head end portion of said piston by said body of elastomeric material when said cushion assembly is in the extended condition, said head end portion of said piston being spaced from said stop surface and said force transmitting member when said cushion assembly is in the retracted condition.

160. A press assembly as set forth in claim 148 wherein the fluid pressure in said chamber is at least seven hundred pounds per square inch (700 psi) when said cushion assembly is in the extended condition.

161. A press assembly as set forth in claim 148 wherein the fluid pressure in said chamber is less than two thousand seven hundred pounds per square inch (2,700 psi) when said cushion assembly is in the extended condition.

162. A press assembly as set forth in claim 148 wherein the fluid pressure in said chamber is between seven hundred and two thousand seven hundred pounds per square inch (700 and 2,700 psi) when said cushion assembly is in the extended condition.

163. A press assembly as set forth in claim 148 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

164. A press assembly as set forth in claim 148 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

165. A press assembly as set forth in claim 148 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

166. A press assembly as set forth in claim 148 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length.

167. A press assembly as set forth in claim 148 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (350%) greater than said second length.

168. A press assembly as set forth in claim 148 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said first length.

169. A press assembly as set forth in claim 148 wherein said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

170. A press assembly as set forth in claim 148 wherein said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

171. A press assembly as set forth in claim 148 wherein said body of elastomeric material has a cylindrical inner side surface which faces toward said rod portion of said piston and a cylindrical outer side surface which faces away from said rod portion of said piston, one of said cylindrical side surfaces has a first diameter when said cushion assembly is in the extended condition and a second diameter when said cushion assembly is in the retracted condition, said first diameter being different than said second diameter.

172. A press assembly as set forth in claim 171 wherein another one of said cylindrical side surfaces has a diameter which is the same when said cushion assembly is in the extended condition as when said cushion assembly is in the retracted condition.

173. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, said chamber holds fluid under a pressure of between seven hundred and two thousand seven hundred pounds per square inch (700 and 2,700 psi) which is effective to urge said head end portion of said piston toward said one end of said cylinder with a first force when said cushion assembly is in the extended condition, and a body of elastomeric material disposed in said cylinder, said body of elastomeric material being effective to urge said head end portion of said piston away from said one end of said cylinder against the influence of fluid pressure in said chamber when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition.

174. A press assembly as set forth in claim 173 wherein said body of elastomeric material has an annular cross sectional configuration as viewed in a plane which extends perpendicular to a longitudinal central axis of rod end portion of said piston and extends around said rod portion of said piston, said body of elastomeric material expands in an axial direction during the initial portion of the operation of said cushion assembly from the extended condition toward the retracted condition.

175. A press assembly as set forth in claim 173 wherein said cushion assembly includes a stop member having a stop surface which engages a first surface area on said head end portion of said piston when said cushion assembly is in the extended condition, said head end portion of said piston having a second surface area against which force from said body of elastomeric material is applied when said cushion assembly is in the extended condition.

176. A press assembly as set forth in claim 175 wherein an end surface on said body of elastomeric material is disposed in engagement with said second surface area on said head end portion of said piston when said cushion assembly is in the extended condition.

177. A press assembly as set forth in claim 175 wherein said cushion assembly includes a force transmitting member which extends around said rod end portion of said piston and is disposed in engagement with an end surface on said body of elastomeric material and said second surface area on said head end portion of said piston when said cushion assembly is in the extended condition.

178. A press assembly as set forth in claim 173 wherein said cushion assembly includes a force transmitting member disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

179. A press assembly as set forth in claim 173 wherein said body of elastomeric material has a Bayshore rebound percentage in excess of forty percent (40%).

180. A press assembly as set forth in claim 173 wherein said body of elastomeric material is a urethane based material.

181. A press assembly as set forth in claim 173 wherein said body of elastomeric material is a polyurethane formulation containing p-phenylene diisocyanate.

182. A press assembly as set forth in claim 173 further including an annular stop surface which extends around said rod end portion of said piston, said head end portion of said piston being pressed against said stop surface by fluid pressure in said chamber when said cushion assembly is in the extended condition, said body of elastomeric material extends around said rod end portion of said piston and is disposed in a coaxial relationship with said stop surface, said head end portion of said piston being movable away from said stop surface under the combined influence of force transmitted from said drive means and said body of elastomeric material to said head end portion of said piston during the initial portion of operation of said cushion assembly from the extended condition to the retracted condition.

183. A press assembly as set forth in claim 173 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

184. A press assembly as set forth in claim 173 wherein said cushion assembly includes a stop surface which is disposed in said cylinder and is engaged by said head end portion of said piston when said cushion assembly is in the extended condition and a force transmitting member which is pressed against said head end portion of said piston by said body of elastomeric material when said cushion assembly is in the extended condition, said head end portion of said piston being spaced from said stop surface and said force transmitting member when said cushion assembly is in the retracted condition.

185. A press assembly as set forth in claim 173 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

186. A press assembly as set forth in claim 173 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

187. A press assembly as set forth in claim 173 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

188. A press assembly as set forth in claim 173 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length.

189. A press assembly as set forth in claim 173 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (35%) greater than said second length.

190. A press assembly as set forth in claim 173 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said first length.

191. A press assembly as set forth in claim 173 wherein said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

192. A press assembly as set forth in claim 173 wherein said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

193. A press assembly as set forth in claim 173 wherein said body of elastomeric material has a cylindrical inner side surface which faces toward said rod portion of said piston and a cylindrical outer side surface which faces away from said rod portion of said piston, one of said cylindrical side surfaces has a first diameter when said cushion assembly is in the extended condition and a second diameter when said cushion assembly is in the retracted condition, said first diameter being different than said second diameter.

194. A press assembly as set forth in claim 193 wherein another one of said cylindrical side surfaces has a diameter which is the same when said cushion assembly is in the extended condition as when said cushion assembly is in the retracted condition.

195. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, and a body of elastomeric material disposed in said cylinder, said body of elastomeric material being effective to urge said head end portion of said piston away from said one end of said cylinder against the influence of fluid pressure in said chamber when said cushion assembly is in the extended condition, said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition.

196. A press assembly as set forth in claim 195 wherein said body of elastomeric material has an annular cross sectional configuration as viewed in a plane which extends perpendicular to a longitudinal central axis of rod end portion of said piston and extends around said rod portion of said piston, said body of elastomeric material expands in an axial direction during the initial portion of the operation of said cushion assembly from the extended condition toward the retracted condition.

197. A press assembly as set forth in claim 195 wherein said cushion assembly includes a stop member having a stop surface which engages a first surface area on said head end portion of said piston when said cushion assembly is in the extended condition, said head end portion of said piston having a second surface area against which force from said body of elastomeric material is applied when said cushion assembly is in the extended condition.

198. A press assembly as set forth in claim 197 wherein an end surface on said body of elastomeric material is disposed in engagement with said second surface area on said head end portion of said piston when said cushion assembly is in the extended condition.

199. A press assembly as set forth in claim 197 wherein said cushion assembly includes a force transmitting member which extends around said rod end portion of said piston and is disposed in engagement with an end surface on said body of elastomeric material and said second surface area on said head end portion of said piston when said cushion assembly is in the extended condition.

200. A press assembly as set forth in claim 195 wherein said cushion assembly includes a force transmitting member disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

201. A press assembly as set forth in claim 195 wherein said body of elastomeric material has a Bayshore rebound percentage in excess of forty percent (40%).

202. A press assembly as set forth in claim 195 wherein said body of elastomeric material is a urethane based material.

203. A press assembly as set forth in claim 195 wherein said body of elastomeric material is a polyurethane formulation containing p-phenylene diisocyanate.

204. A press assembly as set forth in claim 195 further including an annular stop surface which extends around said rod end portion of said piston, said head end portion of said piston being pressed against said stop surface by fluid pressure in said chamber when said cushion assembly is in the extended condition, said body of elastomeric material extends around said rod end portion of said piston and is disposed in a coaxial relationship with said stop surface, said head end portion of said piston being movable away from said stop surface under the combined influence of force transmitted from said drive means and said body of elastomeric material to said head end portion of said piston during the initial portion of operation of said cushion assembly from the extended condition to the retracted condition.

205. A press assembly as set forth in claim 195 wherein said body of elastomeric material has a cylindrical outer side surface which has a first diameter when said cushion assembly is in the extended condition, said outer side surface of said body of elastomeric material having a second diameter which is smaller than said first diameter when said cushion assembly is in the retracted condition.

206. A press assembly as set forth in claim 195 wherein said cushion assembly includes a stop surface which is disposed in said cylinder and is engaged by said head end portion of said piston when said cushion assembly is in the extended condition and a force transmitting member which is pressed against said head end portion of said piston by said body of elastomeric material when said cushion assembly is in the extended condition, said head end portion of said piston being spaced from said stop surface and said force transmitting member when said cushion assembly is in the retracted condition.

207. A press assembly as set forth in claim 195 wherein the fluid pressure in said chamber is at least seven hundred pounds per square inch (700 psi) when said cushion assembly is in the extended condition.

208. A press assembly as set forth in claim 195 wherein the fluid pressure in said chamber is less than two thousand seven hundred pounds per square inch (2,700 psi) when said cushion assembly is in the extended condition.

209. A press assembly as set forth in claim 195 wherein the fluid pressure in said chamber is between seven hundred and two thousand seven hundred pounds per square inch (700 and 2,700 psi) when said cushion assembly is in the extended condition.

210. A press assembly as set forth in claim 195 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

211. A press assembly as set forth in claim 195 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

212. A press assembly as set forth in claim 195 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

213. A press assembly as set forth in claim 195 wherein said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

214. A press assembly as set forth in claim 195 wherein said body of elastomeric material has a cylindrical inner side surface which faces toward said rod portion of said piston and a cylindrical outer side surface which faces away from said rod portion of said piston, one of said cylindrical side surfaces has a first diameter when said cushion assembly is in the extended condition and a second diameter when said cushion assembly is in the retracted condition, said first diameter being different than said second diameter.

215. A press assembly as set forth in claim 214 wherein another one of said cylindrical side surfaces has a diameter which is the same when said cushion assembly is in the extended condition as when said cushion assembly is in the retracted condition.

216. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, and a body of elastomeric material disposed in said cylinder, said body of elastomeric material being effective to urge said head end portion of said piston away from said one end of said cylinder against the influence of fluid pressure in said chamber when said cushion assembly is in the extended condition, said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (35%) greater than said second length, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition.

217. A press assembly as set forth in claim 216 wherein said body of elastomeric material has an annular cross sectional configuration as viewed in a plane which extends perpendicular to a longitudinal central axis of rod end portion of said piston and extends around said rod portion of said piston, said body of elastomeric material expands in an axial direction during the initial portion of the operation of said cushion assembly from the extended condition toward the retracted condition.

218. A press assembly as set forth in claim 216 wherein said cushion assembly includes a stop member having a stop surface which engages a first surface area on said head end portion of said piston when said cushion assembly is in the extended condition, said head end portion of said piston having a second surface area against which force from said body of elastomeric material is applied when said cushion assembly is in the extended condition.

219. A press assembly as set forth in claim 218 wherein an end surface on said body of elastomeric material is disposed in engagement with said second surface area on said head end portion of said piston when said cushion assembly is in the extended condition.

220. A press assembly as set forth in claim 218 wherein said cushion assembly includes a force transmitting member which extends around said rod end portion of said piston and is disposed in engagement with an end surface on said body of elastomeric material and said second surface area on said head end portion of said piston when said cushion assembly is in the extended condition.

221. A press assembly as set forth in claim 216 wherein said cushion assembly includes a force transmitting member disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

222. A press assembly as set forth in claim 216 wherein said body of elastomeric material has a Bayshore rebound percentage in excess of forty percent (40%).

223. A press assembly as set forth in claim 216 wherein said body of elastomeric material is a urethane based material.

224. A press assembly as set forth in claim 216 wherein said body of elastomeric material is a polyurethane formulation containing p-phenylene diisocyanate.

225. A press assembly as set forth in claim 216 further including an annular stop surface which extends around said rod end portion of said piston, said head end portion of said piston being pressed against said stop surface by fluid pressure in said chamber when said cushion assembly is in the extended condition, said body of elastomeric material extends around said rod end portion of said piston and is disposed in a coaxial relationship with said stop surface, said head end portion of said piston being movable away from said stop surface under the combined influence of force transmitted from said drive means and said body of elastomeric material to said head end portion of said piston during the initial portion of operation of said cushion assembly from the extended condition to the retracted condition.

226. A press assembly as set forth in claim 216 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

227. A press assembly as set forth in claim 216 wherein said cushion assembly includes a stop surface which is disposed in said cylinder and is engaged by said head end portion of said piston when said cushion assembly is in the extended condition and a force transmitting member which is pressed against said head end portion of said piston by said body of elastomeric material when said cushion assembly is in the extended condition, said head end portion of said piston being spaced from said stop surface and said force transmitting member when said cushion assembly is in the retracted condition.

228. A press assembly as set forth in claim 216 wherein the fluid pressure in said chamber is at least seven hundred pounds per square inch (700 psi) when said cushion assembly is in the extended condition.

229. A press assembly as set forth in claim 216 wherein the fluid pressure in said chamber is less than two thousand seven hundred pounds per square inch (2,700 psi) when said cushion assembly is in the extended condition.

230. A press assembly as set forth in claim 216 wherein the fluid pressure in said chamber is between seven hundred and two thousand seven hundred pounds per square inch (700 and 2,700 psi) when said cushion assembly is in the extended condition.

231. A press assembly as set forth in claim 216 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

232. A press assembly as set forth in claim 216 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

233. A press assembly as set forth in claim 216 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

234. A press assembly as set forth in claim 216 wherein said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

235. A press assembly as set forth in claim 216 wherein said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

236. A press assembly as set forth in claim 216 wherein said body of elastomeric material has a cylindrical inner side surface which faces toward said rod portion of said piston and a cylindrical outer side surface which faces away from said rod portion of said piston, one of said cylindrical side surfaces has a first diameter when said cushion assembly is in the extended condition and a second diameter when said cushion assembly is in the retracted condition, said first diameter being different than said second diameter.

237. A press assembly as set forth in claim 236 wherein another one of said cylindrical side surfaces has a diameter which is the same when said cushion assembly is in the extended condition as when said cushion assembly is in the retracted condition.

238. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, and a body of elastomeric material disposed in said cylinder, said body of elastomeric material being effective to urge said head end portion of said piston away from said one end of said cylinder against the influence of fluid pressure in said chamber when said cushion assembly is in the extended condition, said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said second length, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition.

239. A press assembly as set forth in claim 238 wherein said body of elastomeric material has an annular cross sectional configuration as viewed in a plane which extends perpendicular to a longitudinal central axis of rod end portion of said piston and extends around said rod portion of said piston, said body of elastomeric material expands in an axial direction during the initial portion of the operation of said cushion assembly from the extended condition toward the retracted condition.

240. A press assembly as set forth in claim 238 wherein said cushion assembly includes a stop member having a stop surface which engages a first surface area on said head end portion of said piston when said cushion assembly is in the extended condition, said head end portion of said piston having a second surface area against which force from said body of elastomeric material is applied when said cushion assembly is in the extended condition.

241. A press assembly as set forth in claim 240 wherein an end surface on said body of elastomeric material is disposed in engagement with said second surface area on said head end portion of said piston when said cushion assembly is in the extended condition.

242. A press assembly as set forth in claim 240 wherein said cushion assembly includes a force transmitting member which extends around said rod end portion of said piston and is disposed in engagement with an end surface on said body of elastomeric material and said second surface area on said head end portion of said piston when said cushion assembly is in the extended condition.

243. A press assembly as set forth in claim 238 wherein said cushion assembly includes a force transmitting member disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

244. A press assembly as set forth in claim 238 wherein said body of elastomeric material has a Bayshore rebound percentage in excess of forty percent (40%).

245. A press assembly as set forth in claim 238 wherein said body of elastomeric material is a urethane based material.

246. A press assembly as set forth in claim 238 wherein said body of elastomeric material is a polyurethane formulation containing p-phenylene diisocyanate.

247. A press assembly as set forth in claim 238 further including an annular stop surface which extends around said rod end portion of said piston, said head end portion of said piston being pressed against said stop surface by fluid pressure in said chamber when said cushion assembly is in the extended condition, said body of elastomeric material extends around said rod end portion of said piston and is disposed in a coaxial relationship with said stop surface, said head end portion of said piston being movable away from said stop surface under the combined influence of force transmitted from said drive means and said body of elastomeric material to said head end portion of said piston during the initial portion of operation of said cushion assembly from the extended condition to the retracted condition.

248. A press assembly as set forth in claim 238 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

249. A press assembly as set forth in claim 238 wherein said cushion assembly includes a stop surface which is disposed in said cylinder and is engaged by said head end portion of said piston when said cushion assembly is in the extended condition and a force transmitting member which is pressed against said head end portion of said piston by said body of elastomeric material when said cushion assembly is in the extended condition, said head end portion of said piston being spaced from said stop surface and said force transmitting member when said cushion assembly is in the retracted condition.

250. A press assembly as set forth in claim 238 wherein the fluid pressure in said chamber is at least seven hundred pounds per square inch (700 psi) when said cushion assembly is in the extended condition.

251. A press assembly as set forth in claim 238 wherein the fluid pressure in said chamber is less than two thousand seven hundred pounds per square inch (2,700 psi) when said cushion assembly is in the extended condition.

252. A press assembly as set forth in claim 238 wherein the fluid pressure in said chamber is between seven hundred and two thousand seven hundred pounds per square inch (700 and 2,700 psi) when said cushion assembly is in the extended condition.

253. A press assembly as set forth in claim 238 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

254. A press assembly as set forth in claim 238 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

255. A press assembly as set forth in claim 238 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

256. A press assembly as set forth in claim 238 wherein said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

257. A press assembly as set forth in claim 238 wherein said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

258. A press assembly as set forth in claim 238 wherein said body of elastomeric material has a cylindrical inner side surface which faces toward said rod portion of said piston and a cylindrical outer side surface which faces away from said rod portion of said piston, one of said cylindrical side surfaces has a first diameter when said cushion assembly is in the extended condition and a second diameter when said cushion assembly is in the retracted condition, said first diameter being different than said second diameter.

259. A press assembly as set forth in claim 258 wherein another one of said cylindrical side surfaces has a diameter which is the same when said cushion assembly is in the extended condition as when said cushion assembly is in the retracted condition.

260. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, and a body of elastomeric material disposed in said cylinder, said body of elastomeric material being effective to urge said head end portion of said piston away from said one end of said cylinder against the influence of fluid pressure in said chamber when said cushion assembly is in the extended condition, said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition.

261. A press assembly as set forth in claim 260 wherein said body of elastomeric material has an annular cross sectional configuration as viewed in a plane which extends perpendicular to a longitudinal central axis of rod end portion of said piston and extends around said rod portion of said piston, said body of elastomeric material expands in an axial direction during the initial portion of the operation of said cushion assembly from the extended condition toward the retracted condition.

262. A press assembly as set forth in claim 260 wherein said cushion assembly includes a stop member having a stop surface which engages a first surface area on said head end portion of said piston when said cushion assembly is in the extended condition, said head end portion of said piston having a second surface area against which force from said body of elastomeric material is applied when said cushion assembly is in the extended condition.

263. A press assembly as set forth in claim 262 wherein an end surface on said body of elastomeric material is disposed in engagement with said second surface area on said head end portion of said piston when said cushion assembly is in the extended condition.

264. A press assembly as set forth in claim 262 wherein said cushion assembly includes a force transmitting member which extends around said rod end portion of said piston and is disposed in engagement with an end surface on said body of elastomeric material and said second surface area on said head end portion of said piston when said cushion assembly is in the extended condition.

265. A press assembly as set forth in claim 260 wherein said cushion assembly includes a force transmitting member disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

266. A press assembly as set forth in claim 260 wherein said body of elastomeric material has a Bayshore rebound percentage in excess of forty percent (40%).

267. A press assembly as set forth in claim 260 wherein said body of elastomeric material is a urethane based material.

268. A press assembly as set forth in claim 260 wherein said body of elastomeric material is a polyurethane formulation containing p-phenylene diisocyanate.

269. A press assembly as set forth in claim 260 further including an annular stop surface which extends around said rod end portion of said piston, said head end portion of said piston being pressed against said stop surface by fluid pressure in said chamber when said cushion assembly is in the extended condition, said body of elastomeric material extends around said rod end portion of said piston and is disposed in a coaxial relationship with said stop surface, said head end portion of said piston being movable away from said stop surface under the combined influence of force transmitted from said drive means and said body of elastomeric material to said head end portion of said piston during the initial portion of operation of said cushion assembly from the extended condition to the retracted condition.

270. A press assembly as set forth in claim 260 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

271. A press assembly as set forth in claim 260 wherein said cushion assembly includes a stop surface which is disposed in said cylinder and is engaged by said head end portion of said piston when said cushion assembly is in the extended condition and a force transmitting member which is pressed against said head end portion of said piston by said body of elastomeric material when said cushion assembly is in the extended condition, said head end portion of said piston being spaced from said stop surface and said force transmitting member when said cushion assembly is in the retracted condition.

272. A press assembly as set forth in claim 260 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is less than the magnitude of said first force when said cushion assembly is in the extended condition.

273. A press assembly as set forth in claim 260 wherein the fluid pressure in said chamber is at least seven hundred pounds per square inch (700 psi) when said cushion assembly is in the extended condition.

274. A press assembly as set forth in claim 260 wherein the fluid pressure in said chamber is less than two thousand seven hundred pounds per square inch (2,700 psi) when said cushion assembly is in the extended condition.

275. A press assembly as set forth in claim 260 wherein the fluid pressure in said chamber is between seven hundred and two thousand seven hundred pounds per square inch (700 and 2,700 psi) when said cushion assembly is in the extended condition.

276. A press assembly as set forth in claim 260 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

277. A press assembly as set forth in claim 260 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

278. A press assembly as set forth in claim 260 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

279. A press assembly as set forth in claim 260 wherein said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

280. A press assembly as set forth in claim 260 wherein said body of elastomeric material has a cylindrical inner side surface which faces toward said rod portion of said piston and a cylindrical outer side surface which faces away from said rod portion of said piston, one of said cylindrical side surfaces has a first diameter when said cushion assembly is in the extended condition and a second diameter when said cushion assembly is in the retracted condition, said first diameter being different than said second diameter.

281. A press assembly as set forth in claim 280 wherein another one of said cylindrical side surfaces has a diameter which is the same when said cushion assembly is in the extended condition as when said cushion assembly is in the retracted condition.

282. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, said chamber holds fluid under pressure to urge said head end portion of said piston toward said one end of said cylinder with a first force when said cushion assembly is in the extended condition, a stop surface which is disposed in and is fixedly connected with said cylinder, said head end portion of said piston being pressed against said stop surface under the influence of fluid pressure in said chamber when said cushion assembly is in the extended condition, and biasing means for urging said head end portion of said piston away from said one end of said cylinder against the influence of fluid pressure in said chamber when said cushion assembly is in the extended condition, said piston being movable against the influence of fluid pressure in said chamber under the influence of force transmitted from said drive means to said cushion assembly during operation of said cushion assembly from the extended condition toward the retracted condition, said biasing means being effective to provide force which assists force transmitted from said drive means to said cushion assembly during an initial portion of the operation of said cushion assembly from the extended condition toward the retracted condition, said biasing means being effective to urge said head end portion of said piston away from said one end of said cylinder with a second force which is at least as great as thirty-five percent (35%) of the magnitude of the first force when said cushion assembly is in the extended condition, said biasing means being ineffective to provide force which assists force transmitted from said drive means to said cushion assembly after said cushion assembly has been operated through the initial portion of the operation of said cushion assembly from the extended condition toward the retracted condition.

283. A press assembly as set forth in claim 282 further including a force transmitting member which is disposed in and is movable relative to said cylinder, said force transmitting member being pressed against said head end portion of said piston by said biasing means during a portion of movement of said head end portion of said piston away from said one end portion of said cylinder during operation of said cushion assembly from the extended condition to the retracted condition.

284. A press assembly as set forth in claim 282 wherein said stop surface has an annular configuration and extends around said rod end portion of said piston, said stop surface being fixedly connected with said cylinder at a location adjacent to said one end of said cylinder.

285. A press assembly as set forth in claim 282 wherein said stop surface is disposed on a first end portion of a cylindrical stop member, said stop member having a second end portion which is fixedly connected with said one end of said cylinder.

286. A press assembly as set forth in claim 282 further including a force transmitting member which is disposed in and is movable relative to said cylinder, said force transmitting member being pressed against said head end portion of said piston by said biasing means when said cushion assembly is in the extended condition, said stop surface being at least partially disposed on a stop member which is fixedly connected with said cylinder, said force transmitting member being engageable with said stop member to limit movement of said force transmitting member relative to said cylinder.

287. A press assembly as set forth in claim 282 wherein said biasing means includes a body of elastomeric material which engages said head end portion of said piston when said cushion assembly is in the extended condition.

288. A press assembly as set forth in claim 282 wherein said biasing means includes a plurality of disc springs which are disposed between said head end portion of said piston and said one end of said cylinder.

289. A press assembly as set forth in claim 282 wherein said biasing means includes a coil spring which is disposed between said head end portion of said piston and said one end of said cylinder.

290. A press assembly as set forth in claim 282 wherein said biasing means includes a body of elastomeric material disposed between said head end portion of said piston and said one end of said cylinder.

291. A press assembly as set forth in claim 290 further including a force transmitting member disposed between said body of elastomeric material and said head end portion of said piston, said force transmitting member being effective to transmit force from said body of elastomeric material to said head end portion of said piston when said cushion assembly is in the extended condition.

292. A press assembly as set forth in claim 282 wherein said biasing means includes a second chamber which holds fluid under pressure to urge said head end portion of said piston away from said one end of said cylinder with the second force when said cushion assembly is in the extended condition.

293. A press assembly as set forth in claim 292 wherein said chamber which is at least partially defined by said head end portion of said piston and said cylinder holds fluid under a pressure of at least seven hundred pounds per square inch (700 psi) when said cushion assembly is in the extended condition.

294. A press assembly as set forth in claim 292 wherein said chamber which is at least partially defined by said head end portion of said piston and said cylinder holds fluid under pressure which is effective to urge said head end portion of said piston toward said one end of said cylinder with a first force when said cushion assembly is in the extended condition, said second chamber holds fluid under pressure which is effective to urge said head end portion of said piston away from said one end of said cylinder with a second force having a magnitude of less than eighty percent (80%) of the magnitude of said first force when said cushion assembly is in the extended condition.

295. A press assembly as set forth in claim 282 wherein said chamber holds fluid under pressure of between seven hundred and two thousand seven hundred pounds per square inch (700 and 2,700 psi) which is effective to urge said head end portion of said piston toward said one end of said cylinder with a first force when said cushion assembly is in the extended condition, said biasing means being effective to urge said head end portion of said piston away from said one end of said cylinder with a second force having a magnitude of less than eighty percent (80%) of the magnitude of said first force when said cushion assembly is in the extended condition.

296. A press assembly as set forth in claim 282 wherein said biasing means includes a body of elastomeric material which has a Bayshore rebound percentage in excess of forty percent (40%).

297. A press assembly as set forth in claim 282 wherein said biasing means includes a body of elastomeric material which is a urethane based material.

298. A press assembly as set forth in claim 282 wherein said biasing means includes a body of elastomeric material which is a polyurethane formulation containing p-phenylene diisocyanate.

299. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, said chamber holds fluid under pressure which is effective to urge said head end portion of said piston toward said one end of said cylinder with a first force when said cushion assembly is in the extended condition, a stop surface which is disposed in and is fixedly connected with said cylinder, said head end portion of said piston being pressed against said stop surface under the influence of fluid pressure in said chamber when said cushion assembly is in the extended condition, and biasing means for urging said head end portion of said piston away from said one end of said cylinder against the influence of fluid pressure in said chamber when said cushion assembly is in the extended condition, said piston being movable against the influence of fluid pressure in said chamber under the influence of force transmitted from said drive means to said cushion assembly during operation of said cushion assembly from the extended condition toward the retracted condition, said biasing means being effective to provide force which assists force transmitted from said drive means to said cushion assembly during an initial portion of the operation of said cushion assembly from the extended condition toward the retracted condition, said biasing means being effective to urge said head end portion of said piston away from said one end of said cylinder with a second force having a magnitude of thirty-five to eighty percent (35 to 80%) of the magnitude of said first force when said cushion assembly is in the extended condition, said biasing means being ineffective to provide force which assists force transmitted from said drive means to said cushion assembly after said cushion assembly has been operated through the initial portion of the operation of said cushion assembly from the extended condition toward the retracted condition.

300. A press assembly as set forth in claim 299 further including a force transmitting member which is disposed in and is movable relative to said cylinder, said force transmitting member being pressed against said head end portion of said piston by said biasing means during a portion of movement of said head end portion of said piston away from said one end portion of said cylinder during operation of said cushion assembly from the extended condition to the retracted condition.

301. A press assembly as set forth in claim 299 wherein said stop surface has an annular configuration and extends around said rod end portion of said piston, said stop surface being fixedly connected with said cylinder at a location adjacent to said one end of said cylinder.

302. A press assembly as set forth in claim 299 wherein said stop surface is disposed on a first end portion of a cylindrical stop member, said stop member having a second end portion which is fixedly connected with said one end of said cylinder.

303. A press assembly as set forth in claim 299 further including a force transmitting member which is disposed in and is movable relative to said cylinder, said force transmitting member being pressed against said head end portion of said piston by said biasing means when said cushion assembly is in the extended condition, said stop surface being at least partially disposed on a stop member which is fixedly connected with said cylinder, said force transmitting member being engageable with said stop member to limit movement of said force transmitting member relative to said cylinder.

304. A press assembly as set forth in claim 299 wherein said biasing means includes a body of elastomeric material which engages said head end portion of said piston when said cushion assembly is in the extended condition.

305. A press assembly as set forth in claim 299 wherein said biasing means includes a plurality of disc springs which are disposed between said head end portion of said piston and said one end of said cylinder.

306. A press assembly as set forth in claim 299 wherein said biasing means includes a coil spring which is disposed between said head end portion of said piston and said one end of said cylinder.

307. A press assembly as set forth in claim 299 wherein said biasing means includes a body of elastomeric material disposed between said head end portion of said piston and said one end of said cylinder.

308. A press assembly as set forth in claim 307 further including a force transmitting member disposed between said body of elastomeric material and said head end portion of said piston, said force transmitting member being effective to transmit force from said body of elastomeric material to said head end portion of said piston when said cushion assembly is in the extended condition.

309. A press assembly as set forth in claim 299 wherein said biasing means includes a second chamber which holds fluid under pressure to urge said head end portion of said piston away from said one end of said cylinder with the second force when said cushion assembly is in the extended condition.

310. A press assembly as set forth in claim 309 wherein said chamber which is at least partially defined by said head end portion of said piston and said cylinder holds fluid under pressure of at least seven hundred pounds per square inch (700 psi) when said cushion assembly is in the extended condition.

311. A press assembly as set forth in claim 299 wherein said biasing means includes a body of elastomeric material which has a Bayshore rebound percentage in excess of forty percent (40%).

312. A press assembly as set forth in claim 299 wherein said biasing means includes a body of elastomeric material which is a urethane based material.

313. A press assembly as set forth in claim 299 wherein said biasing means includes a body of elastomeric material which is a polyurethane formulation containing p-phenylene diisocyanate.

314. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, said chamber holds fluid under pressure of between seven hundred and two thousand seven hundred pounds per square inch (700 and 2,700 psi) which is effective to urge said head end portion of said piston toward said one end of said cylinder with a first force when said cushion assembly is in the extended condition, a stop surface which is disposed in and is fixedly connected with said cylinder, said head end portion of said piston being pressed against said stop surface under the influence of fluid pressure in said chamber when said cushion assembly is in the extended condition, and biasing means for urging said head end portion of said piston away from said one end of said cylinder against the influence of fluid pressure in said chamber when said cushion assembly is in the extended condition, said piston being movable against the influence of fluid pressure in said chamber under the influence of force transmitted from said drive means to said cushion assembly during operation of said cushion assembly from the extended condition toward the retracted condition, said biasing means being effective to provide force which assists force transmitted from said drive means to said cushion assembly during an initial portion of the operation of said cushion assembly from the extended condition toward the retracted condition, said biasing means being effective to urge said head end portion of said piston away from said one end of said cylinder with a second force having a magnitude of thirty-five to eighty percent (35 to 80%) of the magnitude of said first force when said cushion assembly is in the extended condition, said biasing means being ineffective to provide force which assists force transmitted from said drive means to said cushion assembly after said cushion assembly has been operated through the initial portion of the operation of said cushion assembly from the extended condition toward the retracted condition.

315. A press assembly as set forth in claim 314 further including a force transmitting member which is disposed in and is movable relative to said cylinder, said force transmitting member being pressed against said head end portion of said piston by said biasing means during a portion of movement of said head end portion of said piston away from said one end portion of said cylinder during operation of said cushion assembly from the extended condition to the retracted condition.

316. A press assembly as set forth in claim 314 wherein said stop surface has an annular configuration and extends around said rod end portion of said piston, said stop surface being fixedly connected with said cylinder at a location adjacent to said one end of said cylinder.

317. A press assembly as set forth in claim 314 wherein said stop surface is disposed on a first end portion of a cylindrical stop member, said stop member having a second end portion which is fixedly connected with said one end of said cylinder.

318. A press assembly as set forth in claim 314 further including a force transmitting member which is disposed in and is movable relative to said cylinder, said force transmitting member being pressed against said head end portion of said piston by said biasing means when said cushion assembly is in the extended condition, said stop surface being at least partially disposed on a stop member which is fixedly connected with said cylinder, said force transmitting member being engageable with said stop member to limit movement of said force transmitting member relative to said cylinder.

319. A press assembly as set forth in claim 314 wherein said biasing means includes a body of elastomeric material which engages said head end portion of said piston when said cushion assembly is in the extended condition.

320. A press assembly as set forth in claim 314 wherein said biasing means includes a plurality of disc springs which are disposed between said head end portion of said piston and said one end of said cylinder.

321. A press assembly as set forth in claim 314 wherein said biasing means includes a coil spring which is disposed between said head end portion of said piston and said one end of said cylinder.

322. A press assembly as set forth in claim 314 wherein said biasing means includes a body of elastomeric material disposed between said head end portion of said piston and said one end of said cylinder.

323. A press assembly as set forth in claim 322 further including a force transmitting member disposed between said body of elastomeric material and said head end portion of said piston, said force transmitting member being effective to transmit force from said body of elastomeric material to said head end portion of said piston when said cushion assembly is in the extended condition.

324. A press assembly as set forth in claim 314 wherein said biasing means includes a second chamber which holds fluid under pressure to urge said head end portion of said piston away from said one end of said cylinder with the second force when said cushion assembly is in the extended condition.

325. A press assembly as set forth in claim 314 wherein said biasing means includes a body of elastomeric material which has a Bayshore rebound percentage in excess of forty percent (40%).

326. A press assembly as set forth in claim 314 wherein said biasing means includes a body of elastomeric material which is a urethane based material.

327. A press assembly as set forth in claim 314 wherein said biasing means includes a body of elastomeric material which is a polyurethane formulation containing p-phenylene diisocyanate.

328. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, a force transmitting member extends around said rigid tubular portion, and a body of elastomeric material disposed in said cylinder, said body of elastomeric material extends around said rigid tubular portion and is disposed between said rigid tubular portion and said cylinder, said force transmitting member is disposed between said head end portion of said piston and said body of elastomeric material, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said force transmitting member being effective to transmit force from said body of elastomeric material to said head end portion of said piston during the initial portion of operation of said cushion assembly from the extended condition toward the retracted condition.

329. A cushion assembly as set forth in claim 328 wherein said body of elastomeric material has a tubular configuration and is disposed in a coaxial relationship with said rigid tubular portion, said body of elastomeric material expands in an axial direction during the initial portion of the operation of said cushion assembly from the extended condition toward the retracted condition.

330. A cushion assembly as set forth in claim 328 further including a stop surface which engages a first surface area on said head end portion of said piston when said cushion assembly is in the extended condition, said head end portion of said piston having a second surface area against which force from said body of elastomeric material is applied when said cushion assembly is in the extended condition.

331. A cushion assembly as set forth in claim 328 wherein an end surface on said body of elastomeric material is disposed in engagement with force transmitting member when said cushion assembly is in the extended condition.

332. A cushion assembly as set forth in claim 328 wherein said force transmitting member extends around said rod end portion of said piston.

333. A cushion assembly as set forth in claim 328 wherein said body of elastomeric material has a Bayshore rebound percentage in excess of forty percent (40%).

334. A cushion assembly as set forth in claim 328 wherein said body of elastomeric material is a urethane based material.

335. A cushion assembly as set forth in claim 328 further including a stop surface which is disposed on said rigid tubular portion, said stop surface being effective to block movement of said head end portion of said piston toward said one end of said cylinder when said cushion assembly is in the extended condition, said head end portion of said piston being movable away from said stop surface during operation of said cushion assembly from the extended condition to the retracted condition.

336. A cushion assembly as set forth in claim 328 wherein said body of elastomeric material has a circular outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

337. A cushion assembly as set forth in claim 328 wherein said cushion assembly includes a stop surface which is disposed on said rigid tubular portion and is engaged by said head end portion of said piston when said cushion assembly is in the extended condition, said head end portion of said piston being spaced from said stop surface and said force transmitting member when said cushion assembly is in the retracted condition.

338. A cushion assembly as set forth in claim 328 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is at least as great as thirty-five percent (350%) of the magnitude of said first force when said cushion assembly is in the extended condition.

339. A cushion assembly as set forth in claim 328 wherein the fluid pressure in said chamber is at least seven hundred pounds per square inch (700 psi) when said cushion assembly is in the extended condition.

340. A cushion assembly as set forth in claim 328 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is less than eighty percent (80%) of the magnitude of said first force when said cushion assembly is in the extended condition.

341. A cushion assembly as set forth in claim 328 wherein the fluid pressure in said chamber is less than two thousand seven hundred pounds per square inch (2,700 psi) when said cushion assembly is in the extended condition.

342. A cushion assembly as set forth in claim 328 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

343. A cushion assembly as set forth in claim 328 wherein the fluid pressure in said chamber is between seven hundred and two thousand seven hundred pounds per square inch (700 and 2,700 psi) when said cushion assembly is in the extended condition.

344. A cushion assembly as set forth in claim 328 wherein said chamber holds fluid under a pressure of between seven hundred and two thousand seven hundred pounds per square inch (700 and 2,700 psi) which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

345. A cushion assembly as set forth in claim 328 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

346. A cushion assembly as set forth in claim 328 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

347. A cushion assembly as set forth in claim 328 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

348. A cushion assembly as set forth in claim 328 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length.

349. A cushion assembly as set forth in claim 328 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (35%) greater than said second length.

350. A cushion assembly as set forth in claim 328 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said first length.

351. A cushion assembly as set forth in claim 328 wherein said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

352. A cushion assembly as set forth in claim 328 wherein said body of elastomeric material has a tubular configuration, said body of elastomeric material has an inside surface which engage said rigid tubular portion when said cushion assembly is in the extended condition and when said cushion assembly is in the retracted condition, said body of elastomeric material having an outside surface which is further from said rigid tubular portion when said cushion assembly is in the extended condition than when said cushion assembly is in the retracted condition.

353. A cushion assembly as set forth in claim 328 wherein said body of elastomeric material has an inner side surface which faces toward said rod portion of said piston and an outer side surface which faces away from said rod portion of said piston, one of said side surfaces has a first size when said cushion assembly is in the extended condition and a second size when said cushion assembly is in the retracted condition, said first size being different than said second size.

354. A cushion assembly as set forth in claim 353 wherein another one of said side surfaces has a size which is the same when said cushion assembly is in the extended condition as when said cushion assembly is in the retracted condition.

355. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, a body of elastomeric material disposed in said cylinder, a stop surface which is disposed on said rigid tubular portion and is engaged by said head end portion of said piston when said cushion assembly is in the extended condition, and a force transmitting member which is pressed against said head end portion of said piston by said body of elastomeric material when said cushion assembly is in the extended condition, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said head end portion of said piston being spaced from said stop surface and said force transmitting member when said cushion assembly is in the retracted condition.

356. A cushion assembly as set forth in claim 355 wherein said body of elastomeric material has a tubular configuration and is disposed in a coaxial relationship with said rigid tubular portion, said body of elastomeric material expands in an axial direction during the initial portion of the operation of said cushion assembly from the extended condition toward the retracted condition.

357. A cushion assembly as set forth in claim 355 wherein said stop surface which engages a first surface area on said head end portion of said piston when said cushion assembly is in the extended condition, said head end portion of said piston having a second surface area against which force from said body of elastomeric material is applied when said cushion assembly is in the extended condition.

358. A cushion assembly as set forth in claim 355 wherein an end surface on said body of elastomeric material is disposed in engagement with said force transmitting member when said cushion assembly is in the extended condition and when said cushion assembly is in the retracted condition.

359. A cushion assembly as set forth in claim 355 wherein said force transmitting member extends around said rod end portion of said piston and is disposed in engagement with an end surface on said body of elastomeric material and said head end portion of said piston when said cushion assembly is in the extended condition.

360. A cushion assembly as set forth in claim 355 wherein said body of elastomeric material has a Bayshore rebound percentage in excess of forty percent (40%).

361. A cushion assembly as set forth in claim 355 wherein said body of elastomeric material is a urethane based material.

362. A cushion assembly as set forth in claim 355 wherein said body of elastomeric material is a polyurethane formulation containing p-phenylene diisocyanate.

363. A cushion assembly as set forth in claim 355 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is at least as great as thirty-five percent (35%) of the magnitude of said first force when said cushion assembly is in the extended condition.

364. A cushion assembly as set forth in claim 355 wherein the fluid pressure in said chamber is at least seven hundred pounds per square inch (700 psi) when said cushion assembly is in the extended condition.

365. A cushion assembly as set forth in claim 355 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is less than eighty percent (80%) of the magnitude of said first force when said cushion assembly is in the extended condition.

366. A cushion assembly as set forth in claim 355 wherein the fluid pressure in said chamber is less than two thousand seven hundred pounds per square inch (2,700 psi) when said cushion assembly is in the extended condition.

367. A cushion assembly as set forth in claim 355 wherein said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

368. A cushion assembly as set forth in claim 355 wherein the fluid pressure in said chamber is between seven hundred and two thousand seven hundred pounds per square inch (700 and 2,700 psi) when said cushion assembly is in the extended condition.

369. A cushion assembly as set forth in claim 355 wherein said chamber holds fluid under a pressure of between seven hundred and two thousand seven hundred pounds per square inch (700 and 2,700 psi) which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

370. A cushion assembly as set forth in claim 355 wherein said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

371. A cushion assembly as set forth in claim 355 wherein said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

372. A cushion assembly as set forth in claim 355 wherein said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

373. A cushion assembly as set forth in claim 355 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least twenty percent (20%) greater than said second length.

374. A cushion assembly as set forth in claim 355 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length being at least thirty-five percent (35%) greater than said second length.

375. A cushion assembly as set forth in claim 355 wherein said body of elastomeric material has a first length as measured along a longitudinal central axis of said rod portion of said piston when said cushion assembly is in the retracted condition, said body of elastomeric material having a second length as measured along the longitudinal central axis of said rod portion of said piston when said cushion assembly is in the extended condition, said first length exceeds said second length by thirty-five to forty-five percent (35 to 45%) of said first length.

376. A cushion assembly as set forth in claim 355 wherein said body of elastomeric material has a length of between 0.600 inches and 1.500 inches as measured along a longitudinal central axis of said rod portion of said piston when said cushion assembly is in the retracted condition, said body of elastomeric material having a length of between 0.400 inches and 1.000 inches as measured along the longitudinal central axis of said rod portion of said piston when said cushion assembly is in the extended condition.

377. A cushion assembly as set forth in claim 355 wherein said body of elastomeric material has an annular cross sectional configuration as viewed in a plane extending perpendicular to a longitudinal central axis of said rod portion of said piston, said body of elastomeric material having an inside diameter which is the same when said cushion assembly is in the extended condition as when said cushion assembly is in the retracted condition, said body of elastomeric material having an outside diameter which is greater when said cushion assembly is in the extended condition than when said cushion assembly is in the retracted condition.

378. A cushion assembly as set forth in claim 355 wherein said body of elastomeric material has a cylindrical inner side surface which faces toward said rod portion of said piston and a cylindrical outer side surface which faces away from said rod portion of said piston, one of said cylindrical side surfaces has a first diameter when said cushion assembly is in the extended condition and a second diameter when said cushion assembly is in the retracted condition, said first diameter being different than said second diameter.

379. A cushion assembly as set forth in claim 355 wherein another one of said cylindrical side surfaces has a diameter which is the same when said cushion assembly is in the extended condition as when said cushion assembly is in the retracted condition.

380. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material has a Bayshore rebound percentage in excess of forty percent (40%), said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition.

381. A cushion assembly as set forth in claim 380 wherein said body of elastomeric material has a tubular configuration and is disposed in a coaxial relationship with said rigid tubular portion, said body of elastomeric material expands in an axial direction during the initial portion of the operation of said cushion assembly from the extended condition toward the retracted condition.

382. A cushion assembly as set forth in claim 380 further including stop surface which engages said head end portion of said piston when said cushion assembly is in the extended condition.

383. A cushion assembly as set forth in claim 382 wherein an end surface on said body of elastomeric material is disposed in engagement with said head end portion of said piston when said cushion assembly is in the extended condition.

384. A cushion assembly as set forth in claim 382 wherein said cushion assembly includes a force transmitting member which extends around said rod end portion of said piston and is disposed in engagement with an end surface on said body of elastomeric material and said head end portion of said piston when said cushion assembly is in the extended condition.

385. A cushion assembly as set forth in claim 380 wherein said cushion assembly includes a force transmitting member which is disposed between said head end portion of said piston and said body of elastomeric material, said force transmitting member being effective to transmit force from said body of elastomeric material to said head end portion of said piston during the initial portion of operation of said cushion assembly from the extended condition toward the retracted condition.

386. A cushion assembly as set forth in claim 380 wherein said body of elastomeric material is a urethane based material.

387. A cushion assembly as set forth in claim 380 wherein said body of elastomeric material is a polyurethane formulation containing p-phenylene diisocyanate.

388. A cushion assembly as set forth in claim 380 further including an annular stop surface which is disposed on said rigid tubular portion, said stop surface being effective to block movement of said head end portion of said piston toward said one end of said cylinder when said cushion assembly is in the extended condition, said head end portion of said piston being movable away from said stop surface during operation of said cushion assembly from the extended condition to the retracted condition.

389. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a stop surface fixedly connected with said one end of said cylinder and across which force is transmitted between said one end of said cylinder and said piston to limit movement of said piston in a direction toward said one end of said cylinder during operation of said cushion assembly from the retracted condition to the extended condition, a body of elastomeric material connected with said one end of said cylinder, and a force transmitting member disposed between said head end portion of said piston and said body of elastomeric material, said body of elastomeric material being effective to urge said head end portion of said piston away from said one end of said cylinder against the influence of fluid pressure in said chamber when said cushion assembly is in the extended condition, said stop surface being effective to limit compression of said body of elastomeric material during operation of said cushion assembly from the retracted condition to the extended condition, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition, said force transmitting member being effective to transmit force from said body of elastomeric material to said head end portion of said piston during the initial portion of operation of said cushion assembly from the extended condition toward the retracted condition.

390. A press assembly as set forth in claim 389 wherein said body of elastomeric material has an annular cross sectional configuration as viewed in a plane which extends perpendicular to a longitudinal central axis of rod end portion of said piston and extends around said rod end portion of said piston, said body of elastomeric material expands in an axial direction away from said one end of said cylinder and remains connected with said one end of said cylinder during the initial portion of the operation of said cushion assembly from the extended condition toward the retracted condition.

391. A press assembly as set forth in claim 389 wherein said stop surface engages a first surface area on said head end portion of said piston when said cushion assembly is in the extended condition, said head end portion of said piston having a second surface area against which force from said body of elastomeric material is applied when said cushion assembly is in the extended condition.

392. A press assembly as set forth in claim 391 wherein an end surface on said body of elastomeric material is disposed in engagement with said second surface area on said head end portion of said piston when said cushion assembly is in the extended condition.

393. A press assembly as set forth in claim 391 wherein said force transmitting member extends around said rod end portion of said piston and is disposed in engagement with an end surface on said body of elastomeric material and said head end portion of said piston when said cushion assembly is in the extended condition.

394. A press assembly as set forth in claim 389 wherein said body of elastomeric material has a Bayshore rebound percentage in excess of forty percent (40%).

395. A press assembly as set forth in claim 389 wherein said body of elastomeric material is a urethane based material.

396. A press assembly as set forth in claim 389 wherein said body of elastomeric material is a polyurethane formulation containing p-phenylene diisocyanate.

397. A press assembly as set forth in claim 389 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

398. A press assembly as set forth in claim 389 wherein said stop surface is engaged by a first area on said head end portion of said piston when said cushion assembly is in the extended condition, said force transmitting member is pressed against a second area on said head end portion of said piston by said body of elastomeric material when said cushion assembly is in the extended condition, said head end portion of said piston being spaced from said stop surface and said force transmitting member when said cushion assembly is in the retracted condition.

399. A press assembly as set forth in claim 389 wherein said body of elastomeric material extends past said stop surface in an axial direction away from said one end of said cylinder when said cushion assembly is in the retracted condition.

400. A press assembly as set forth in claim 389 wherein said force transmitting member being disposed in engagement with said head end portion of said piston when said cushion assembly is in the extended condition, said body of elastomeric material being effective to press said force transmitting member against said head end portion of said piston to urge said force transmitting member and said head end portion of said piston away from said one end of said cylinder against the influence of fluid pressure in said chamber when said cushion assembly is in the extended condition, said head end portion of said piston and said force transmitting member being movable together in a direction away from said one end of said cylinder against the influence of fluid pressure in said chamber during an initial portion of the operation of said cushion assembly from the extended condition toward the retracted condition, and a motion limiting device connected with said cylinder to block movement of said force transmitting member with said head end portion of said piston upon completion of the initial portion of operation of said cushion assembly from the extended condition toward the retracted condition.

401. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a stop surface fixedly connected with said one end of said cylinder and across which force is transmitted between said one end of said cylinder and said piston to limit movement of said piston in a direction toward said one end of said cylinder during operation of said cushion assembly from the retracted condition to the extended condition, and a body of elastomeric material connected with said one end of said cylinder, said body of elastomeric material has a Bayshore rebound percentage in excess of forty percent (40%), said body of elastomeric material being effective to urge said head end portion of said piston away from said one end of said cylinder against the influence of fluid pressure in said chamber when said cushion assembly is in the extended condition, said stop surface being effective to limit compression of said body of elastomeric material during operation of said cushion assembly from the retracted condition to the extended condition, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition.

402. A press assembly as set forth in claim 401 wherein said body of elastomeric material has an annular cross sectional configuration as viewed in a plane which extends perpendicular to a longitudinal central axis of rod end portion of said piston and extends around said rod end portion of said piston, said body of elastomeric material expands in an axial direction away from said one end of said cylinder and remains connected with said one end of said cylinder during the initial portion of the operation of said cushion assembly from the extended condition toward the retracted condition.

403. A press assembly as set forth in claim 401 wherein said stop surface engages a first surface area on said head end portion of said piston when said cushion assembly is in the extended condition, said head end portion of said piston having a second surface area against which force from said body of elastomeric material is applied when said cushion assembly is in the extended condition.

404. A press assembly as set forth in claim 403 wherein an end surface on said body of elastomeric material is disposed in engagement with said second surface area on said head end portion of said piston when said cushion assembly is in the extended condition.

405. A press assembly as set forth in claim 403 wherein said cushion assembly includes a force transmitting member which is disposed in engagement with an end surface on said body of elastomeric material and said second surface area on said head end portion of said piston when said cushion assembly is in the extended condition.

406. A press assembly as set forth in claim 401 wherein said cushion assembly includes a force transmitting member which is effective to transmit force from said body of elastomeric material to said head end portion of said piston during the initial portion of operation of said cushion assembly from the extended condition toward the retracted condition, said force transmitting member being ineffective to transmit force from said body of elastomeric material to said head end portion of said piston during a final portion of operation of said cushion assembly from the extended condition toward the retracted condition.

407. A press assembly as set forth in claim 401 wherein said body of elastomeric material is a urethane based material.

408. A press assembly as set forth in claim 401 wherein said body of elastomeric material is a polyurethane formulation containing p-phenylene diisocyanate.

409. A press assembly as set forth in claim 401 wherein said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

410. A press assembly as set forth in claim 401 wherein said stop surface is engaged by a first area on said head end portion of said piston when said cushion assembly is in the extended condition, said cushion assembly includes a force transmitting member which is pressed against a second area on said head end portion of said piston by said body of elastomeric material when said cushion assembly is in the extended condition, said head end portion of said piston being spaced from said stop surface and said force transmitting member when said cushion assembly is in the retracted condition.

411. A press assembly as set forth in claim 401 wherein said body of elastomeric material extends past said stop surface in an axial direction away from said one end of said cylinder when said cushion assembly is in the retracted condition.

412. A press assembly as set forth in claim 401 wherein said cushion assembly includes a force transmitting member which is disposed in and is movable relative to said cylinder, said force transmitting member being disposed in engagement with said head end portion of said piston when said cushion assembly is in the extended condition, said body of elastomeric material being effective to press said force transmitting member against said head end portion of said piston to urge said force transmitting member and said head end portion of said piston away from said one end of said cylinder against the influence of fluid pressure in said chamber when said cushion assembly is in the extended condition, said head end portion of said piston and said force transmitting member being movable together in a direction away from said one end of said cylinder against the influence of fluid pressure in said chamber during an initial portion of the operation of said cushion assembly from the extended condition toward the retracted condition, and a motion limiting device connected with said cylinder to block movement of said force transmitting member with said head end portion of said piston upon completion of the initial portion of operation of said cushion assembly from the extended condition toward the retracted condition.

413. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a stop surface fixedly connected with said one end of said cylinder and across which force is transmitted between said one end of said cylinder and said piston to limit movement of said piston in a direction toward said one end of said cylinder during operation of said cushion assembly from the retracted condition to the extended condition, and a body of elastomeric material connected with said one end of said cylinder, said body of elastomeric material being effective to urge said head end portion of said piston away from said one end of said cylinder against the influence of fluid pressure in said chamber when said cushion assembly is in the extended condition, said stop surface being effective to limit compression of said body of elastomeric material during operation of said cushion assembly from the retracted condition to the extended condition, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition, said body of elastomeric material has a cylindrical outer side surface which has a first diameter and a first axial extent when said cushion assembly is in the extended condition, said outer side surface of said body of elastomeric material having a second diameter which is smaller than said first diameter when said cushion assembly is in the retracted condition, said outer side surface of said body of elastomeric material has a second axial extent which is greater than said first axial extent when said cushion assembly is in the retracted condition.

414. A press assembly as set forth in claim 413 wherein said stop surface engages a first surface area on said head end portion of said piston when said cushion assembly is in the extended condition, said head end portion of said piston having a second surface area against which force from said body of elastomeric material is applied when said cushion assembly is in the extended condition.

415. A press assembly as set forth in claim 414 wherein an end surface on said body of elastomeric material is disposed in engagement with said second surface area on said head end portion of said piston when said cushion assembly is in the extended condition.

416. A press assembly as set forth in claim 414 wherein said cushion assembly includes a force transmitting member which extends around said rod end portion of said piston and is disposed in engagement with an end surface on said body of elastomeric material and said second surface area on said head end portion of said piston when said cushion assembly is in the extended condition.

417. A press assembly as set forth in claim 413 wherein said cushion assembly includes a force transmitting member disposed between said head end portion of said piston and said body of elastomeric material, said force transmitting member being disposed in engagement with said body of elastomeric material when said cushion assembly is in the extended condition and when said cushion assembly is in the retracted condition.

418. A press assembly as set forth in claim 417 wherein said force transmitting member is disposed in engagement with said head end portion of said piston when said cushion assembly is in the extended condition, said force transmitting member being spaced from said head end portion of said piston when said cushion assembly is in the retracted condition.

419. A press assembly as set forth in claim 417 wherein said body of elastomeric material has a Bayshore rebound percentage in excess of forty percent (40%).

420. A press assembly as set forth in claim 413 wherein said body of elastomeric material is a urethane based material.

421. A press assembly as set forth in claim 413 wherein said body of elastomeric material is a polyurethane formulation containing p-phenylene diisocyanate.

422. A press assembly as set forth in claim 413 wherein said stop surface is engaged by a first area on said head end portion of said piston when said cushion assembly is in the extended condition, said cushion assembly includes a force transmitting member which is pressed against a second area on said head end portion of said piston by said body of elastomeric material when said cushion assembly is in the extended condition, said head end portion of said piston being spaced from said stop surface and said force transmitting member when said cushion assembly is in the retracted condition.

423. A press assembly as set forth in claim 413 wherein said cushion assembly includes a force transmitting member which is disposed in and is movable relative to said cylinder, said force transmitting member being disposed in engagement with said head end portion of said piston when said cushion assembly is in the extended condition, said body of elastomeric material being effective to press said force transmitting member against said head end portion of said piston to urge said force transmitting member and said head end portion of said piston away from said one end of said cylinder against the influence of fluid pressure in said chamber when said cushion assembly is in the extended condition, said head end portion of said piston and said force transmitting member being movable together in a direction away from said one end of said cylinder against the influence of fluid pressure in said chamber during an initial portion of the operation of said cushion assembly from the extended condition toward the retracted condition, and a motion limiting device connected with said cylinder to block movement of said force transmitting member with said head end portion of said piston upon completion of the initial portion of operation of said cushion assembly from the extended condition toward the retracted condition.

424. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a stop surface fixedly connected with said one end of said cylinder and across which force is transmitted between said one end of said cylinder and said piston to limit movement of said piston in a direction toward said one end of said cylinder during operation of said cushion assembly from the retracted condition to the extended condition, said stop surface is engaged by a first area on said head end portion of said piston when said cushion assembly is in the extended condition, a body of elastomeric material connected with said one end of said cylinder, and a force transmitting member which is pressed against a second area on said head end portion of said piston by said body of elastomeric material when said cushion assembly is in the extended condition, said body of elastomeric material being effective to urge said head end portion of said piston away from said one end of said cylinder against the influence of fluid pressure in said chamber when said cushion assembly is in the extended condition, said stop surface being effective to limit compression of said body of elastomeric material during operation of said cushion assembly from the retracted condition to the extended condition, said piston being movable against the influence of fluid pressure in said chamber under the influence of force transmitted from said drive means to said cushion assembly during operation of said cushion assembly from the extended condition toward the retracted condition, said body of elastomeric material being effective to provide force which assists force transmitted from said drive means to said cushion assembly during an initial portion of the operation of said cushion assembly from the extended condition toward the retracted condition, said head end portion of said piston being spaced from said stop surface and said force transmitting member when said cushion assembly is in the retracted condition.

425. A press assembly as set forth in claim 424 wherein said body of elastomeric material and said force transmitting member each have an annular cross sectional configuration as viewed in planes which extend perpendicular to a longitudinal central axis of rod end portion of said piston, said body of elastomeric material expands in an axial direction away from said one end of said cylinder during the initial portion of the operation of said cushion assembly from the extended condition toward the retracted condition, said force transmitting member moves relative to said cylinder as said body of elastomeric material expands in the axial direction.

426. A press assembly as set forth in claim 424 wherein said stop surface engages a first surface area on said head end portion of said piston when said cushion assembly is in the extended condition, said force transmitting member engages a second surface area on said head end portion of said piston when said cushion assembly is in the extended condition.

427. A press assembly as set forth in claim 424 wherein an end surface on said body of elastomeric material is disposed in engagement with said force transmitting member when said cushion assembly is in the extended condition.

428. A press assembly as set forth in claim 424 wherein said force transmitting member extends around said rod end portion of said piston and is disposed in engagement with an end surface on said body of elastomeric material when said cushion assembly is in the extended condition.

429. A press assembly as set forth in claim 424 wherein said force transmitting member moves relative to said cylinder the initial portion of operation of said cushion assembly from the extended condition toward the retracted condition.

430. A press assembly as set forth in claim 424 wherein said body of elastomeric material is a urethane based material.

431. A press assembly as set forth in claim 424 wherein said body of elastomeric material is a polyurethane formulation containing p-phenylene diisocyanate.

432. A press assembly as set forth in claim 424 wherein said force transmitting member has an annular configuration, said body of elastomeric material has a cylindrical outer side surface which has a first diameter which is approximately the same as an outside diameter of said force transmitting member when said cushion assembly is in the extended condition, said outer side surface of said body of elastomeric material having a second diameter which is smaller than said first diameter when said cushion assembly is in the retracted condition.

433. A press assembly as set forth in claim 424 wherein said body of elastomeric material is effective to press said force transmitting member against said head end portion of said piston to urge said force transmitting member and said head end portion of said piston away from said one end of said cylinder against the influence of fluid pressure in said chamber when said cushion assembly is in the extended condition, said head end portion of said piston and said force transmitting member being movable together in a direction away from said one end of said cylinder against the influence of fluid pressure in said chamber during an initial portion of the operation of said cushion assembly from the extended condition toward the retracted condition.

434. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a stop surface fixedly connected with said one end of said cylinder and across which force is transmitted between said one end of said cylinder and said piston to limit movement of said piston in a direction toward said one end of said cylinder during operation of said cushion assembly from the retracted condition to the extended condition, a force transmitting member which is disposed in and is movable relative to said cylinder, said force transmitting member being disposed in engagement with said head end portion of said piston when said cushion assembly is in the extended condition, a body of elastomeric material connected with said one end of said cylinder, said body of elastomeric material being effective to press said force transmitting member against said head end portion of said piston to urge said force transmitting member and said head end portion of said piston away from said one end of said cylinder against the influence of fluid pressure in said chamber when said cushion assembly is in the extended condition, said stop surface being effective to limit compression of said body of elastomeric material during operation of said cushion assembly from the retracted condition to the extended condition, said piston being movable against the influence of fluid pressure in said chamber under the influence of force transmitted from said drive means to said cushion assembly during operation of said cushion assembly from the extended condition toward the retracted condition, said head end portion of said piston and said force transmitting member being movable together in a direction away from said one end of said cylinder against the influence of fluid pressure in said chamber during an initial portion of the operation of said cushion assembly from the extended condition toward the retracted condition, said body of elastomeric material being effective to provide force which assists force transmitted from said drive means to said cushion assembly during the initial portion of the operation of said cushion assembly from the extended condition toward the retracted condition, and a motion limiting device connected with said cylinder to block movement of said force transmitting member with said head end portion of said piston upon completion of the initial portion of operation of said cushion assembly from the extended condition toward the retracted condition.

435. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which is connected to said head end portion and extends from said head end portion through one end of said cylinder, said head end portion of said piston cooperates with said cylinder to at least partially define a chamber which holds fluid under pressure, a stop which is disposed in said cylinder and is fixedly connected with one end of said cylinder and extends away from said one end of said cylinder, said head end portion of said piston having a first surface area which is disposed in engagement with and is pressed against a stop surface disposed on one end of said stop under the influence of fluid pressure in said chamber when said cushion assembly is in the extended condition, a force transmitting member which is disposed in and is movable relative to said cylinder, and biasing means for urging said head end portion of said piston away from said one end of said cylinder against the influence of fluid pressure in said chamber when said cushion assembly is in the extended condition, said biasing means being effective to provide force which is applied to a second surface area on said head end portion of said piston adjacent to said first surface area on said head end portion of said piston when said cushion assembly is in the extended condition, said piston being movable against the influence of fluid pressure in said chamber under the influence of force transmitted from said drive means to said cushion assembly during operation of said cushion assembly from the extended condition toward the retracted condition, said force transmitting member being pressed against said second surface area on said head end portion of said piston by said biasing means during a portion of movement of said head end portion of said piston away from said one end portion of said cylinder during operation of said cushion assembly from the extended condition to the retracted condition, said biasing means being effective to provide force which is applied against at least said second surface area on said head end portion of said piston and which assists force transmitted from said drive means to said cushion assembly during an initial portion of the operation of said cushion assembly from the extended condition toward the retracted condition, said biasing means being ineffective to provide force which assists force transmitted from said drive means to said cushion assembly after said cushion assembly has been operated through the initial portion of the operation of said cushion assembly from the extended condition toward the retracted condition.

436. A press assembly as set forth in claim 435 wherein said stop surface has an annular configuration and extends around said rod end portion of said piston.

437. A press assembly as set forth in claim 435 wherein said stop has a cylindrical configuration and extends around said rod end portion of said piston.

438. A press assembly as set forth in claim 435 wherein said force transmitting member is pressed against said second surface area on said head end portion of said piston by said biasing means when said cushion assembly is in the extended condition, said force transmitting member being engagable with said stop to limit movement of said force transmitting member relative to said cylinder.

439. A press assembly as set forth in claim 435 wherein said biasing means includes a body of elastomeric material which is disposed between said head end portion of said piston and said one end of said cylinder.

440. A press assembly as set forth in claim 435 wherein said biasing means includes a plurality of disc springs which are disposed between said head end portion of said piston and said one end of said cylinder.

441. A press assembly as set forth in claim 435 wherein said biasing means includes a coil spring which is disposed between said head end portion of said piston and said one end of said cylinder.

442. A press assembly as set forth in claim 435 wherein said biasing means includes a body of elastomeric material disposed in engagement with said force transmitting member.

443. A press assembly as set forth in claim 435 wherein said force transmitting member is disposed between said biasing means and said head end portion of said piston, said force transmitting member being effective to transmit force from said biasing means to said second surface area on said head end portion of said piston when said cushion assembly is in the extended condition.

444. A press assembly as set forth in claim 435 wherein said chamber holds fluid under pressure to urge said head end portion of said piston toward said one end of said cylinder with a first force when said cushion assembly is in the extended condition, said biasing means being effective to urge said force transmitting member toward said head end portion of said piston and away from said one end of said cylinder with a second force which is at least as great as thirty-five percent (35%) of the magnitude of the first force when said cushion assembly is in the extended condition.

445. A press assembly as set forth in claim 444 wherein the fluid pressure in said chamber is at least seven hundred pounds per square inch (700 psi) when said cushion assembly is in the extended condition.

446. A press assembly as set forth in claim 435 wherein said chamber holds fluid under pressure which is effective to urge said head end portion of said piston toward said one end of said cylinder with a first force when said cushion assembly is in the extended condition, said biasing means being effective to urge said head end portion of said piston away from said one end of said cylinder with a second force having a magnitude of thirty-five to eighty percent (35 to 80%) of the magnitude of said first force when said cushion assembly is in the extended condition.

447. A press assembly as set forth in claim 435 wherein said chamber holds fluid under pressure of between seven hundred and two thousand seven hundred pounds per square inch (700 and 2,700 psi) which is effective to urge said head end portion of said piston toward said one end of said cylinder with a first force when said cushion assembly is in the extended condition, said biasing means being effective to urge said head end portion of said piston away from said one end of said cylinder with a second force having a magnitude of thirty-five to eighty percent (35 to 80%) of the magnitude of said first force when said cushion assembly is in the extended condition.

448. A press assembly as set forth in claim 435 wherein said biasing means includes a body of elastomeric material which has a Bayshore rebound percentage in excess of forty percent (40%).

449. A press assembly as set forth in claim 435 wherein said biasing means includes a body of elastomeric material which is a urethane based material.

450. A press assembly as set forth in claim 435 wherein said biasing means includes a polyurethane formulation containing p-phenylene diisocyanate.

451. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which is connected to said head end portion and extends from said head end portion through one end of said cylinder, said head end portion of said piston cooperates with said cylinder to at least partially define a chamber which holds fluid under pressure, a stop which is disposed in said cylinder and is fixedly connected with one end of said cylinder and extends away from said one end of said cylinder, said head end portion of said piston having a first surface area which is disposed in engagement with and is pressed against a stop surface disposed on one end of said stop under the influence of fluid pressure in said chamber when said cushion assembly is in the extended condition, a force transmitting member which is disposed in and is movable relative to said cylinder, and biasing means for urging said head end portion of said piston away from said one end of said cylinder against the influence of fluid pressure in said chamber when said cushion assembly is in the extended condition, said biasing means being effective to provide force which is applied to a second surface area on said head end portion of said piston adjacent to said first surface area on said head end portion of said piston when said cushion assembly is in the extended condition, said force transmitting member being pressed against said second surface area on said head end portion of said piston by said biasing means when said cushion assembly is in the extended condition, said piston being movable against the influence of fluid pressure in said chamber under the influence of force transmitted from said drive means to said cushion assembly during operation of said cushion assembly from the extended condition toward the retracted condition, said biasing means being effective to provide force which is applied against at least said second surface area on said head end portion of said piston and which assists force transmitted from said drive means to said cushion assembly during an initial portion of the operation of said cushion assembly from the extended condition toward the retracted condition, said force transmitting member being engagable with said stop to limit movement of said force transmitting member relative to said cylinder, said biasing means being ineffective to provide force which assists force transmitted from said drive means to said cushion assembly after said cushion assembly has been operated through the initial portion of the operation of said cushion assembly from the extended condition toward the retracted condition.

452. A press assembly as set forth in claim 451 wherein said biasing means includes a body of elastomeric material which is disposed between said head end portion of said piston and said one end of said cylinder.

453. A press assembly as set forth in claim 451 wherein said biasing means includes a plurality of disc springs which are disposed between said head end portion of said piston and said one end of said cylinder.

454. A press assembly as set forth in claim 451 wherein said biasing means includes a coil spring which is disposed between said head end portion of said piston and said one end of said cylinder.

455. A press assembly as set forth in claim 451 wherein said biasing means includes a body of elastomeric material disposed in engagement with said force transmitting member.

456. A press assembly as set forth in claim 451 wherein said force transmitting member is disposed between said biasing means and said head end portion of said piston, said force transmitting member being effective to transmit force from said biasing means to said second surface area on said head end portion of said piston when said cushion assembly is in the extended condition.

457. A press assembly as set forth in claim 451 wherein said chamber holds fluid under pressure to urge said head end portion of said piston toward said one end of said cylinder with a first force when said cushion assembly is in the extended condition, said biasing means being effective to urge said force transmitting member toward said head end portion of said piston and away from said one end of said cylinder with a second force which is at least as great as thirty-five percent (35%) of the magnitude of the first force when said cushion assembly is in the extended condition.

458. A press assembly as set forth in claim 451 wherein the fluid pressure in said chamber is at least seven hundred pounds per square inch (700 psi) when said cushion assembly is in the extended condition.

459. A press assembly as set forth in claim 451 wherein said chamber holds fluid under pressure which is effective to urge said head end portion of said piston toward said one end of said cylinder with a first force when said cushion assembly is in the extended condition, said biasing means being effective to urge said head end portion of said piston away from said one end of said cylinder with a second force having a magnitude of thirty-five to eighty percent (35 to 80%) of the magnitude of said first force when said cushion assembly is in the extended condition.

460. A press assembly as set forth in claim 451 wherein said chamber holds fluid under pressure of between seven hundred and two thousand seven hundred pounds per square inch (700 and 2,700 psi) which is effective to urge said head end portion of said piston toward said one end of said cylinder with a first force when said cushion assembly is in the extended condition, said biasing means being effective to urge said head end portion of said piston away from said one end of said cylinder with a second force having a magnitude of thirty-five to eighty percent (35 to 80%) of the magnitude of said first force when said cushion assembly is in the extended condition.

461. A press assembly as set forth in claim 451 wherein said biasing means includes a body of elastomeric material which has a Bayshore rebound percentage in excess of forty percent (40%).

462. A press assembly as set forth in claim 451 wherein said biasing means includes a body of elastomeric material which is a urethane based material.

463. A press assembly as set forth in claim 451 wherein said biasing means includes a polyurethane formulation containing p-phenylene diisocyanate.

464. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which is connected to said head end portion and extends from said head end portion through one end of said cylinder, said head end portion of said piston cooperates with said cylinder to at least partially define a chamber which holds fluid under pressure, a stop which is disposed in said cylinder and is fixedly connected with one end of said cylinder and extends away from said one end of said cylinder, said head end portion of said piston having a first surface area which is disposed in engagement with and is pressed against a stop surface disposed on one end of said stop under the influence of fluid pressure in said chamber when said cushion assembly is in the extended condition, biasing means for urging said head end portion of said piston away from said one end of said cylinder against the influence of fluid pressure in said chamber when said cushion assembly is in the extended condition, said biasing means being effective to provide force which is applied to a second surface area on said head end portion of said piston adjacent to said first surface area on said head end portion of said piston when said cushion assembly is in the extended condition, said biasing means includes a body of elastomeric material disposed between said head end portion of said piston and said one end of said cylinder, and a force transmitting member disposed between said body of elastomeric material and said head end portion of said piston, said force transmitting member being effective to transmit force from said body of elastomeric material to said second surface area on said head end portion of said piston when said cushion assembly is in the extended condition, said piston being movable against the influence of fluid pressure in said chamber under the influence of force transmitted from said drive means to said cushion assembly during operation of said cushion assembly from the extended condition toward the retracted condition, said biasing means being effective to provide force which is applied against at least said second surface area on said head end portion of said piston and which assists force transmitted from said drive means to said cushion assembly during an initial portion of the operation of said cushion assembly from the extended condition toward the retracted condition, said biasing means being ineffective to provide force which assists force transmitted from said drive means to said cushion assembly after said cushion assembly has been operated through the initial portion of the operation of said cushion assembly from the extended condition toward the retracted condition.

465. A press assembly as set forth in claim 464 wherein said force transmitting member is pressed against said second surface area on said head end portion of said piston by said body of elastomeric material during a portion of movement of said head end portion of said piston away from said one end portion of said cylinder during operation of said cushion assembly from the extended condition to the retracted condition.

466. A press assembly as set forth in claim 464 wherein said stop surface has an annular configuration and extends around said rod end portion of said piston.

467. A press assembly as set forth in claim 464 wherein said stop has a cylindrical configuration and extends around said rod end portion of said piston.

468. A press assembly as set forth in claim 464 wherein said force transmitting member is engagable with said stop to limit movement of said force transmitting member relative to said cylinder during operation of said cushion assembly from the extended condition toward the retracted condition.

469. A press assembly as set forth in claim 464 wherein said chamber holds fluid under pressure to urge said head end portion of said piston toward said one end of said cylinder with a first force when said cushion assembly is in the extended condition, said biasing means being effective to urge said head end portion of said piston away from said one end of said cylinder with a second force which is at least as great as thirty-five percent (35%) of the magnitude of the first force when said cushion assembly is in the extended condition.

470. A press assembly as set forth in claim 464 wherein the fluid pressure in said chamber is at least seven hundred pounds per square inch (700 psi) when said cushion assembly is in the extended condition.

471. A press assembly as set forth in claim 464 wherein said chamber holds fluid under pressure which is effective to urge said head end portion of said piston toward said one end of said cylinder with a first force when said cushion assembly is in the extended condition, said biasing means being effective to urge said head end portion of said piston away from said one end of said cylinder with a second force having a magnitude of thirty-five to eighty percent (35 to 80%) of the magnitude of said first force when said cushion assembly is in the extended condition.

472. A press assembly as set forth in claim 464 wherein said chamber holds fluid under pressure of between seven hundred and two thousand seven hundred pounds per square inch (700 and 2,700 psi) which is effective to urge said head end portion of said piston toward said one end of said cylinder with a first force when said cushion assembly is in the extended condition, said biasing means being effective to urge said head end portion of said piston away from said one end of said cylinder with a second force having a magnitude of thirty-five to eighty percent (35 to 80%) of the magnitude of said first force when said cushion assembly is in the extended condition.

473. A press assembly as set forth in claim 464 wherein said body of elastomeric material has a Bayshore rebound percentage in excess of forty percent (40%).

474. A press assembly as set forth in claim 464 wherein said body of elastomeric material is a urethane based material.

475. A press assembly as set forth in claim 464 wherein said body of elastomeric material is a polyurethane formulation containing p-phenylene diisocyanate.

476. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which is connected to said head end portion and extends from said head end portion through one end of said cylinder, said head end portion of said piston cooperates with said cylinder to at least partially define a chamber which holds fluid under pressure, said chamber holds fluid under pressure to urge said head end portion of said piston toward said one end of said cylinder with a first force when said cushion assembly is in the extended condition, a stop which is disposed in said cylinder and is fixedly connected with one end of said cylinder and extends away from said one end of said cylinder, said head end portion of said piston having a first surface area which is disposed in engagement with and is pressed against a stop surface disposed on one end of said stop under the influence of fluid pressure in said chamber when said cushion assembly is in the extended condition, and biasing means for urging said head end portion of said piston away from said one end of said cylinder against the influence of fluid pressure in said chamber when said cushion assembly is in the extended condition, said biasing means being effective to provide force which is applied to a second surface area on said head end portion of said piston adjacent to said first surface area on said head end portion of said piston when said cushion assembly is in the extended condition, said piston being movable against the influence of fluid pressure in said chamber under the influence of force transmitted from said drive means to said cushion assembly during operation of said cushion assembly from the extended condition toward the retracted condition, said biasing means being effective to provide force which is applied against at least said second surface area on said head end portion of said piston and which assists force transmitted from said drive means to said cushion assembly during an initial portion of the operation of said cushion assembly from the extended condition toward the retracted condition, said biasing means being ineffective to provide force which assists force transmitted from said drive means to said cushion assembly after said cushion assembly has been operated through the initial portion of the operation of said cushion assembly from the extended condition toward the retracted condition, said biasing means being effective to urge said head end portion of said piston away from said one end of said cylinder with a second force which is at least as great as thirty-five percent (35%) of the magnitude of the first force when said cushion assembly is in the extended condition.

477. A press assembly as set forth in claim 476 further including a force transmitting member which is disposed in and is movable relative to said cylinder, said force transmitting member being pressed against said second surface area on said head end portion of said piston by said biasing means when said cushion assembly is in the extended condition, said force transmitting member being engagable with said stop to limit movement of said force transmitting member relative to said cylinder.

478. A press assembly as set forth in claim 476 wherein said biasing means includes a body of elastomeric material which engages said second surface area on said head end portion of said piston when said cushion assembly is in the extended condition.

479. A press assembly as set forth in claim 476 wherein said biasing means includes a plurality of disc springs which are disposed between said head end portion of said piston and said one end of said cylinder.

480. A press assembly as set forth in claim 476 wherein said biasing means includes a coil spring which is disposed between said head end portion of said piston and said one end of said cylinder.

481. A press assembly as set forth in claim 476 wherein said biasing means includes a body of elastomeric material disposed between said head end portion of said piston and said one end of said cylinder.

482. A press assembly as set forth in claim 481 further including a force transmitting member disposed between said body of elastomeric material and said head end portion of said piston, said force transmitting member being effective to transmit force from said body of elastomeric material to said second surface area on said head end portion of said piston when said cushion assembly is in the extended condition.

483. A press assembly as set forth in claim 476 wherein the fluid pressure in said chamber is at least seven hundred pounds per square inch (700 psi) when said cushion assembly is in the extended condition.

484. A press assembly operable from an open condition to a closed condition to deform a workpiece and operable from the closed condition to the open condition to facilitate removal of the workpiece from said press assembly, said press assembly comprising a first member for engaging a first side of the workpiece, a second member for engaging a second side of the workpiece, drive means for moving said first member toward said second member during operation of said press assembly from the open condition to the closed condition and for moving said first member away from said second member during operation of said press assembly from the closed condition to the open condition, and a cushion assembly operable from an extended condition toward a retracted condition to provide a yieldable force during at least a portion of the operation of the press assembly from the open condition toward the closed condition, said cushion assembly including a cylinder, a piston, said piston having a head end portion which is disposed in said cylinder and a rod end portion which is connected to said head end portion and extends from said head end portion through one end of said cylinder, said head end portion of said piston cooperates with said cylinder to at least partially define a chamber which holds fluid under pressure, said chamber holds fluid under pressure which is effective to urge said head end portion of said piston toward said one end of said cylinder with a first force when said cushion assembly is in the extended condition, a stop which is disposed in said cylinder and is fixedly connected with one end of said cylinder and extends away from said one end of said cylinder, said head end portion of said piston having a first surface area which is disposed in engagement with and is pressed against a stop surface disposed on one end of said stop under the influence of fluid pressure in said chamber when said cushion assembly is in the extended condition, and biasing means for urging said head end portion of said piston away from said one end of said cylinder against the influence of fluid pressure in said chamber when said cushion assembly is in the extended condition, said biasing means being effective to provide force which is applied to a second surface area on said head end portion of said piston adjacent to said first surface area on said head end portion of said piston when said cushion assembly is in the extended condition, said piston being movable against the influence of fluid pressure in said chamber under the influence of force transmitted from said drive means to said cushion assembly during operation of said cushion assembly from the extended condition toward the retracted condition, said biasing means being effective to provide force which is applied against at least said second surface area on said head end portion of said piston and which assists force transmitted from said drive means to said cushion assembly during an initial portion of the operation of said cushion assembly from the extended condition toward the retracted condition, said biasing means being ineffective to provide force which assists force transmitted from said drive means to said cushion assembly after said cushion assembly has been operated through the initial portion of the operation of said cushion assembly from the extended condition toward the retracted condition, said biasing means being effective to urge said head end portion of said piston away from said one end of said cylinder with a second force having a magnitude of thirty-five to eighty percent (35 to 80%) of the magnitude of said first force when said cushion assembly is in the extended condition.

485. A press assembly as set forth in claim 484 further including a force transmitting member which is disposed in and is movable relative to said cylinder, said force transmitting member being said head end portion of said piston by said biasing means when said cushion assembly is in the extended condition.

486. A press assembly as set forth in claim 484 wherein said biasing means includes a body of elastomeric material which engages said second surface area on said head end portion of said piston when said cushion assembly is in the extended condition.

487. A press assembly as set forth in claim 484 wherein said biasing means includes a plurality of disc springs which are disposed between said head end portion of said piston and said one end of said cylinder.

488. A press assembly as set forth in claim 484 wherein said biasing means includes a coil spring which is disposed between said head end portion of said piston and said one end of said cylinder.

489. A press assembly as set forth in claim 484 wherein said biasing means includes a body of elastomeric material disposed between said head end portion of said piston and said one end of said cylinder.

490. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is at least as great as thirty-five percent (35%) of the magnitude of said first force when said cushion assembly is in the extended condition.

491. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude which is less than eighty percent (80%) of the magnitude of said first force when said cushion assembly is in the extended condition.

492. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said chamber holds fluid under pressure which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

493. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said chamber holds fluid under a pressure of between seven hundred and two thousand seven hundred pounds per square inch (700 and 2,700 psi) which is effective to urge said head end portion of said piston toward said one end of said cylinder with a first force when said cushion assembly is in the extended condition, said body of elastomeric material being effective to urge said head end portion of said piston away from said one end of said cylinder with a second force having a magnitude of thirty-five to eighty percent (35% to 80%) of the magnitude of said first force when said cushion assembly is in the extended condition.

494. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material is effective to urge said head end portion of said piston away from said one end of said cylinder against the influence of fluid pressure in said chamber during at least three percent (3%) of the movement of said head end portion of said piston during operation of said cushion assembly from the extended condition to the retracted condition.

495. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material is effective to urge said head end portion of said piston away from said one end of said cylinder against the influence of fluid pressure in said chamber during less than fifty percent (50%) of the movement of said head end portion of said piston during operation of said cushion assembly from the extended condition to the retracted condition.

496. A cushion assembly operable from an extended condition toward a retracted condition to provide a yieldable force during at least a portion of operation of a press assembly from an open condition toward a closed condition, said cushion assembly comprising a cylinder, a piston, said piston having a head end portion which is disposed in said cylinder and a rod end portion which extends from said head end portion through one end of said cylinder, said head end portion of said piston cooperates with said cylinder to at least partially define a chamber which holds fluid under pressure, a rigid tubular portion which is fixedly connected to said one end of said cylinder, said rigid tubular portion extends around said rod end portion of said piston, and a body of elastomeric material disposed in said cylinder, said body of elastomeric material extends around said rigid tubular portion and is disposed between said rigid tubular portion and said cylinder, said body of elastomeric material is compressed by force transmitted from said head end portion of said piston when said cushion assembly is in the extended condition, said rigid tubular portion being effective to limit compression of said body of elastomeric material by force transmitted from said head end portion of said piston when said cushion assembly is in the extended condition, said body of elastomeric material being effective to urge said head end portion of said piston away from said one end of said cylinder against the influence of fluid pressure in said chamber when said cushion assembly is in the extended condition, said piston being movable against the influence of fluid pressure in said chamber under the influence of force transmitted to said cushion assembly during operation of said cushion assembly from the extended condition toward the retracted condition, said body of elastomeric material being effective to provide force which assists force transmitted to said cushion assembly during an initial portion of the operation of said cushion assembly from the extended condition toward the retracted condition, said body of elastomeric material is effective to urge said head end portion of said piston away from said one end of said cylinder against the influence of fluid pressure in said chamber during between three and fifty percent (3% and 50%) of the movement of said head end portion of said piston during operation of said cushion assembly from the extended condition to the retracted condition.

* * * * *

UNITED STATES PATENT AND TRADEMARK OFFICE
CERTIFICATE OF CORRECTION

PATENT NO. : 6,322,059 B1
DATED : November 27, 2001
INVENTOR(S) : Henry J. Kelm et al.

It is certified that error appears in the above-identified patent and that said Letters Patent is hereby corrected as shown below:

Column 31,
Line 13, after "claim", change "45" to -- 71 --.

Column 46,
Line 50, after "percent", change "(350%)" to -- (35%) --.

Column 70,
Line 12, after "percent", change "(350%)" to -- (35%) --.

Signed and Sealed this

Tenth Day of December, 2002

JAMES E. ROGAN
*Director of the United States Patent and Trademark Office*